US012711166B2

(12) United States Patent
Woollard et al.

(10) Patent No.: US 12,711,166 B2
(45) Date of Patent: Aug. 18, 2026

(54) AUTOMATED CONTENT CREATION FOR COLLABORATION PLATFORMS WITH PLATFORM-SPECIFIC OBJECTS

(71) Applicant: Atlassian Pty Ltd., Sydney (AU)

(72) Inventors: Luke John Woollard, Perth (AU); Wing Ho, Melbourne (AU); Bhargav Nallani Chakravarthula, Arlington, VA (US); Jerry Qing, New York, NY (US); George Chen, Mountain View, CA (US); Kasirajan Selladurai Selvakumari, Sunnyvale, CA (US); Rudra Saha, Jersey City, NJ (US); Puneet Arora, Mountain View, CA (US)

(73) Assignee: ATLASSIAN PTY LTD, Sydney (AU)

( * ) Notice: Subject to any disclaimer, the term of this patent is extended or adjusted under 35 U.S.C. 154(b) by 334 days.

(21) Appl. No.: 18/622,828

(22) Filed: Mar. 29, 2024

(65) Prior Publication Data

US 2025/0005264 A1 Jan. 2, 2025

Related U.S. Application Data

(60) Provisional application No. 63/523,909, filed on Jun. 28, 2023.

(51) Int. Cl.
*G06F 40/166* (2020.01)
*G06F 3/04812* (2022.01)
(Continued)

(52) U.S. Cl.
CPC ...... *G06F 16/3334* (2019.01); *G06F 3/04812* (2013.01); *G06F 3/0486* (2013.01);
(Continued)

(58) Field of Classification Search
CPC .... G06F 16/3334; G06F 9/451; G06F 16/243; G06F 16/2448; G06F 16/24547; G06F 16/93; G06F 16/9038; G06F 16/90332; G06F 16/2455; G06F 16/3329; G06F 16/954; G06F 16/248; G06F 16/345; G06F 40/134; G06F 40/166; G06F 40/40; G06F 40/186; G06F 40/205; G06F 40/197;
(Continued)

(56) References Cited

U.S. PATENT DOCUMENTS 8,892,524 B1 11/2014 Lee et al.
11,604,783 B2 * 3/2023 Bar-on .................... G06F 3/14
(Continued)

*Primary Examiner* — Haoshian Shih
(74) *Attorney, Agent, or Firm* — Brownstein Hyatt Farber Schreck, LLP

(57) ABSTRACT

Embodiments described herein relate to systems and methods for automatically generating content, generating API requests and/or request bodies, structuring user-generated content, and/or generating structured content in collaboration platforms, such as documentation systems, issue tracking systems, project management platforms, and other platforms. The systems and methods described use a network architecture that includes a prompt generation service and a set of one or more purpose-configured large language model instances (LLMs) and/or other trained classifiers or natural language processors used to provide generative responses for content collaboration platforms.

20 Claims, 39 Drawing Sheets

(51) Int. Cl.

| | |
|---|---|
| ***G06F 3/0486*** | (2013.01) |
| ***G06F 9/451*** | (2018.01) |
| ***G06F 9/54*** | (2006.01) |
| ***G06F 16/242*** | (2019.01) |
| ***G06F 16/2453*** | (2019.01) |
| ***G06F 16/2455*** | (2019.01) |
| ***G06F 16/248*** | (2019.01) |
| ***G06F 16/3329*** | (2025.01) |
| ***G06F 16/3332*** | (2025.01) |
| ***G06F 16/34*** | (2019.01) |
| ***G06F 16/9032*** | (2019.01) |
| ***G06F 16/9038*** | (2019.01) |
| ***G06F 16/93*** | (2019.01) |
| ***G06F 16/954*** | (2019.01) |
| ***G06F 21/31*** | (2013.01) |
| ***G06F 40/117*** | (2020.01) |
| ***G06F 40/134*** | (2020.01) |
| ***G06F 40/174*** | (2020.01) |
| ***G06F 40/186*** | (2020.01) |
| ***G06F 40/197*** | (2020.01) |
| ***G06F 40/20*** | (2020.01) |
| ***G06F 40/205*** | (2020.01) |
| ***G06F 40/30*** | (2020.01) |
| ***G06F 40/40*** | (2020.01) |
| ***G06N 3/0475*** | (2023.01) |
| ***G06Q 10/0631*** | (2023.01) |
| ***G06Q 10/101*** | (2023.01) |
| ***H04L 51/02*** | (2022.01) |
| ***H04L 51/21*** | (2022.01) |
| *G06F 3/0484* | (2022.01) |
| *G06Q 10/10* | (2023.01) |

(52) U.S. Cl.

CPC .............. *G06F 9/451* (2018.02); *G06F 9/541* (2013.01); *G06F 9/547* (2013.01); *G06F 16/243* (2019.01); *G06F 16/2448* (2019.01); *G06F 16/24547* (2019.01); *G06F 16/2455* (2019.01); *G06F 16/248* (2019.01); *G06F 16/3329* (2019.01); *G06F 16/345* (2019.01); *G06F 16/90332* (2019.01); *G06F 16/9038* (2019.01); *G06F 16/93* (2019.01); *G06F 16/954* (2019.01); *G06F 21/31* (2013.01); *G06F 40/117* (2020.01); *G06F 40/134* (2020.01); *G06F 40/166* (2020.01); *G06F 40/174* (2020.01); *G06F 40/186* (2020.01); *G06F 40/197* (2020.01); *G06F 40/20* (2020.01); *G06F 40/205* (2020.01); *G06F 40/30* (2020.01); *G06F 40/40* (2020.01); *G06N 3/0475* (2023.01); *G06Q 10/063114* (2013.01); *G06Q 10/06316* (2013.01); *G06Q 10/101* (2013.01); *H04L 51/02* (2013.01); *H04L 51/21* (2022.05); *G06F 3/0484* (2013.01); *G06Q 10/103* (2013.01)

(58) Field of Classification Search

CPC ...... G06F 40/117; G06F 40/30; G06F 40/174; G06F 40/20; G06F 3/04812; G06F 3/0486; G06F 9/541; G06F 9/547; G06F 21/31; G06F 3/0484; H04L 51/21; H04L 51/02; G06N 3/0475; G06Q 10/063114; G06Q 10/06316; G06Q 10/101; G06Q 10/103

See application file for complete search history.

(56) References Cited

U.S. PATENT DOCUMENTS

| | | | | |
|---|---|---|---|---|
| 11,816,096 | B2 | 11/2023 | Mansour et al. | |
| 12,197,478 | B1 | 1/2025 | Mansour et al. | |
| 12,307,202 | B2 * | 5/2025 | Religa | G06F 40/166 |
| 12,602,533 | B2 * | 4/2026 | Shin | G06F 40/103 |
| 2007/0186007 | A1 | 8/2007 | Field et al. | |
| 2009/0006982 | A1 | 1/2009 | Curtis et al. | |
| 2009/0083637 | A1 | 3/2009 | Skakkebaek et al. | |
| 2009/0182763 | A1 | 7/2009 | Hawking et al. | |
| 2009/0193345 | A1 | 7/2009 | Wensley et al. | |
| 2010/0011292 | A1 | 1/2010 | Marinkovich et al. | |
| 2010/0235763 | A1 | 9/2010 | Massand et al. | |
| 2011/0022662 | A1 | 1/2011 | Barber-Mingo et al. | |
| 2011/0296303 | A1 | 12/2011 | Duquene et al. | |
| 2013/0173531 | A1 | 7/2013 | Rinearson et al. | |
| 2014/0033009 | A1 | 1/2014 | Rein et al. | |
| 2014/0164172 | A1 | 6/2014 | Du et al. | |
| 2014/0222622 | A1 | 8/2014 | Du et al. | |
| 2015/0052144 | A1 | 2/2015 | Mari et al. | |
| 2015/0139610 | A1 | 5/2015 | Syed et al. | |
| 2015/0163259 | A1 | 6/2015 | Huang et al. | |
| 2016/0019018 | A1 | 1/2016 | Xiong et al. | |
| 2016/0259508 | A1 | 9/2016 | Eccleston et al. | |
| 2017/0083871 | A1 | 3/2017 | Chang et al. | |
| 2017/0193448 | A1 | 7/2017 | Piyush et al. | |
| 2017/0214722 | A1 | 7/2017 | Bhattacharjee et al. | |
| 2017/0257405 | A1 | 9/2017 | Lo et al. | |
| 2018/0095709 | A1 | 4/2018 | Nimri et al. | |
| 2018/0191645 | A1 | 7/2018 | Cacioppo et al. | |
| 2018/0307383 | A1 | 10/2018 | Faulkner et al. | |
| 2018/0335935 | A1 | 11/2018 | Larson et al. | |
| 2018/0336520 | A1 | 11/2018 | Davis et al. | |
| 2019/0155870 | A1 | 5/2019 | Prakash et al. | |
| 2020/0327189 | A1 * | 10/2020 | Li | G06F 40/56 |
| 2022/0262405 | A1 | 8/2022 | Conlin et al. | |
| 2022/0263877 | A1 | 8/2022 | Conlin et al. | |
| 2022/0303322 | A1 | 9/2022 | Rangarajan et al. | |
| 2022/0415235 | A1 | 12/2022 | Singh et al. | |
| 2023/0046716 | A1 | 2/2023 | Gao et al. | |
| 2023/0091949 | A1 | 3/2023 | Erasmus et al. | |
| 2023/0101588 | A1 | 3/2023 | Dasdan et al. | |
| 2023/0195689 | A1 | 6/2023 | Alagianambi et al. | |
| 2023/0205980 | A1 | 6/2023 | Brockett et al. | |
| 2023/0367828 | A1 | 11/2023 | Gillette et al. | |
| 2023/0385769 | A1 | 11/2023 | Helvik et al. | |
| 2024/0005415 | A1 | 1/2024 | Gray et al. | |
| 2024/0273286 | A1 | 8/2024 | Iu et al. | |
| 2024/0296275 | A1 | 9/2024 | Whitmore et al. | |
| 2024/0303415 | A1 | 9/2024 | Wilde et al. | |
| 2024/0419465 | A1 | 12/2024 | Riscutia et al. | |
| 2025/0005020 | A1 | 1/2025 | Thatisetti et al. | |
| 2025/0005029 | A1 | 1/2025 | Mansour et al. | |
| 2025/0005062 | A1 | 1/2025 | Mansour et al. | |
| 2025/0005080 | A1 | 1/2025 | Mansour et al. | |
| 2025/0005260 | A1 | 1/2025 | Mansour et al. | |
| 2025/0005263 | A1 | 1/2025 | Mansour et al. | |
| 2025/0005292 | A1 | 1/2025 | Khemani et al. | |
| 2025/0005335 | A1 | 1/2025 | Saha et al. | |
| 2025/0005470 | A1 | 1/2025 | Mansour et al. | |
| 2025/0005523 | A1 | 1/2025 | Katta et al. | |
| 2025/0005528 | A1 | 1/2025 | Mansour et al. | |
| 2025/0007870 | A1 | 1/2025 | Kim et al. | |

* cited by examiner

AUTOMATED CONTENT CREATION FOR COLLABORATION PLATFORMS WITH PLATFORM-SPECIFIC OBJECTS

CROSS-REFERENCE TO RELATED APPLICATION(S)

This application is a nonprovisional patent application of and claims the benefit of U.S. Provisional Patent Application No. 63/523,909, filed Jun. 28, 2023 and titled "Automated Content Creation for Collaboration Platforms," the disclosure of which is hereby incorporated herein by reference in its entirety.

TECHNICAL FIELD

Embodiments described herein relate to multitenant services of collaborative work environments and, in particular, to systems and methods for automated content creation and organization in collaborative work environments.

BACKGROUND

An organization can establish a collaborative work environment by self-hosting, or providing its employees with access to, a suite of discrete software platforms or services to facilitate cooperation and completion of work. An enterprise may use a number of software platforms to document product development, track issues, and manage a codebase or other product data. In many traditional software platforms, it may be difficult to work across platforms, share data, and also maintain content permissions and data security requirements. The systems and techniques described herein can be used to automatically produce generative content across multiple software platforms and for a variety of product development tasks.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
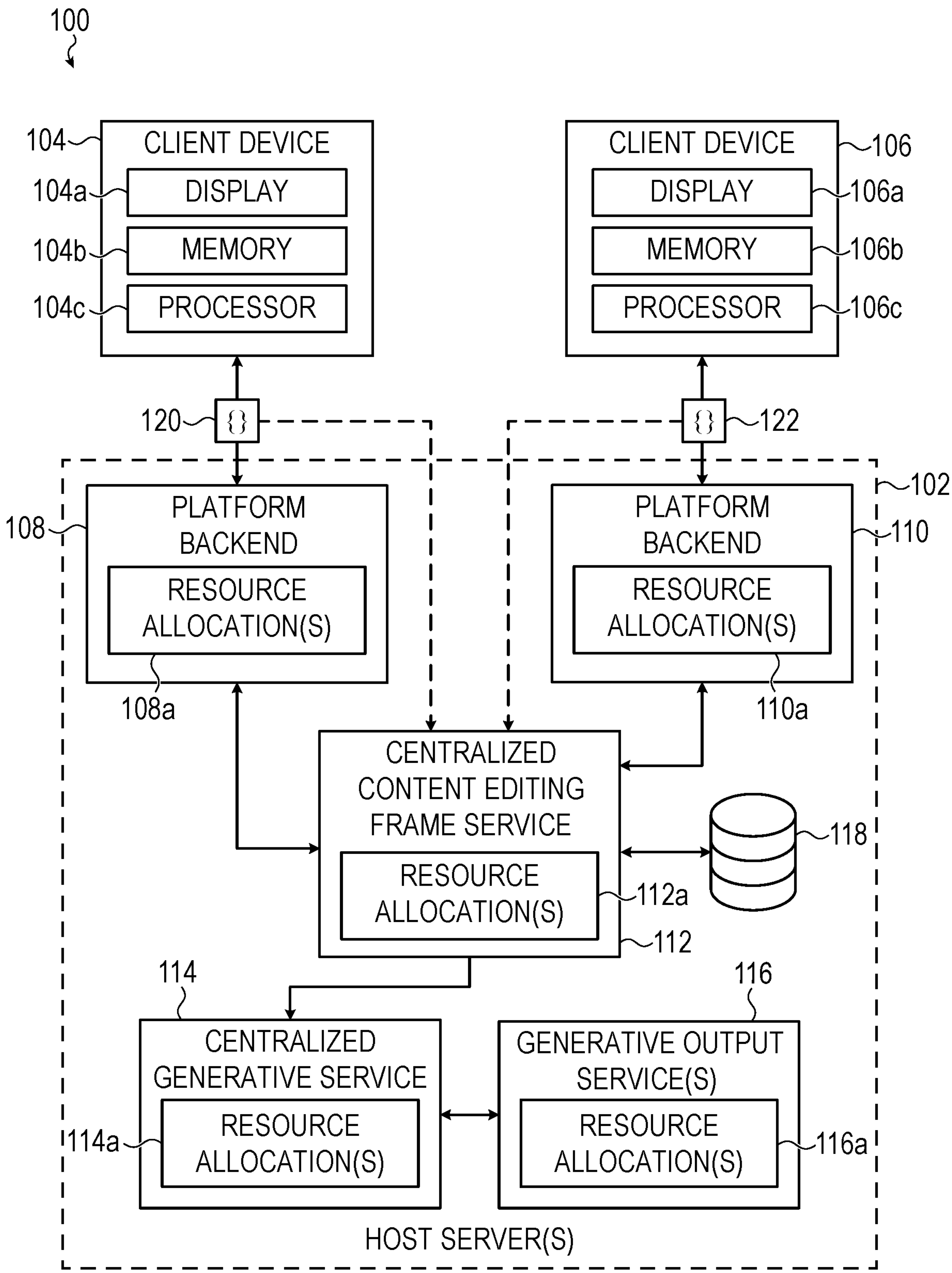
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically generating content, generating API requests and/or request bodies, structuring user-generated content, and/or generating structured content in collaboration platforms, such as documentation systems, issue tracking systems, project management platforms, and the like.

Automatically generated content can supplement, summarize, format, and/or structure existing tenant-owned user-generated content created by a user while operating a software platform, such as described herein. In one embodiment, user-generated content can be supplemented by an automatically generated summary. The generated summary may be prepended to the content such that when the content is rendered for other users, the summary appears first. In other cases, the summary may be appended to an end of the document. In yet other examples, the generated summary may be transmitted to another application, messaging system, or notification system. For example, a generated document summary can be attached to an email, a notification, a chat or ITSM support message, or the like, in lieu of being attached or associated with the content it summarizes.

In another example, user-generated content can be supplemented by automatic insertion of format markers or style classes (e.g., markdown tags, CSS classes, and the like) into the user-generated content itself. In other examples, user-generated content can be rewritten and/or restructured to include more detail, to remove unnecessary detail, and/or to adopt a more neutral or positive tone. These examples are not exhaustive.

As described herein, generative content may be produced using a centralized generative service. The centralized generative service may be accessed using one of a number of different platforms and may reduce redundant prompts and prompt-generation services and also promote or facilitate more consistent generative services across a suite of software platforms. The centralized generative service may use a predefined request schema to service requests from a number of different platforms and services. The request schema defines a set of elements and a predetermined sequence of the set of elements that can be used to specify the parameters of a request for generative content using a uniform or standardized format. Further, the request schema provides for flexibility in multiple elements so that the same schema can be used to service a wide variety of requests and produce generative content for a wide range of use cases.

In some examples described herein, a centralized generative service may include a prompt form or prompt text generation service that is configured to generate and store complete and partial prompt templates or prompt portions that can be stored for use by a central prompt service. The prompt form or prompt text generation service allows for effective prompts, system intents, user intents, and other instructions to be leveraged across multiple modules or platforms. The proposed system may also improve the quality and consistency of generative responses across a suite of software products and services.

In some example embodiments described herein, platform-specific or editor-specific objects may be preserved using a primarily text-based generative process. As described in more detail herein, non-text objects may be identified and replaced with tagged text strings, which may be preserved and used to insert the corresponding non-text objects back into a generative response or result. This enables the generative service to produce content that appears similar to native content and provides the same rich functionality built into the native objects.

The example embodiments described herein provide a number of examples in which automatically generated content is used in a variety of software applications and user cases. In addition to embodiments in which automatically generated content is generated in respect of existing user-generated content (and/or appended thereto), automatically generated content as described herein can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The request bodies, in these embodiments, can be structured so as to elicit particular responses from one or more software platforms' API endpoints. For example, a documentation platform may include an API endpoint that causes the documentation platform to create a new document from a specified template. Specifically, in theses examples, a request to this endpoint can be generated, in whole or in part, automatically. In other cases, an API request body can be modified or supplemented by automatically generated output, as described herein.

For example, an issue tracking system may present an API endpoint that causes creation of new issues in a particular project. In this example, string or other typed data such as a new issue titles, new issue state, new issue description, and/or new issue assignee fields can be automatically generated and inserted into appropriate fields of a JSON-formatted request body. Submitting the request, as modified/supplemented by automatically generated content, to the API endpoint can result in creation of an appropriate number of new issues.

In another example, a trouble ticket system (e.g., an information technology service management or "ITSM" system) may include an interface for a service agent to chat with or exchange information with a customer experiencing a problem. In some cases, automatically generated content can be displayed to the customer, whereas in other cases, automatically generated content can be displayed to the service agent.

For example, in the first case, automatically generated content can summarize and/or link to one or more documents that outline troubleshooting steps for common problems. In these examples, the customer experiencing an issue can receive through the chat interface, one or more suggestions that (1) summarize steps outlined in comprehensive documentation, (2) link to a relevant portion of comprehensive documentation, or (3) prompt the customer to provide more information. In the second case, a service agent can be assisted by automatically generated content that (1) summarizes steps outlined in comprehensive documentation and/or one or more internal documentation tools or platforms, (2)

link to relevant portions of comprehensive help documentation, or (3) prompt the service agent to request more information from the customer. In some cases, generated content can include questions that may help to further narrowly characterize the customer's problem. More generally, automatically generated content can assist either or both service agents and customers in ITSM environments.

The foregoing embodiments are not exhaustive of the manners by which automatically generated content can be used in multi-platform computing environments, such as those that include more than one collaboration tool.

More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as "generated text" or "generated output" provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>".

In addition, the LLM may be configured to replace the substring "pending" with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and to received output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
  "prompt" : "Generate five words of placeholder text in the
English language.",
  "API_KEY: "hx-Y5u4zx3kaF67AzkXK1hC",
  "user_token": "PkcLe7Co2G-50AoIVojGJ"
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
  "response" : "Hello world text goes here.",
  "generation_time_ms" : 2
}
```

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance" or "prompt preconditioning software instance"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "predetermined prompt text," "contextual information," or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated to the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

```
{
  "raw_prompt" : summarize the edits to this page made by
my team since I last visited this page",
  "modified_prompt" : "Generate a summary of each
paragraph tagged with an editId attribute matching editId=1,
editId=51, editId=165, editId=99 within the following HTML-
formatted content: [HTML-formatted content of the page]."
}
```

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

```
{
  "snippet123_table_from_tasks" : "The table should be
formatted as a three-column table with multiple rows. The leftmost
column should be titled 'Title' and the corresponding content of each
row of this column should be the title attribute of a task. The middle
column should be titled 'Created Date' and the corresponding
content of each row of this column should be the creation date of the
task. The rightmost column should be titled 'Status' and the
corresponding content of each row of this column should be the
status attribute of the selected task."
}
```

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

```
{
  "modified_prompt" : "Find all tasks assigned to User 1234
dating from Jan 01, 2023 - Jan 14, 2023 (inclusive). Create a table
in which each found task corresponds to a respective row of that
table. The table should be formatted as a markdown table, in plain
text, with a three columns. The leftmost column should be titled
'Title' and the corresponding content of each row of this column
should be the title attribute of a respective task. The middle column
should be titled 'Created Date' and the corresponding content of each
row of this column should be the creation date of the respective task.
The rightmost column should be titled 'Status' and the corresponding
content of each row of this column should be the status attribute of
the respective task."
}
```

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents. In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein.

More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems.

For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems.

For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform-multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, the difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform (s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-24. The detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms maybe instantiated over physical resources provided by the set of host servers 102. Once instantiated, the first platform backend 108 and the second platform backend 110 can each communicably couple to a centralized content editing frame service 112 (also referred to more simply as an "editor" or an "editor service").

The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content editing frame service 112 that can be called by each respective frontend whenever it is required to present the user of that respective frontend with an interface to edit text.

Figure 6A:
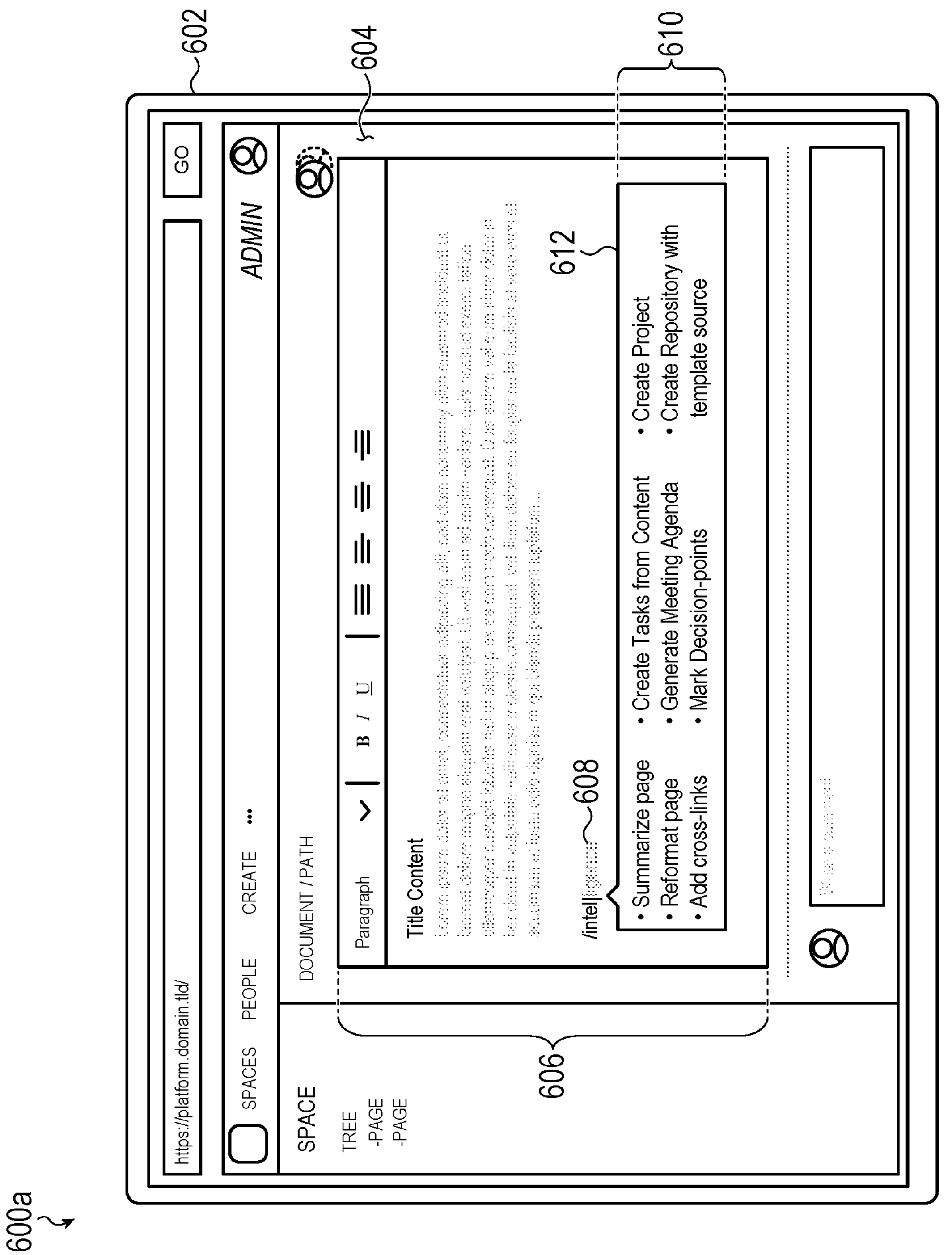
FIG. 6A depicts an example user interface of a documentation platform rendering a frame to receive user input from a user by leveraging a centralized editor service.

For example, the documentation platform's frontend may call upon the centralized content editing frame service 112 to render, or assist with rendering, a user input interface element to receive user text input when a user of the documentation platform requests to edit a document stored by the documentation platform backend (see, e.g., FIG. 6A).

Figure 6B:
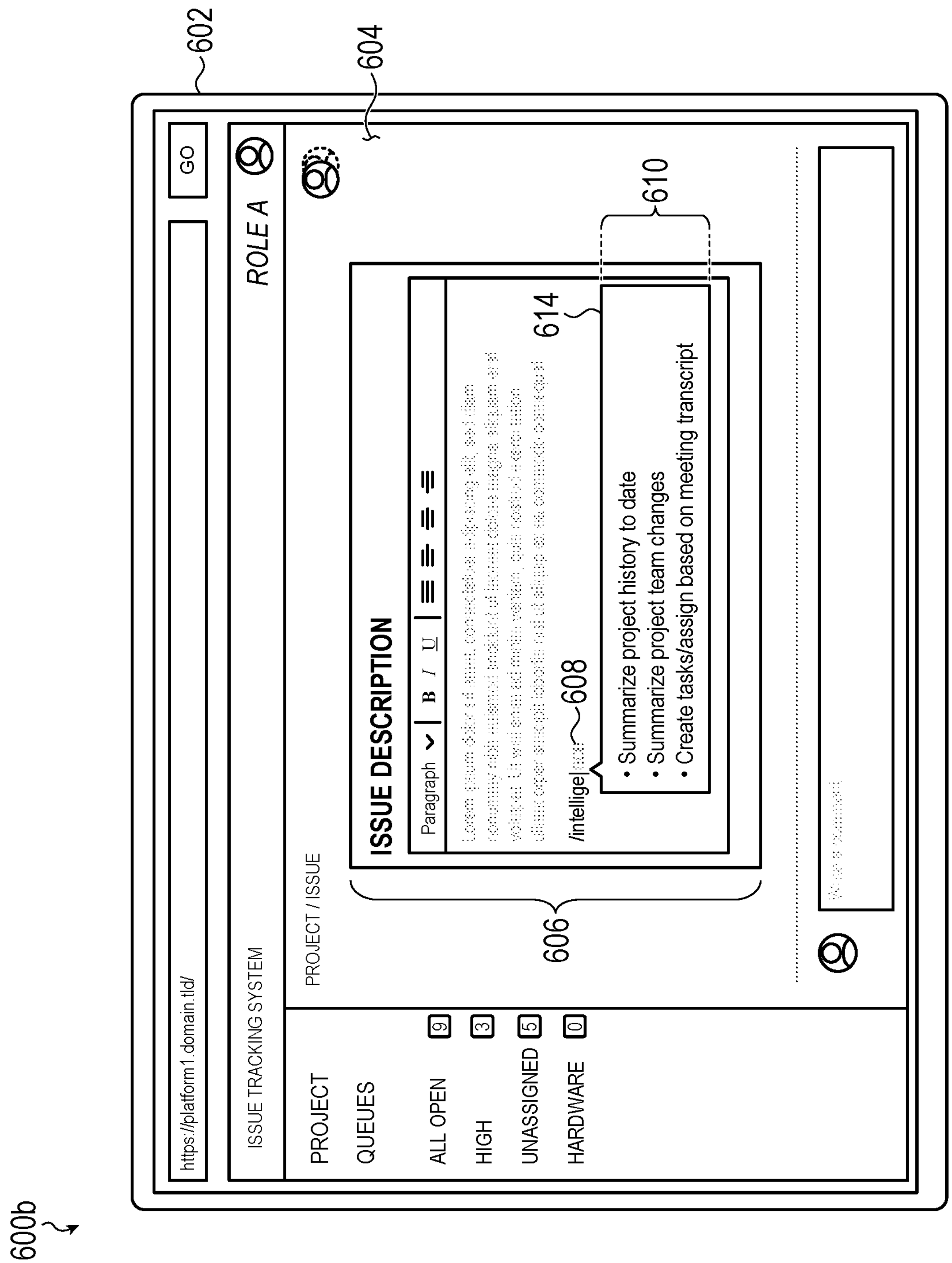
FIG. 6B depicts another example user interface of a documentation platform rendering a frame to receive user input from a user by leveraging a centralized editor service.

Similarly, the issue tracking platform's frontend may call upon the centralized content editing frame service 112 to render, or assist with rendering, a user input interface element to receive user text input when a user of the documentation platform opens a new issue (also referred to as a ticket), and begins typing an issue description (see e.g., FIG. 6B).

In these examples, the centralized content editing frame service 112 can parse text input provided by users of the documentation platform frontend and/or the issue tracking platform backend, monitoring for command and control keywords, phrases, trigger characters, and so on. In many cases, for example, the centralized content editing frame service 112 can implement a slash command service that can be used by a user of either platform frontend to issue commands to the backend of the other system.

For example, the user of the documentation platform frontend can input a slash command to the content editing frame, rendered in the documentation platform frontend supported by the centralized content editing frame service 112, in order to type a prompt including an instruction to create a new issue or a set of new issues in the issue tracking platform. Similarly, the user of the issue tracking platform can leverage slash command syntax, enabled by the centralized content editing frame service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized content editing frame service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content editing frame service 112 can be extended to include additional features and functionality-such as a slash command and control feature-which, in turn, can automatically be leveraged by any further platform that incorporates a content editing frame, and/or otherwise integrates with the centralized content editing frame service 112 itself. In this example, slash commands facilitated by the editor service can be used to receive prompt instructions from users of either frontend. These prompts can be provided as input to a prompt engineering/prompt preconditioning service (such as the centralized generative service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content editing frame service 112 can be configured to provide suggested prompts to a user as the user types. For example, as a user begins typing a slash command in a frontend of some platform that has integrated with a centralized content editing frame service 112 as described herein, the centralized content editing frame service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content editing frame service 112 can be configured to suggest one or more prompts that can be provided as input to a generative output engine as described herein to perform a useful task, such as summarizing content rendered within the centralized content editing frame service 112, reformatting content rendered within the centralized content editing frame service 112, inserting cross-links within the centralized content editing frame service 112, and so on.

The ordering of the suggestion list and/or the content of the suggestion list may vary from user to user, user role to user role, and embodiment to embodiment. For example, when interacting with a documentation system, a user having a role of "developer" may be presented with prompts associated with tasks related to an issue tracking system and/or a code repository system.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a centralized content editing frame service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content editing frame service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein reference systems and methods for sharing user interface elements rendered by a centralized content editing frame service 112 and features thereof (such as a slash command processor), between different software platforms in an authenticated and secure manner. For simplicity of description, the embodiments that follow reference a configuration in which a centralized content editing frame service is configured to implement a slash command feature—including slash command suggestions—but it may be appreciated that this is merely one example and other configurations and constructions are possible.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104*a*-104*c*, respectively.

As with many embodiments described herein, the first platform frontend can be configured to communicate with the first platform backend 108 and/or the centralized content editing frame service 112. Information can be transacted by and between the frontend, the first platform backend 108 and the centralized content editing frame service 112 in any suitable manner or form or format. In many embodiments, as noted above, the client device 104 and in particular the first platform frontend can be configured to send an authentication token 120 along with each request transmitted to any of the first platform backend 108 or the centralized content editing frame service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106*a*-106*c*, respectively.

As with many embodiments described herein, the second platform frontend can be configured to communicate with the second platform backend 110 and/or the centralized content editing frame service 112. Information can be transacted by and between the frontend, the second platform backend 110 and the centralized content editing frame service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content editing frame service 112 can provide uniform feature sets to users of either the client device 104 or the client device 106. For example, the centralized content editing frame service 112 can implement a slash command processor to receive prompt input and/or preconfigured prompt selection provided by a user of the client device 104 to the first platform and/or to receive input provided by a different user of the client device 106 to the second platform.

As noted above, the centralized content editing frame service 112 ensures that common features, such as slash command handling, are available to frontends of different platforms. One such class of features provided by the centralized content editing frame service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the centralized generative service 114 can be configured to receive user input (provided via a graphical user interface of the client device 104 or the client device 106) from the centralized content editing frame service 112. The user input may include a prompt to be continued by the generative engine service 116.

The centralized generative service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The centralized generative service 114 may also be referred to herein as herein as an "editor assistant service" or a "prompt constructor." In some cases, the centralized generative service 114 is also referred to as a "content creation and modification service."

Output of the centralized generative service 114 can be referred to as a modified prompt or a preconditioned prompt. This modified prompt can be provided to the generative engine service 116 as an input. More particularly, the centralized generative service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the centralized generative service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the centralized generative service 114 can be configured to specify what engine, engine version, language, language model or other data should be used to continue a particular modified prompt.

The selected LLM or other generative engine continues the input prompt and returns that continuation to the caller, which in many cases may be the centralized generative service 114. In other cases, output of the generative engine service 116 can be provided to the centralized content editing frame service 112 to return to a suitable backend application, to in turn return to or perform a task for the benefit of a client device such as the client device 104 or the client device 106. More particularly, it may be appreciate that although FIG. 1 is illustrated with only the centralized generative service 114 communicably coupled to the generative engine service 116, this is merely one example and that in other cases the generative engine service 116 can be communicably coupled to any of the client device 106, the client device 104, the first platform backend 108, the second platform backend 110, the centralized content editing frame service 112, or the centralized generative service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be preformed by the client device, the platform backend, the centralized content editing frame service, the centralized generative service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user 123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt}. Provide output of any table in the form of a tab delimited table formatted according to the markdown specification." In this example, the variable $ {user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once (and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108*a*.

Similarly, the second platform backend 110 may be instantiated over the resource allocations 110*a* (including processors, memory, storage, network communications systems, and so on). Likewise, the centralized content editing frame service 112 is supported by a processor and memory and network connection (and/or database connections) collectively represented for simplicity as the resource allocations 112*a*.

The centralized generative service 114 can be supported by its own resources including processors, memory, network connections, displays (optionally), and the like represented in the figure as the resource allocations 114*a*.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the centralized generative service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document 123 of all changes to Kanban board 456 that do not have a corresponding issue tagged in the issue tracking system." In respect of this example, the prompt context analysis instance may determine whether the requesting user has permission to access Document 123, whether the requesting user has written permission to modify Document 123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Figure 2A:
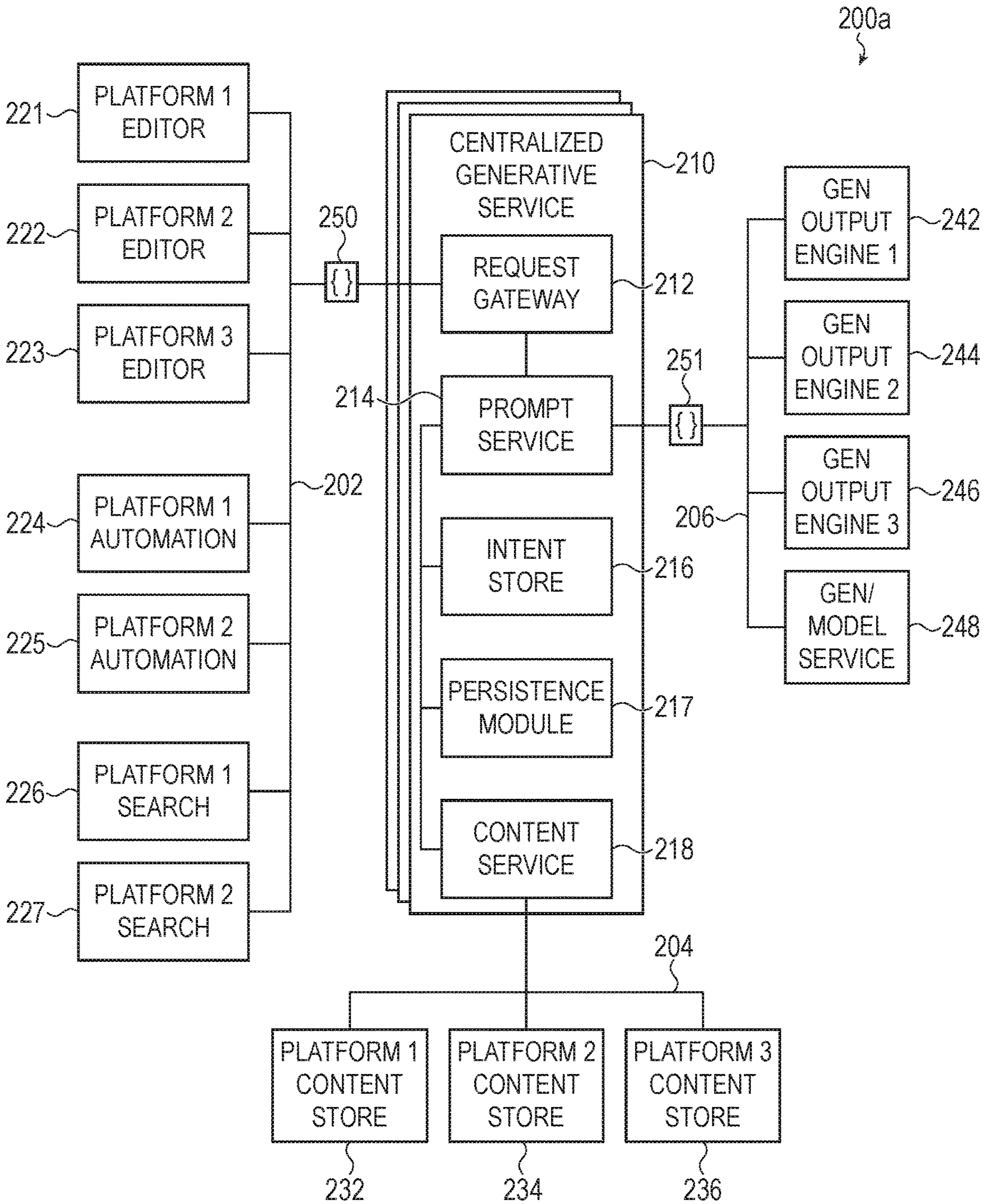
FIG. 2A depicts an example system for providing generative content for multiple modules or platforms.

FIG. 2A depicts an example system for creating generative content using a central generative service. In particular, the system 200*a*, leverages a central generative service 210 in order to service generative requests from multiple platforms and multiple services operating in each of the respective platforms. The central generative service 210 may use a predefined request schema 250 to service requests from a number of different platforms and services. The request schema defines a set of elements and a predetermined sequence of the set of elements that can be used to specify the parameters of a request for generative content using a uniform or standardized format. Further, the request schema provides for flexibility in multiple elements so that the same schema can be used to service a wide variety of requests and produce generative content for a wide range of use cases.

In the present example the system 200*a* includes a central generative service 210 that services requests from a number of services and modules 221-227 of a number of different platforms. Each of the modules 221-227 can provide a (generative) response request using a request element formatted in accordance with the predefined request schema 250, as described herein. In response to each request, the central generative service 210 is able to extract context for the request from one or more platform content stores 232, 234, 236. The context may provide the subject matter of the request or other material that can be used to construct prompt. Using information specified in the response request by a respective module 221-227, context extracted from a platform content store 232, 234, 236 and predetermined prompt text, the central generative service 210 constructs a unique or specialized prompt, which is provide to one or more of the generative output engines 242, 244, 246 or services 248. In response, the generative output engines 242, 244, 246 or services 248 produce a generative response or generative output, which is relayed back to the respective module 221-227 or platform by the central generative service 210.

Be using a response request having a predetermined request schema, the central generative service 210 is able to produce a prompt that is tailored to each platform or use case while maintaining a uniform interface for the request. An example request schema may include a default or standard set of elements that can be used by each respective module 221-227 to request any number of different types of generative content, as described throughout this specification. An example schema is depicted in the Example Schema, below. The actual elements of a schema may vary depending on the implementation and may include more elements, fewer elements, or different elements than depicted in the Example, Schema, below.

```
{
  "system_intent" or "intent_schema_id," <system intent value or
  identifier>
  "user_intent" or "user_instruction," <user intent value>
  "context" or "resource_locator_value," <value or resource locator value>
  "model_id," <model value>
  "streaming_flag," <streaming value>
  "chunking flag," <chunking value>
  "ethical filter," <ethical filter value>
  "variation value," <variation value>
  "max_output," <max character value>
  "context_auth," <token or reference to authentication data>
}
```

Example Schema

The example schema, shown above, may be define a set of key-value pairs along with other information, which can be used to specify the various elements used to construct a prompt. The schema may be defined in each of the respective modules or platforms 221-227 and may be used to define application programming interface calls between the respective modules or platforms 221-227 and the central generative service 210. As described in more detail below, the schema may also provide for use of an authentication token or other authenticating information that can be used to obtain content from secure content providers. Other implementations may also specify a user identifier, user role, platform identifier, or other information extracted from a user's current session on a respective module or platform 221-227.

As shown in the example schema, above, a request may include a system intent, which may be represented by a string of text or may include an intent_schema_id (intent schema identifier) that references one or more preconfigured intent schemas managed by the intent store 216. In general, the system intent may specify the role of the LLM, tone or format of the response, and provide a set of instructions that correspond to the command or the action requested in the respective platform or module that generated the response request. For example, a system intent may specify, "you are a helpful assistant being requested to answer a request regarding content of a document." In another example, the system intent may specify, "you are a technical consultant for a software-based project written in C++." The system intent may be adapted in accordance with the requesting platform or a common or shared system intent may be shared across multiple platforms. Example commands that may correspond to the system intent are described throughout the specification with respect to specific examples and use cases. The system intent may also include a set of examples and/or example input-output pairs that provide example output and format for generative output that is expected by the requesting platform. As described herein, the input-output pairs may specify a platform-specific structured query format, a platform-specific or editor-specific rich text format, and/or a specified format that can be used by the system to create platform-specific objects like issue objects, task cards, projects, and other items. In some cases, the input-output pairs provide example levels of technical detail or an expected expertise of the reader.

The system intent, including the command, input-output pairs, and other content may be stored in the intent store 216 of the central generative service 210. The intent store 216 may include preconfigured or predetermined system intent portions of the prompt that can be accessed using a intent_schema_id or other identifier. The intent store 216 may include a database or table of system intent snippets that may be used by the prompt service 214 to create or assemble a prompt. More than one stored system intent may be used to produce a custom or composite system intent portion of the prompt. In some cases, a natural language input received in the response request may be combined with a prestored system intent, referenced using a respective schema identifier or system intent identifier. In this way, the system intent element of the request schema can be used to address a wide range of different system intents and instructions for the creation of the generative response. The system intent may be a string value type if it includes text and may be a float or other value type if it includes a pointer to or identifier of a file or other resource containing the user intent.

As shown in the example schema, above, a request may include a user intent, which may be represented by a string of text that is extracted from or based on a user input provided to the respective module or platform 221-227. In some cases, a natural language user input provided to a field or other input region of a graphical user interface of a respective module or platform 221-227 may be extracted and, at least a portion of the natural language user input may be used as the user intent. In some cases, the natural language user input is processed using one or more natural language processing techniques to produce a semantic inquiry phrase, which is used as the user intent. In some other cases, a trained machine learning model may be used to select or predict a user intent based on the natural language user input. Use of a trained machine learning model like a bidirectional transforming model can help normalize the user intent across a range of user language, which may vary in quantity and quality. Use of natural language processing (without a machine learning model) may allow for increased user control or influence over the results. As discussed above, with respect to the system intent, the user intent may also include examples and example input-output pairs that may be used to direct the generative output engine or other service to produce an output more closely correlated to a form used by the respective module or platform 221-227. The user intent may also include context regarding the user or the user session. For example, the user intent may include the role of the user, a job title of the user, a current project, team, or portions of a user's profile for the respective platform. The user intent may also include information extracted from the user session including, for example, a snippet of the current content, a content title, content author, platform content currently viewed or recently viewed, and other similar context information. The user intent may be a string value type if it includes text and may be a float or other value type if it includes a pointer to or identifier of a file or other resource containing the user intent.

As shown in the example schema, above, a request may include what is referred to as context, which may be represented by a string of text or may include a resource locator value. The context typically includes electronic content that is to be analyzed by the generative output engine or other service. For example, a command like "summarize" may be directed to a particular object, such as a page, document, issue object, or other object. The context indicates the electronic content which is the subject of the command and may include an express text snippet, full text portion, or may include a pointer or content identifier to the respective content, which can be used to extract the content using the content service 218.

As shown in the example, above, a resource locator value may be used to indicate a location of a content item that is to be used as the context of a request. The resource locator value may include an address and/or may include a unique identifier that allows the content service 218 to identify a platform and a content item or other object hosted by the platform in order to extract the respective context. As shown in FIG. 2A, the content service 218 may be configured to obtain content from one or more content stores including, for example, the content store 232 of platform 1, the content store 234 of platform 2, and the content store 236 of platform 3. Each of the platforms may be associated with a different type of content or service. For example, platform 1 may include a documentation platform that manages or provide electronic pages or documents to authenticated users, as described herein. Platform 2 may be an issue tracking platform that manages issues or issue objects as they are processed in accordance with respective workflows or processing states. Platform 3 may include a codebase platform that includes source code and related documentation. Other platforms include task management platforms, project management platforms, user or project directory platforms, and other platforms described herein. If the content item or requested object specified by the resource locator value is hosted by the same platform initiating the response request, the object or content item may be characterized as being internal or native. If the content item or object specified by the resource locator value is hosted by a platform that is different than the platform initiating the response request, the object or content item may be characterized as being an external object or content item.

The content service 218 may obtain portions of the hosted content using an application programming interface call that includes the resource locator value or a value derived therefrom. As described in more detail below, the content service 218 may also be configured to manage permissions for obtained content and pass an authentication token or other authenticating information to the respective content stores 232, 234, 236 in order to obtain secure content.

The context may include an aggregation of multiple content items or text snippets, as specified in the response request. For example, the context may specify a list or array of resource locator values and/or text snippets that may be assembled together to provide the context. As described in more detail below, the context may also include rich text or special formatting that is processed in order to preserve the formatting or enable an output that can be converted back into a rich text or formatted content native to the requesting platform. The context may be a string value type if it includes text and may be a float or other value type if it includes a pointer to or identifier of a file or other resource containing the context. The As shown in the example schema, above, a request may include a model, which may be represented by a string of text or may include a model identifier. The model value indicates which generative model, LLM, or other service (e.g., 242, 244, 246, 248) is to be used to service the request. Each model 242, 244, 246, 248 may be adapted to handle a particular type of request. For example, models 242, 244, 246 may each be large language models but each may use a different corpus or token set that may be adapted for use with a particular subject matter or type of response. Additionally, other generative services 248 may also be used, which may include other types models, which may include transformer models, neural networks, and other types of machine learning trained models. Each model may be specified by a value that includes a string or identifier that corresponds to a model that has been registered with the central generative service 210.

As shown in the example schema, above, a request may include a chunking flag. The chunking flag may be a binary flag (e.g., "Y"/"N" or "0"/"1") or other value that indicates whether a chunking feature is enabled for the current request. Depending on the model (242, 244, 246, 248), a token limit or request size threshold may limit the amount of content that can be delivered to the model in a single prompt or request. For context that references electronic content that exceeds a size threshold (e.g., character or token limit) associated with the respective model (or if the combined total size of the prompt is predicted to exceed the size threshold), the request may be handled using a series of smaller prompts. Specifically, if the chunking flag is set to "yes," the central generative service 210 is permitted to construct a series of prompts in order to respond to the response request in the case where the prompt size is predicted to exceed the model's input threshold. For example, the central generative service 210 may generate a first prompt that includes a first portion of the electronic content that may be extracted from the context object or associated content. The central generative service 210 may then generate a second prompt that includes a second portion of the electronic content, different than the first portion, that is extracted from the context object. The first and second prompts may be below a partitioning threshold, which may be determined by the central generative service 210 based on an estimate of a total prompt size as compared to a model limit. That is, the partitioning threshold will be less than the character or token limit for a given model in order to allow for other prompt language in addition to the context data. Additional prompts may be necessary depending on the size of the context to be processed. Each prompt may be provided to one or more of the models 242, 244, 246, 248 and each prompt may cause each model to produce a corresponding generative response, which is transmitted back to the central generative service 210.

With regard to the chunking operation, because each generative response only operates on a portion of the overall context or electronic content, the multiple generative responses may be combined to produce a composite generative response. There are multiple techniques that may be used to produce a composite generative response. In one example, content from each of the multiple generative responses may be combined to form the composite generative response. In some cases, analysis is performed on the multiple responses and redundant or overlapping language may be removed. In other cases, portions of each adjacent (preceding and/or following) generative response is included in the prompt in order to provide more continuity between responses. In one implementation, a portion of the preceding generative response is included in a subsequent prompt with an instruction to continue the narrative provided. In another implementation, joining or segue passages may be generated using prompts that include both preceding and following generative responses. The resulting generative responses may be concatenated or otherwise combined to form the composite generative response.

As shown in the example schema, above, there are a number of other values or flags that can be used to control other aspects of the generative response. For example, a response request may include a streaming flag, which may be a binary value that indicates whether the response should be delivered as a series of small snippets that can be displayed in the graphical user interface of the requesting platform. In some cases, the snippets are displayed before the final portion of the generative response is created, which give the user the appearance that the generative response is being created in real time. In other cases, larger portions of the generative response are generated and broken into smaller snippets for display in series on the graphical user interface, which may provide a more uniform performance and protect against lags in network response rates or delays caused by the generative engine.

The example schema may also include an ethical filter flag, which may be a binary value that can be used to control the use of an ethical filter. As discussed elsewhere in the present disclosure, the system may employ an ethical or other policy filter that blocks requests or suppresses the display of responses that are predicted to be directed to harmful, inappropriate, or unsafe content. The ethical filter may suppress or block the generation of a generative response for content that is deemed inappropriate for use on the respective platform or in a professional work setting, content that is potentially sensitive and may be directed to sensitive topics like violence, self-harm, or illegal activities. Alternatively or additionally, the same or a similar flag may be used to block requests for personal information, requests that are directed to an improper bias or subject matter, or otherwise indicate potential misuse of the system. In some instances, the ethical or policy flag is used to implement a filter or control that is produced in accordance with a platform-specific or tenant-specific policy.

As shown in the example schema, above, a request may include variation scalar and a max output value. The variation scaler value may be a float type value that ranges from 0 to 1.0. A larger variation scaler may cause the generative response to produce a wider range or greater variation in response language given the same or similar prompt. For example, a larger variation scaler may produce results that include a broader or wider variation in the language of the response and/or format of the response. A larger variation may be useful when simulating a human-like interaction since humans rarely produce identically phrased responses to the same question. Conversely, a smaller or lower variation may be useful when it is predicted that a more precise or consistent answer would be more helpful for the corresponding platform command. A more uniform and consistent response for some commands or functions can give the user increased confidence in the reliability and accuracy of the result. Generally, the variation scaler may be fixed with respect to a particular system intent or command that is initiated on the module or platform 221-227. However, in some implementations, the variation scaler may be influenced by or determined, at least in part, by the user initiating the request or the tenant that is associated with the platform. This allows the user and/or enterprise to adjust the variation scaler to suit their user's expectations and typical use cases.

The example depicted above also includes a max output element, which may include a float type value designating the maximum number of characters to be used in the generative response. The max output may be designated by the requesting module or platform and may allow the result to be displayed within a predefined field or region of the graphical user interface. The maximum output may also be used to specify the conciseness or depth of the response, which may also be tailored for a specific use case or command in the respective module or platform.

As shown in the example schema above, the schema may also allow for the passing of a token or other authentication information for use in obtaining content from one or more of the content stores 232, 234, 236. In one example, if the requesting platform and the platform providing the context content share an authentication scheme or a trusted authentication key, the data object included in the response request may include an authentication token that is recognized by both platforms. For example, the token may include a Java Web Token (JWT token) or other similar authentication information that is generated in response to a successful authentication of a user or user account on one of the platform using the shared authentication scheme. In response to receiving the data object containing a resource locator value, the content service 218 may use the token passed in the request to formulate a request for the respective (context) content on a respective content store 232, 234, 236. In accordance with the authenticating user having permission to access the respective (context) content, the respective content store 232, 234, 236 provides the content or access to the content. The user must have a permissions profile (e.g., role or other account characteristic) that is consistent with a permissions profile of the requested action (e.g., at least read permission) for the requested object or content. This ensures that the central generative service 210 cannot be used to circumvent existing system security and permissions controls. In some cases, a pointer to the token or other authenticating information is passed rather than a copy of the token. Other schemes may also be used to authenticate users across multiple platforms including the use of a trusted third-party authentication system or other authentication systems.

The example schema, depicted above, may vary depending on the application and may include additional fields or few fields than shown in this specific example. A schema similar to the example described above may be used to define a similar schema in each of the respective modules or platforms 221-227 when providing generative services or commands. The resulting data object 250, also referred to herein as request payloads or request data objects. The order of the elements in a particular request payload or data object 250 may vary and the contents of the object may vary depending on the platform and the generative command that was invoked causing the transmission of the response request. On the receiving side, the central generative service 210 may have a corresponding schema definition, which can be used to interpret and process these data objects transmitted with the response request. The central generative service 210 may access individual elements in the data object 250 using the defined schema and may not be reliant on the element order or omission of one or more non-critical elements.

As shown in FIG. 2A, the central generative service 210 may include a single instance or multiple instances that are each being executed on different hardware platforms. Each of the multiple instances may be adapted to handle requests from a distinct geographic region or may operate in parallel to provide for increased capacity during periods of high demand. In the example of FIG. 2A, the central generative service 210 includes a number of different modules or elements that are adapted to handle different portions of the request and provide the generative response. Specifically, the central generative service 210 includes a request gateway 212 that receives response requests from one or more of the modules or platforms 221-227. The request gateway may be configured to receive application programming interface calls from the modules or platforms 22-227, which may include the request payload or request data object 250 formatted in accordance with the predefined request schema.

In response to receiving the response request including the corresponding request data object 250 (formatted in accordance with the predefined request schema), the central generative service 210 may use the content service 218 to obtain any context data identified in the request. A described previously, the context data may be identified by a resource locator value in the request data object, which may correspond to data hosted by one or more of the content stores 232, 234, 236. As discussed previously, the content service 218 may use a token or other authentication information provided by or reference by the response request in order to obtain secure content from the respective one or more of the content stores 232, 234, 236. The context service 218 may, for example, provide an application programming interface call to a respective one or more of the content stores 232, 234, 236, which provides the authentication token (actual token or reference to a token) and at least a portion of the resource locator value. In response to receiving the electronic content from the respective one or more of the content stores 232, 234, 236, the electronic content may be used by the prompt service 214 to generate the respective portion of the prompt.

Also in response to receiving the response request, the central generative service 210 may be configured to extract portions of the system intent from the intent store 216 or from the request itself. As discussed previously, the system intent may include an intent identifier or other identifier that corresponds to a predefined system intent that may be leveraged across platforms and user cases. In some cases, the central generative service 210 may store inbound system intents and return a unique identifier that can be used to access the same system intent portion in future requests. The retrieved or extracted system intent is then added to the prompt by the prompt service 214.

The central generative service 210 also includes other modules like the persistence module 217, which may store portions of previous exchanges with the central generative service 210 during the same session or a recent session in order to facilitate more conversational or chat-based exchanges with the service. For example, a cached amount of previous request and generative responses may be stored in a chronological, indexed, or other similar fashion and recalled for use with subsequent responses. A subsequent request may simply reference an earlier request or response by asking, "how many issues depend from that project" without making an express reference to the project. The prompt service 214 may query the permissions module 217 for the additional context needed to complete the user intent when formulating the subsequent prompt. This allows a more natural conversational-like exchange between the user and the service without having to repeat key information or context used throughout a series of exchanges.

The data stored in the permissions module 217 may be walled off or partitioned by user to avoid inadvertent disclosure of secure data between multiple users. Furthermore, the cache or data stored for a particular session or series of sessions may be limited to ensure that authentication is current and permissions have not changed over the course of an exchange. In some cases, data is cleared from the persistence module at the end of every session with a particular user and/or at regular intervals.

As described with respect to multiple examples provided herein, the prompt service 214 assembles or generates a text-based prompt based on the data received in the response request or data extracted in response to the response request. The prompt may be formatted in accordance with a predefined prompt format to ensure that the inserted portions can be parsed by the respective model or service. The prompt service 214 provides the prompt 251 to one or more of the generative output engines or services 242, 244, 246, 248 using an application programming call or other similar communication scheme. The prompt 251 includes a payload that is formatted in accordance with a schema defined by a respective one of the generative output engines and services 242, 244, 246, 248. In some cases, one or more of the generative output engines or services 242, 244, 246, 248 are operated by third party entities and, as a result, may be referred to as an external generative output engine or service. In some cases, one or more of the generative output engines or services 242, 244, 246, 248 is operated by the same entity that operates the central generative service 210 and, thus, may be referred to as an internal generative output engine or service. Also, as described previously, the generative output engines or services 242, 244, 246, 248 provide a generative response in response to a respective prompt. The respective generative response may be related to the corresponding module or platform 221-227 by the central generative service 210. In some cases the central generative service 210 performs additional validation or post-processing operations on the generative response before it is passed to the corresponding module or platform 221-227. The resulting response is generally displayed in the graphical user interface of the corresponding module or platform 221-227 or is otherwise consumed by the requesting module or platform.

Other elements may be included in the central generative service 210 or may be accessible to the central generative service 210 including a indexed or vectorized content like a knowledge base store, codebase store, or issue store, which may be used to provide content for the prompts. The central generative service 210 may also include a knowledge graph or other relational data store for system intent, context, or other elements used to generate a prompt. The central generative service 210 may modules or services that are adapted to interact with other system elements described herein in order to provide enhanced or modified functionality.

The system 200*a* of FIG. 2A can be used to provide generative content for a wide range of platforms and modules 221-227. For example, the central generative service 210 may interface with an editor of a number of different, distinct platforms (e.g., 221, 222, 223). Each of the editors may be a platform-specific module or, as described herein, may be provided as a centralized editor service that is leveraged across multiple different platforms. As shown in FIG. 2A other modules, including automation modules 224, 225 and platform search modules 226, 227, each deployed on different respective platforms may access the same central generative service 210 using a response request, discussed above. Multiple example frontends and graphical user interface examples are provided throughout the specification and may leverage the system 200*a*, as described herein.

As also shown in FIG. 2A, each of the modules or platforms 202 may be operably coupled to the central generative service 210 by a network 202, which may include a publicly available network like the internet. In some implementations, the network is an internal network or private network connection between one or more of the modules or platforms 221-227 and the central generative service 210. The system may also include network 204 for operably coupling the central generative service 210 with one or more of the content stores 232, 234, 236. The network 204 may be the same network as network 202. Similarly, the central generative service 210 may be operably coupled to the generative output engines and services 242, 244, 246, 248 by the network 206. In implementations in which the generative output engines and services 242, 244, 246, 248 are external, the network 206 may be a public network that includes the internet.

Figure 2B:
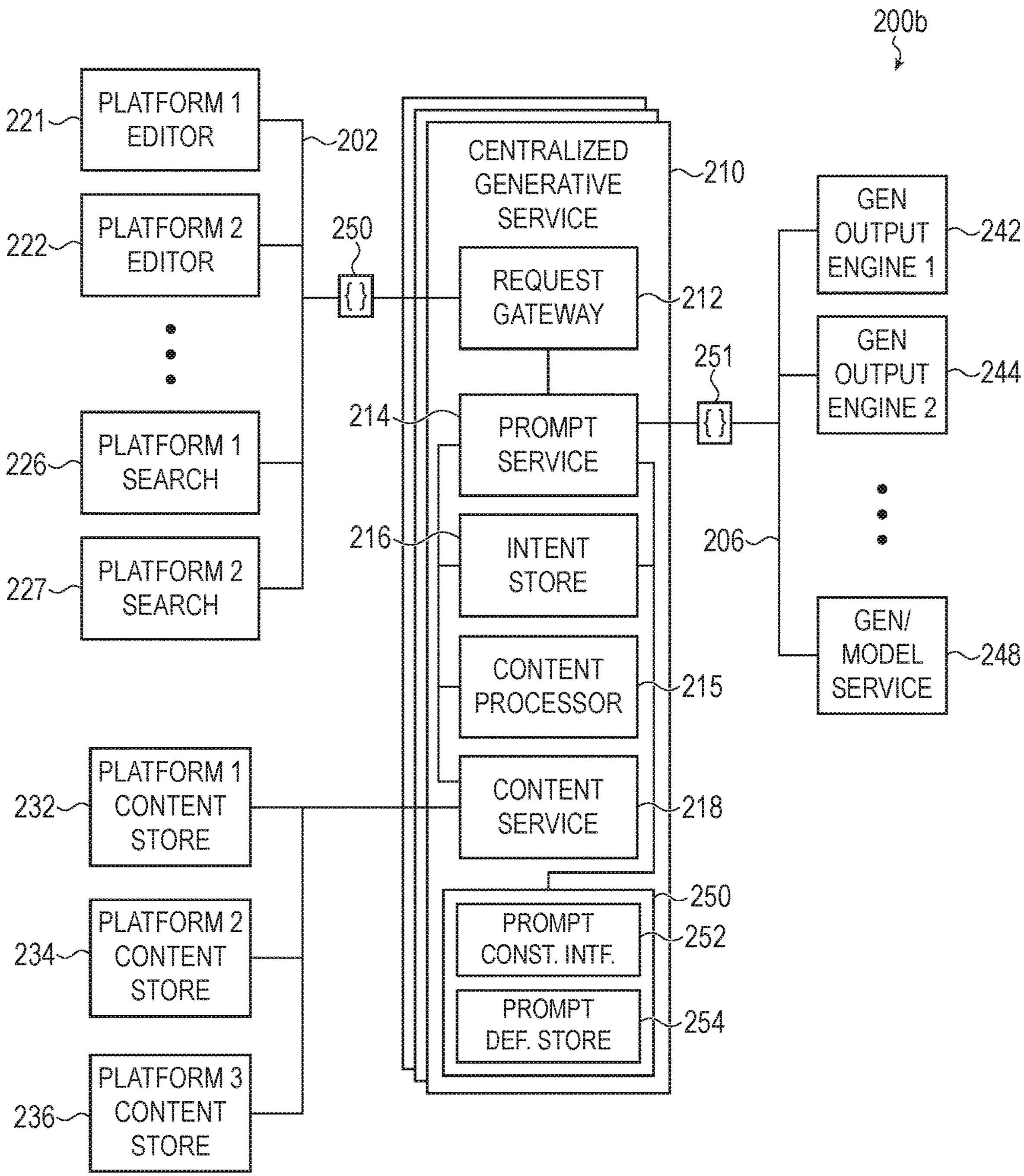
FIG. 2B depicts another example system for providing generative content for multiple modules or platforms.

FIG. 2B depicts another example system for providing generative content for multiple modules or platforms. Specifically, FIG. 2B depicts a system 200*b* that includes a central generative service 210 similar to the example described above. In this example, the central generative service 210 includes a prompt form or prompt text generation service 250 that is configured to generate and store complete and partial prompt templates or prompt portions that are stored in the intent store 216 for use by the prompt service 214 to produce generative content. The prompt form or prompt text generation service 250 may be referred to herein as a prompt generator 250. Other elements of the system 200*b* depicted in FIG. 2B may be substantially similar to the similarly numbered elements of system 200*a* described above with respect to FIG. 2A. A description of these shared elements is not repeated to reduce redundancy and improve clarity.

With respect to FIG. 2B, the prompt generator 205 enables the production of consistent and effective prompt templates and forms while also providing a wide range of functionality for use with a variety of modules and platforms 221-227. In some implementations, the prompt generator 205 includes a prompt generation or prompt construction interface 252 that allows the user to generate a prompt definition. The prompt construction interface 252 may include an editor or other interface for receiving user input. The editor may include an editor similar to the editor examples provided herein in which a user may enter user-generated content using a keyboard, trackpad, mouse, or other input device. In some implementations, the editor is specialized for receiving script language or source code and includes formatting, layout, static analysis, and other functionality that may facilitate user input of code or script content. In some implementations, the editor or other interface includes selectable controls and/or drop-down selection fields that allow the user to select predefined options associated with a particular field.

Using the prompt construction interface 252, the user may create a prompt definition that specifies a set of predefined prompt definitions stored in the prompt definition store 254. The user may define a series or prompt selections, each prompt selecting designating a predefined system definition of a respective prompt definition in the prompt definition store 254. The prompt selections may be entered as text into the prompt construction interface 252 or then may be selected from a drop-down menu or via another graphical user interface element. The prompt selections may include a definition name, definition identifier, or other information that can be used to specify which prompt in the prompt definition store 254 is to be used in the current prompt definition. For example, the prompt selection may be entered as a key-value pair or set in which the key specifies a name or indicator of the portion of the prompt being defined and the value includes a set of characters (e.g., letters and/or numbers) that specify the definition stored in the prompt definition store 254. Example keys include a system prompt designation, a use prompt designation, a context prompt designation, an example set prompt designation, and other similar designations. In some cases, the user prompt designation is used to specify a range of different prompt definitions, which may be used to formulate the user intent or other portion of the prompt definition.

The prompt definition store 254 includes a set of definitions that can be referenced or called by the main prompt definition constructed using the prompt construction interface 252. For example, the prompt definition store 254 may include definitions that specify: task instructions, language instructions, formatting constraints, additional constraints on generation; reasoning constraints, and other definitions. The definitions included in the prompt definition store 254 may include system intent definitions, user intent definitions, predefined example sets, formatting instructions, and other definitions that can be used to define a portion of a prompt. The system intent, user intent, example sets, formatting instructions, and other definitions may be defined in accordance with many of the examples described herein.

As discussed above each definition may be stored or identified using a definition identifier, which may be referenced as a value in the key-value pair sets of the main prompt definition. Each definition includes a text payload or snippet, which may be inserted into the main prompt when the main prompt definition is executed or performed. The definitions may also include comment portions, logical operators, and a nested or hierarchical arrangement of prompt options or prompt content. In some cases, a single prompt definition or document may include multiple sub-definitions that may be referenced or called using a corresponding hierarchy of definition identifiers. The definitions included in the prompt definition store 254 may also include placeholders or wildcard elements that allow for request-specific values or text to be used in the resulting prompt. The placeholders may be designated using a special character or string that is associated with placeholder elements, which may be preserved when the definition is included in a resulting custom prompt form.

One the main prompt definition has been completed and/or all of the desired prompt selections have designated respective prompt definitions, the main prompt may be executed or operationalized to generate a custom prompt form that can be stored in the intent store 216. For example, the main prompt definition may be formatted as a script or source code that defines user entered prompt selections or respective definitions. Execution of the script using the prompt construction interface 252 or other element of the prompt generator 250 or other element of the system may extract the text payload from each respective definition referenced in the main prompt definition and add the respective text payloads to the custom prompt form. The resulting custom prompt form typically includes any placeholders or other wildcards designated in the respective prompt definitions, which may be used by the prompt service 214 to insert request-specific values received in a response request 250. The custom prompt form may also include commentary, formatting structure, and other content contained in each respective prompt definition. In some cases, the custom prompt form is stored in a specified format, which may include an HTML format, FTL formal, language-specific script, or other format.

The resulting custom prompt form may include various portions that have been generated in accordance with the selected prompt definitions. a system intent portion generated in accordance with system prompt selection for the particular prompt definition. For example, the custom prompt form may include a user intent portion generated in accordance with the first user prompt selection of the particular prompt definition. The user prompt portion may include one or more placeholders that can be used to insert at least a portion of the user input received in a response request. The custom prompt form may also include an example set generated in accordance with the second user prompt selection of the particular prompt definition. In some implementations, the custom prompt form includes formatting instructions generated in accordance with the third user prompt selection of the particular prompt definition. Other portions may be generated with other respective prompt definitions specified or selected with respect to the main prompt definition.

Once stored, a particular custom prompt form can be accessed by the prompt service 214 in response to an inbound response request 250 received from a respective module or platform 221-227. Similar to previous examples described above with respect to FIG. 2A, the response request 250 received at the request gateway 212 may include content that can be used to identify one or more prompt forms or other prompt language stored in the intent store 216. A unique prompt identifier or intent identifier may be used to access the respective prompt or prompt portions from the intent store 216. In some implementations, identifying the particular custom prompt form includes extracting a platform identifier and a command identifier from the response request. A query including the extracted platform identifier and/or command identifier may be served to the intent store in order to retrieve the respective custom prompt form. In another implementation, identifying the particular custom prompt form includes extracting a prompt identifier from the response request and submitting a query to the intent store using the extracted prompt identifier. In another implementation, the response request includes a user role identifier and identifying the particular custom prompt form is based, at least in part, on the user role identifier. For example, the response request may include an identifier specifying a role (e.g., user-permissions role, job position, job title), which may indicate a level of technical knowledge or detail that the user expects to receive. The system 200*b* may generate and store prompt forms that have boon configured to produce a specific level of technical detail or explanation in accordance with a particular role.

Similar to previous examples, a content service 218 may be used to access context or other electronic content from one or more content stores 232, 234, 236, which may be inserted into the prompt. Also similar to previous examples, the prompt service 214 having the constructed or generated prompt content may provide the prompt to one or more generative output engines or services 242, 244, 248, which may produce a generative response. The prompt may be provided via an application programming interface call 251 communicated over a computer network. The generative response or a portion thereof may be relayed back to the respective module or platform 221-227 by the central generative service 210.

The example system 200*b* also includes a content service 218, which may perform additional pre- or post-processing on the response request 250, the prompt, or the response request. The content service 218 may handle platform-specific, editor-specific, or other non-text content in order to enable processing using text-based generative output engines or services. Operations of an example content service 218 is described in more detail below with respect to FIG. 4 and the results are described below with respect to graphical user interface of FIG. 5.

The example of FIG. 2B depicts only an illustrative example of a system 200*b* and an actual implementation may include fewer or more elements than those depicted in this example, for example, in accordance with other examples described herein, additional preprocessing or post-processing operations or modules may be included or integrated with the system 200*b*. Specifically, an ethical or policy filter or validator may be used to evaluate response requests, prompts, or generative responses to ensure that the content conforms with ethical guidelines or policies associated with the enterprise or tenant.

Figure 3:
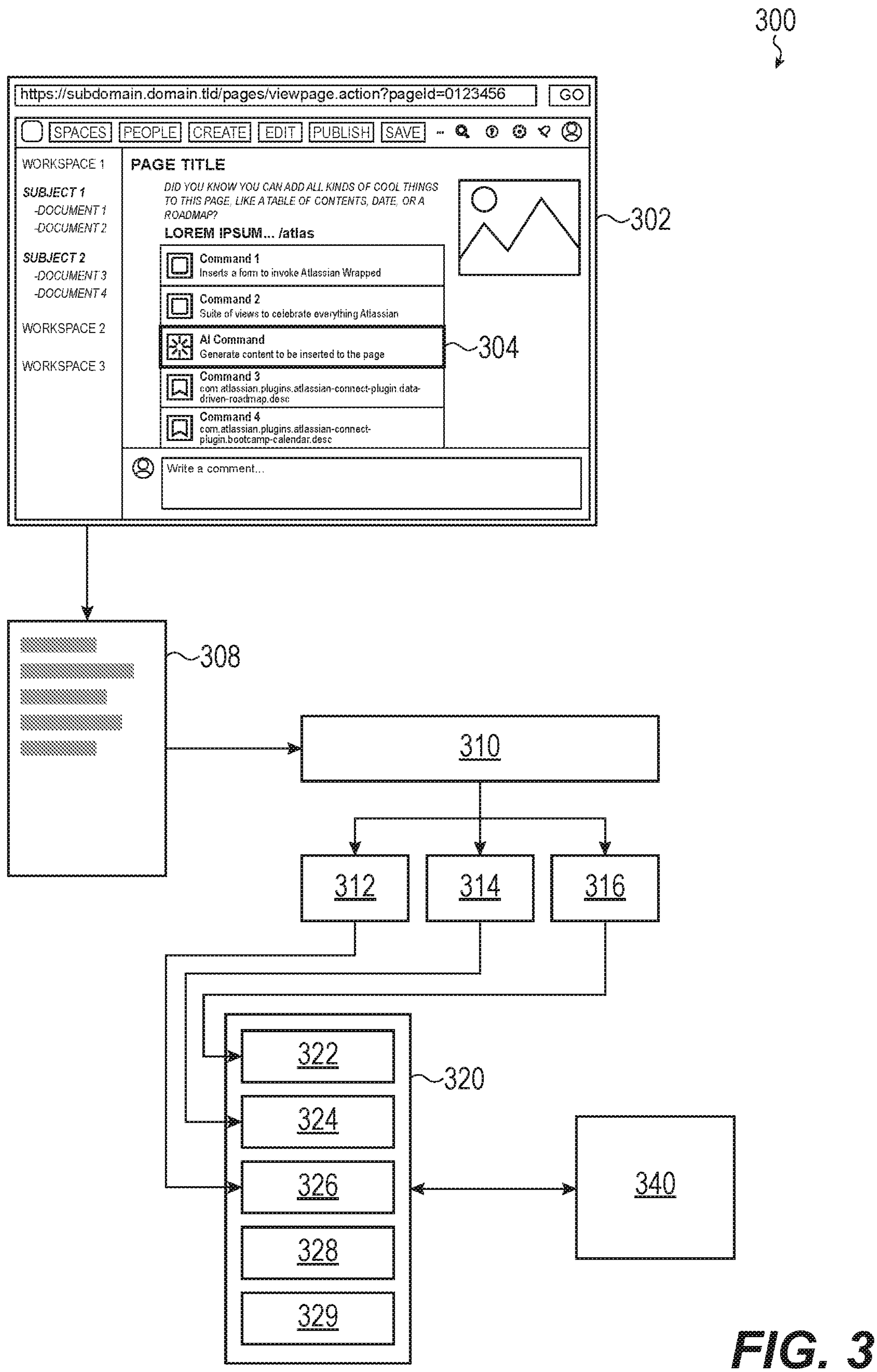
FIG. 3 depicts an example process flow for providing generative content.

FIG. 3 depicts an example process flow for generating generative content using a role-based prompt. The process flow 300 may be used to produce a more accurate or more relevant generative response by partitioning user context and/or user intent into different role-based definitions or elements of a prompt. The process flow 300 may be particularly effective for generative output engines or services that use a role-base definitions or a similar format for inbound prompts. For example, a generative output engine may define a schema or request format in which prompt input is assigned to one of a set of prompt key-value pairs or definitions, which may be described as being associated with a particular role or portion of the prompt. As described herein, the term "role" may be different than a user-based or account based role and is more specifically directed to the purpose or role of a particular portion of a prompt when providing an inquiry to a generative output engine or similar service. For example, the prompt may define a "system role" definition for a message which may be used to provide general instructions or role of the LLM in responding to the query. For example, a system role may be used to specify, "you are a helpful assistant for a documentation platform," or "you are being asked to generate structured queries that correspond to a text-based input." The prompt may also define a "user role" definition for the message, which may be used to specify a question or inquiry raised by a user, context related to the question or inquiry, special instructions for the form or format of the response, example input-output pairs, and other use specification. The different role-based definitions may be interpreted as separate messages by the generative output engine even when the multiple message definitions are combined in a single prompt or communication.

In some implementations, the accuracy or relevancy of the response may depend on how the user instructions are partitioned between the various role-based definitions or messages. In one case, if all of the user instructions are provided in a single user role message, some or all of the context may be ignored by the generative output engine, resulting in a generative response that may be less relevant or non-responsive to the user inquiry. In the proposed flow 300 of FIG. 3, a response request 308 or other user input generated in response to a command 304 entered at a graphical user interface 302, the system may generate a set of separate role portions 312, 314, 316 for different portions of the response request 308. Each of those separate role portions 312, 314, 316 may be used to create corresponding separate message definitions 322, 324, 326 in a prompt 320 that is provided to a generative output engine 340. Using this scheme may produce results that are more relevant to the user input or inquiry and may allow for more detailed instructions or context when requesting generative output.

As shown in FIG. 3, the process 300 may be initiated in response to a user input a graphical user interface 302. The user input may include a selection or designation of a generative command 304 and may also include user input and a designation of context content, which may include the current page or document or another content item. The content and structure of the user input may be in accordance with any of the wide number of examples provided here and is not limited to the simplified user interface 302 of FIG. 3.

In response to the user input, a response request 308 may be generated and provided to a generative service like a centralized generative service, as described herein with respect to other examples. The response request 308 includes a text payload and may or may not be formatted in accordance with a predefined schema or other format described herein. In this example, the response request 308 is analyzed by prompt service 310, which may be similar to or integrated with one of the prompt services described elsewhere with respect to other examples. The prompt service is configured to partition the text payload of the response request 308 into a set or role-based portion. Specifically, the content of the response request 308 may be analyzed to generate a set of role portions 312, 314, 316. The first role portion 312 may include a system role portion that includes text corresponding to a general instruction related to the generative command. A second role portion 314 may include a first user role portion and include text corresponding to the user input. A third role portion 316 may include a second user role portion including at least a portion of the electronic content. Of note, it may be particularly useful to separate user input (including the user inquiry, question or command) from content that is designated as context or is subject to the user input. Further, it may also be helpful to partition examples, formatting instructions, and other response instructions or context with respect to the user input. While only three example partitions 312, 314, 316 are used in this example fewer or more partitions may be used and still achieve satisfactory results.

As shown in FIG. 3, a prompt 320 is generated using the partitioned content. As described previously, in some instances, the prompt may include a series of distinct message definitions 322, 324, 326, 328, 329. At least a subset of the distinct message definitions may include content from respective partitions. In this example, a first message definition 322 includes content from the system role portion 312. Similarly, a second message definition 324 may include content from the first user role portion 314 and a third message definition 326 may include content from the second user role portion. Other role message definitions 328, 329 may include other content from the response request or content obtained or generated by the generative service 310.

Similar to other examples provided herein, the prompt 320 may be provided to a generative output engine 340, which produces a generative response, which may be relayed back to the frontend application and displayed in the graphical user interface 302. As described previously, the generative response may have a higher relevancy or improved responsiveness as compared to a generative response produced using a differently formatted prompt. Specifically, as discussed above, it may be beneficial to designate portions of a response request directed to the user inquiry or question separately from context content, examples, or other instructions or input.

Figure 4:
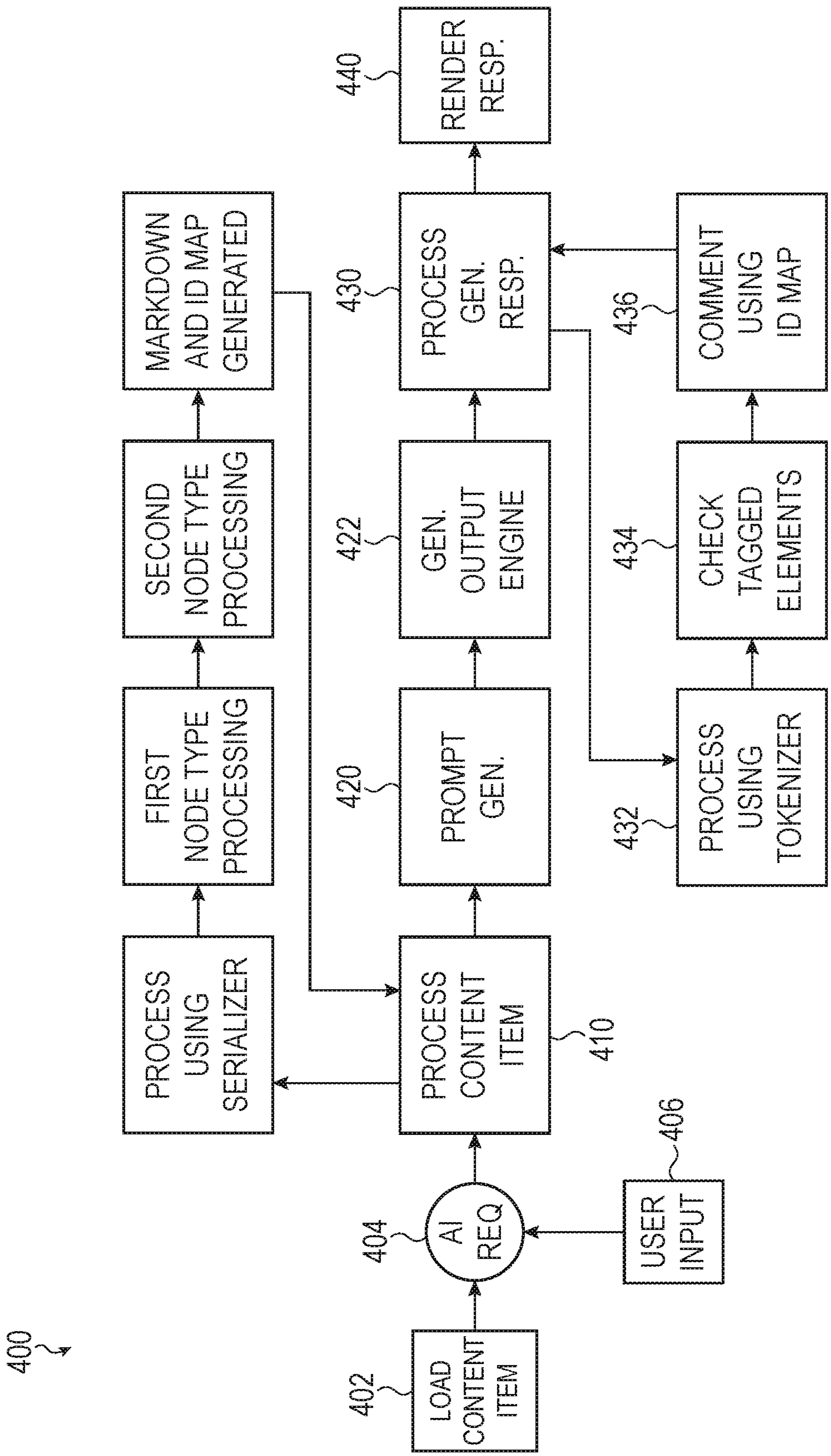
FIG. 4 depicts an example flow diagram for processing platform-specific or editor-specific content with a generative service.

FIG. 4 depicts an example flow diagram for processing platform-specific or editor-specific content with a generative service. As described with respect to many examples provided herein, the content to be analyzed or processed by a generative service may include platform-specific or editor-specific content that includes non-text elements. It may be beneficial to produce generative content that appears to be native content and also includes enriched content that the user may be accustomed to using. However, most LLM engines are primarily text based and nearly all are unable to process proprietary or special content like platform-specific or editor specific content.

Figure 5:
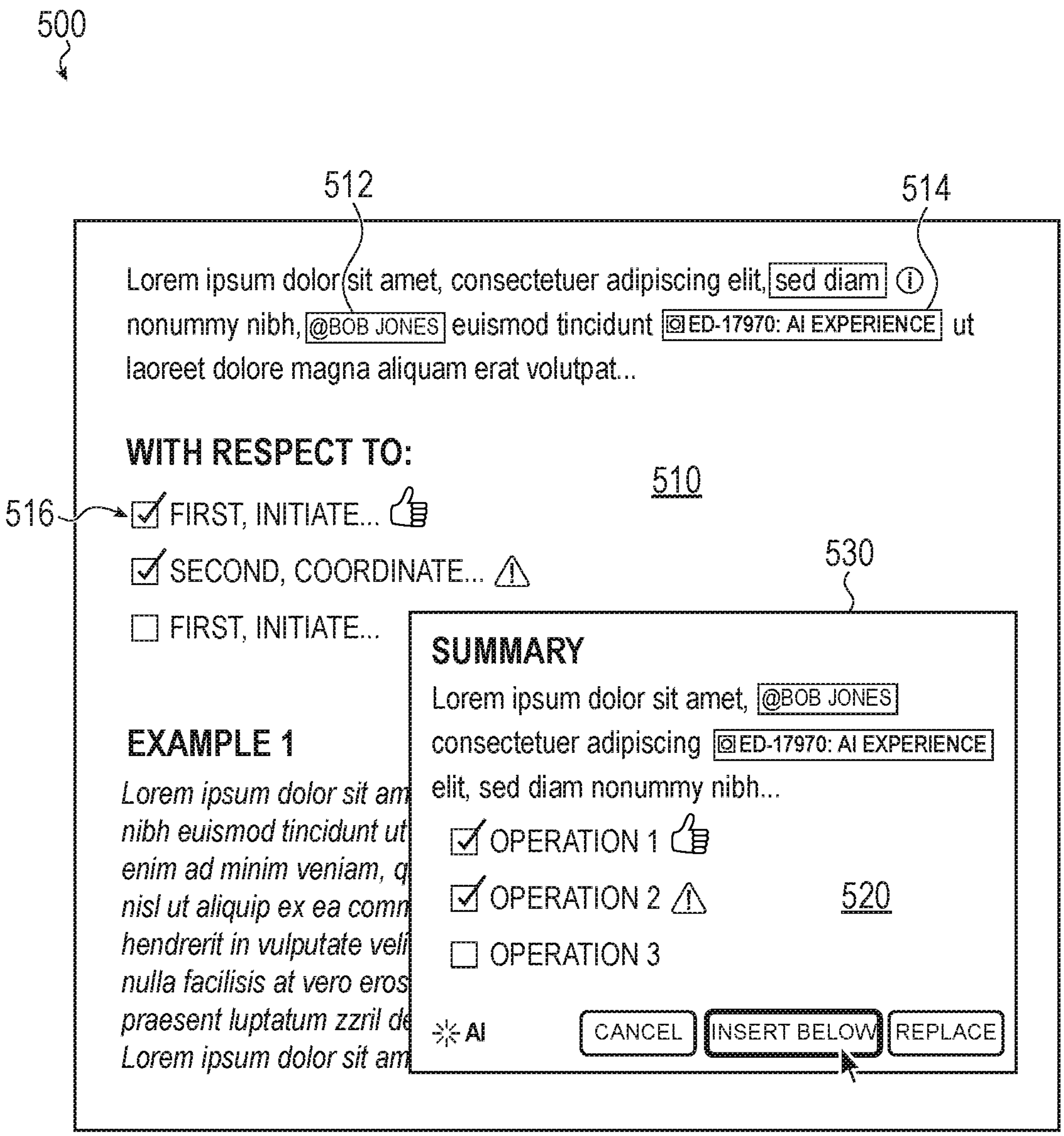
FIG. 5 depicts an example graphical user interface with platform-specific or editor specific content.

FIG. 5 depicts an example graphical user interface 500 of a content collaboration platform having user-generated content 510 that includes text and non-text objects in-line with the text. The non-text objects include mention objects 512, selectable graphical link objects 514, list element objects 518 and special symbol objects 518. These are merely illustrative examples and other implementations may include additional non-text objects including status objects, date objects, project objects, team objects, and other editor-specific or platform-specific objects. Generally, each of these objects may be stored in a node of the content of the content item (e.g., document, page, issue, directory entry), which may define a hierarchy of content nodes. When rendered by the platform or editor, these objects may be displayed in accordance with the object or node attributes, which may specify the visual appearance, content, and operation of the object. As an example, a selectable graphical object (also referred to as a smart link) may be encoded in the page using the following example node, which when rendered causes display of a selectable graphical object. In response to a user selection of the selectable graphical object, the user is redirected to a linked content item or URL. Note that in this simplified example, there is only one attribute (the "URL"). However in other implementations, additional attributes specifying the color, displayed text, status, and other elements may also be specified in the node.

```
{
  "type": "inlineCard",
  "attrs": {
    "url": "https://atlassian.c o m"
  }
}
```

As mentioned previously, extracting content that includes such objects may not be accurately parsed by a generative output engine using a traditional LLM. The process 400 depicted in FIG. 4 can be used to process platform-specific or editor-specific content and preserve the appearance and functionality of non-text objects in content generated using a generative response from a generative output engine.

As shown in FIG. 4, the process 400 includes operation 402 which may include loading the content item of a content collaboration platform. The content item may include a page, document, issue, directory entry, issue card, or other content item and may be displayed in an editor of the content collaboration platform. As discussed herein, the editor may be a centralized editing service that is shared across multiple platforms. The content item may contain user-generated content including text and non-text objects, which may include editor-specific or platform-specific objects, which may be displayed in-line with text content. FIG. 5 includes a graphical user interface 500 that includes user-generated content 510 including text and non-text content.

In operation 404, a user input 406 including a generative command may be received 404 at the graphical user interface. The user input 406 may include a selection of a control or text input that designates or is associated with the generative command. Multiple examples of both command controls (e.g., buttons) and text input including a special character (e.g., slash command input) are described throughout this specification and any of these examples may be performed as the user input 406. The user input 406 may also designate or identify at least a portion of the content, which will be subject to the generative command. For example, the user input may include a command to "summarize" and the subject of the command may be the entire content item or may be a selected portion of the content item (designated using drag-selection operation or other user input). In some cases, the user input may designate or identify a different content item that is subject to the generative command. The content item may be provided by the current content collaboration platform or may be provided by another distinct platform, as described in other examples herein.

In response to receiving the generative command 404, the system may process all of or a portion of the content item in operation 410. Operation 410 may include multiple sub-operations represented by operations 412, 414, 416, 418 and generally include analyzing the content of the content item subject to or identified in the generative command, identifying non-text objects (e.g., editor-specific or platform-specific objects) and generating an identity map with a set of entries corresponding to the identified objects. For example, in operation 412, the user-generated content of the content item may be processed using a serializer or similar text processing operation. Operation 412 may include parsing or processing the user-generated content to convert the nodes or structured data of the content into a string or other representation. The content processing may include converting formatted text, non-text objects, and other nodes of the content into a string of text which preserves the definition and attributes of the various converted elements. In some cases, operation 412 includes a set of rules for converting the document content into the string of text or other representation.

In operation 414, a first node type or content type is processed. For example, markdown or traditional HTML nodes may be identified and converted for use with a respective LLM or processing engine. For example, markdown nodes may be converted to elements that are supported by the generative output engine or service. In some cases, the generative output engine or service may have a more limited or a specified set of markdown elements that can be processed. Elements that are predicted to be unsupported by the generative output engine may be replaced with supported elements and the original items and associated attributes may be stored in the identity map (see operation 418).

Similarly, in operation 416 other nodes including editor-specific nodes, platform-specific nodes or other non-text content nodes may be processed. Specifically, in one example these nodes are identified and replaced with a tagged string that may be used by subsequent operations in the process 400 to reinsert the original node content and attributes. An example tagged string may include a leading tag, a content identifier, a text value representing the content of the node, and a trailing tag. An example tagged string corresponding to the selectable graphical object example discussed above is shown below.

<custom data-type="smartLink" data-id="id-1234">atlassian.com</custom>

Another example tagged string corresponding to a mention object is depicted below.

<custom data-type=" mention" data-id="id-1234">@ Bob Jones </custom>

The tagged string is typically initiated and completed with a designated string (e.g., "<custom" and "/custom>" respectively) which can be used to provide special handling instructions to the generative output engine or service. The tagged string also includes a content identifier (e.g., data-id="id-1234") which may be generated as the nodes are processed and may be unique only with respect to the process 400, as applied to the respective content item. Another content item or the same content item processed in response to being loaded on another client device may have similar but not necessarily the same content identifier. Thus, content identifiers are typically only unique with respect to given identity map. However, in other embodiments, a globally unique identifier or platform-specific identifier may be used. As a result of identifying and replacing the nodes in operations 414, 416, a modified version of the user generated content may be created, which may be used when generating the prompt in operation 420. The tagged string also includes a text value (e.g., "atlassian.com" or "Bob Jones") which may be generated using the original object. In some cases, the text value may be extracted from the original object or from an object linked to the original object. The text value extraction or generation may depend, at least in part, on the data type being evaluated and special rules or techniques may be applied to identify the most relevant or useful textual representation of the object. As discussed in more detail below, the text value inserted in the tagged string may be used by the generative output engine or service when evaluating a respective prompt and producing a respective generative response.

In operation 418, an identity map is generated. The identity map may also be referred to herein as an identity table or identity reference object. The identity map may include a set of entries that correspond to the nodes identified in operations 414 and 416. For example each entry of identity map may be associated with a respective editor-specific or platform-specific node identified in operation 416 and/or any specialized markdown content identified in operation 414. In some cases, the markdown content may be tracked or stored separately from the editor-specific or platform-specific nodes. Each entry may include a respective content identifier, which identifies the node uniquely with respect to other nodes or objects identified in the content. Each entry may also include the attributes of the corresponding node or object, which can be used to regenerate or reconstruct corresponding nodes for a respective response. In some implementations, a serialized version of the replaced node or object may be used in the identity map. Additionally a text value associated with or extracted from the replaced object may be included in the respective table entry. The text value may be the same text value used in the tagged string and may be used to confirm or validate a string in operation 434, for example. The identity map may be stored on the client device or stored on the backend and associated with a current frontend application session operating on the client device.

Returning to the main process flow, once a modified version of the content is generated using operations 412, 414, 416 and an identity map is generated in operation 418, the process proceeds to operation 420 in which a prompt is constructed. Similar to other examples described herein, a prompt may be constructing that includes predefined query prompt text that corresponds to the generative command and content that is subject to the generative command. In operation 420, rather than inserting the original content into the prompt, the modified version of the user-generated content (e.g., as processed using operations 412, 414, 416) is inserted into the prompt. Specifically, a version of the content that includes tagged strings in place of the specialized objects is used in the prompt. Additionally, special instructions may also be included in the prompt including instructions to preserve the tagged strings in any corresponding generative content. The instructions may include reference to the format and special characters or strings that are used to designate the tagged strings. The instructions may further include instructions that permit use of the text value used in the tagged string when evaluating the prompt. For example, if a mention object is replaced with a tagged string, the string may include a text value that corresponds to the name of the user referenced in the mention object. The prompt may include instructions permitting use of the text value as a proxy for the tagged string (and thus the mention object), which allows the generative output engine to recognize the text value an its role in the prompt. As a result, the LLM may evaluate the context of the prompt including the text values (user's name) of the tagged content when producing the generative response, which may result in use of the tagged string in the generative response in an appropriate way given the structure and content of the context.

The prompt generated in operation 420 may be provided to a generative output engine in operation 422 and a generative response may be produced in accordance with the various examples and explanations provided herein. At operation 430 the generative response may be evaluated and processed. Generally, operation 430 causes generation of a modified version of the response (or modified response) by replacing any respective tagged strings in the generative response with corresponding objects by referencing the identity map. Specifically, content identifiers contained in the returned tagged strings may be used to identify and access respective entries in the identity map, which includes attributes and other content associated with the corresponding platform-specific or editor-specific objects.

In the present example, operations 432, 434, and 436 may be sub-operations of operation 430. For example, in operation 432, the generative response may be processed using a tokenizer or other processing technique. In operation 432, the generative response may be processed to identify any markdown, tagged strings, or other formatted elements. The markdown may be replaced with corresponding html or editor-specific formatted elements, The tagged strings may also be identified and/or replaced with corresponding content. However, in the current example, the tagged strings are not replaced until operation 436, discussed below.

In operation 434, the tagged content is validated to ensure that the tagged strings were left intact by the generative output engine and that the tagged strings are complete and still represent valid entries in the identity map. In one example validation scheme, the process checks for the presence of a leading tag (e.g., "<custom") and a trailing tag (e.g., "/custom>" to ensure that a partial tag was not produced. This may be particularly useful for "streaming type" responses in which a series of partial responses are processed and displayed by the system to show the user the generative response as it is generated. Any partial tagged strings that are detected may be suppressed from display or omitted from the response to avoid displaying the text of the tagged string, which could confuse the user and cause issues for further operations. In another example validation, the content identifier and/or the text value may be used to ensure a valid entry exists in the identity map. If the content identifier or the text value are valid and the respective other one of the pair is not valid or appears complete, the validator may replace the invalid or incomplete portion of the pair using the information contained in the identity map. In neither the content identifier or the text value can be verified using the identity map, the tagged string may be omitted or it may be replaced with the text value that is present in the evaluated string. In other cases, an incomplete or otherwise failed validation may result in the tagged string being replaced with the text value. While this may not produce a result having the enriched text or original objects, the meaning of the sentence or response may be preserved.

In operation 436, the response may be processed or converted using the identity map. In particular, any tagged strings present in the generative response may be replaced with corresponding objects, as designated in the identity map to produce a modified response. As discussed previously, for any tagged strings in the generative response, the content identifier may be used to reference or identify a respective entry in the identity map. The respective entry in the identity map may include a serialized version of the original object or node including respective node attributes, which may be used to reconstruct the original object or node in operation 432. The modified response may then be rendered and displayed in the graphical user interface in operation 440. The resulting modified response may include the substance of the generative response but also include non-text objects including the editor-specific or platform-specific objects. This allows the content to appear similar to the native content that was analyzed and may allow for easier or more natural insertion into other content on the platform.

FIG. 5 depicts an example graphical user interface with platform-specific or editor specific content. Specifically, FIG. 5 depicts an example graphical user interface 500, which includes a source document having user generated content 510 that includes text and non-text objects in line with the text. As mentioned previously, non-text objects include mention objects 512, selectable graphical link objects 514, list element objects 516 and special symbol objects 518. Each object may have a visually distinct appearance and may have associated functionality. For example, selectable graphical link objects 514 may have content or metadata extracted from the linked content item and may be selectable to cause redirection of the graphical user interface to the corresponding content item or platform. Mention objects 512 may be associated with a user account or username and may be selectable to cause redirection to a directory entry or may cause redirection to a messaging interface in which a message may be directed to the corresponding user. In some implementations, a hover input (e.g., a sustained cursor placement over the object) with respect to the mention objects may cause display of an information overlay window, which includes content associated with the user account or username. List element objects 516 may be formatted as a bulleted list that is indented with respect to other content and may include selectable boxes or other elements that are modified to indication completion of the respective item by, for example, displaying a check or a filled-in radio button. Similarly, date objects status objects, team objects, and project objects may exhibit special functionality and/or have a distinct visual appearance as compared to other objects or surrounding text.

As shown in the example of FIG. 5, a generative command may be invoked with respect to the user-generated content 510. As a result, a generative result may be produce and a modified version of the generative result 520 may be displayed in the window object 530. As shown in FIG. 5, the modified version of the generative result 520 also include platform-specific or editor-specific objects, which may be generated and/or preserved using a process similar to the process 400 described above with respect to FIG. 4.

As described previously, generative commands or user input requesting generative content may be provided using a variety of techniques. In some cases, a centralized editor service allows for generative content or invocation of a generative command from within the editor region. For example, FIGS. 6A-6B each depict example frontend interfaces that can interact with a system as described herein to receive prompts from a user that can be provided as input to a generative output engine as described herein.

In particular, FIG. 6A may represent a user interface of a documentation platform rendering a frame to receive user input from a user by leveraging a centralized editor service. The user interface 600*a* can be rendered by a client device

602 which may be a personal electronic device such as a laptop, desktop computer, tablet and the like. The client device 602 can include a display with an active display area 604 in which a user interface can be rendered. The user interface can be rendered by operation of an instance of a frontend application associated with a backend application that collectively define a software platform as described herein.

More particularly, as described above in reference to FIG. 1, a platform can be defined by communicably intercoupling one or more frontend instances with one or more backend instances. The backend instance of software can be instantiated over server hardware such as a processor, memory, storage, and network communications. The frontend application can be instantiated over physical hardware of a client device in network communication with the backend application instance. The frontend application can be a native application, a browser application, or other application type instantiated over hardware directly or indirectly, such as within an operating system environment.

FIG. 6A depicts the active display area 604 rendering a graphical user interface associated with a frontend of an example documentation system. The documentation system can communicably couple to a centralized content editing frame service to render an editor region 606 that can receive user input. The user input may be text, media, graphics, or the like.

In some cases, the user input may be provided when the frontend is operated in a command receptive mode. The command receptive mode can be triggered by the user typing a special character (e.g., a slash) or by the user pressing a button to indicate an intent to type a command. In the illustrated example, a user of the client device 602 has typed a forward slash followed by a partial input 608 of the word "intelligence." However, nearly any term or phrase or key symbol may be used.

Upon receiving and recognizing the slash command start, the frontend and/or the backend may cause to be rendered an overlay interface 610 that provides one or more suggestions to the user, each of which may be associated with a particular preconfigured prompt, templatized prompt, engineer templatized prompts, or other command and control affordances that may be interacted with by the user. For example, each suggestion rendered in the overlay interface 610 may be associated to particular prompt or sequence of prompts that may be provided to a generative output engine as described above.

Similarly, FIG. 6B may represent a user interface of an issue tracking system. As with the embodiment shown in FIG. 6A, the issue tracking system of FIG. 6B includes a user interface 600*b* rendered by a client device 602 on a display thereof. The display leverages an active display area 604 to render an editor region 606 that is configured to receive user input to describe a particular issue tracked by the issue tracking system. In this example, as with the preceding example, the user may type into the editor region 606 a partial input 608 that triggers rendering of an overlay interface 610 that provides different suggestions to the user, each of which may be associated with a particular prompt or function enabled by interaction with a trained LLM such as may be provided by a generative output engine as described herein.

These foregoing embodiments depicted in FIGS. 6A-6B and the various alternatives thereof and variations thereto are presented, generally, for purposes of explanation, and to facilitate an understanding of various configurations and constructions of a system and related user interfaces and methods of interacting with those interfaces, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that a common editor frame is only one method of providing input to, and receiving output from, a generative output engine as described herein.

Figure 7A:
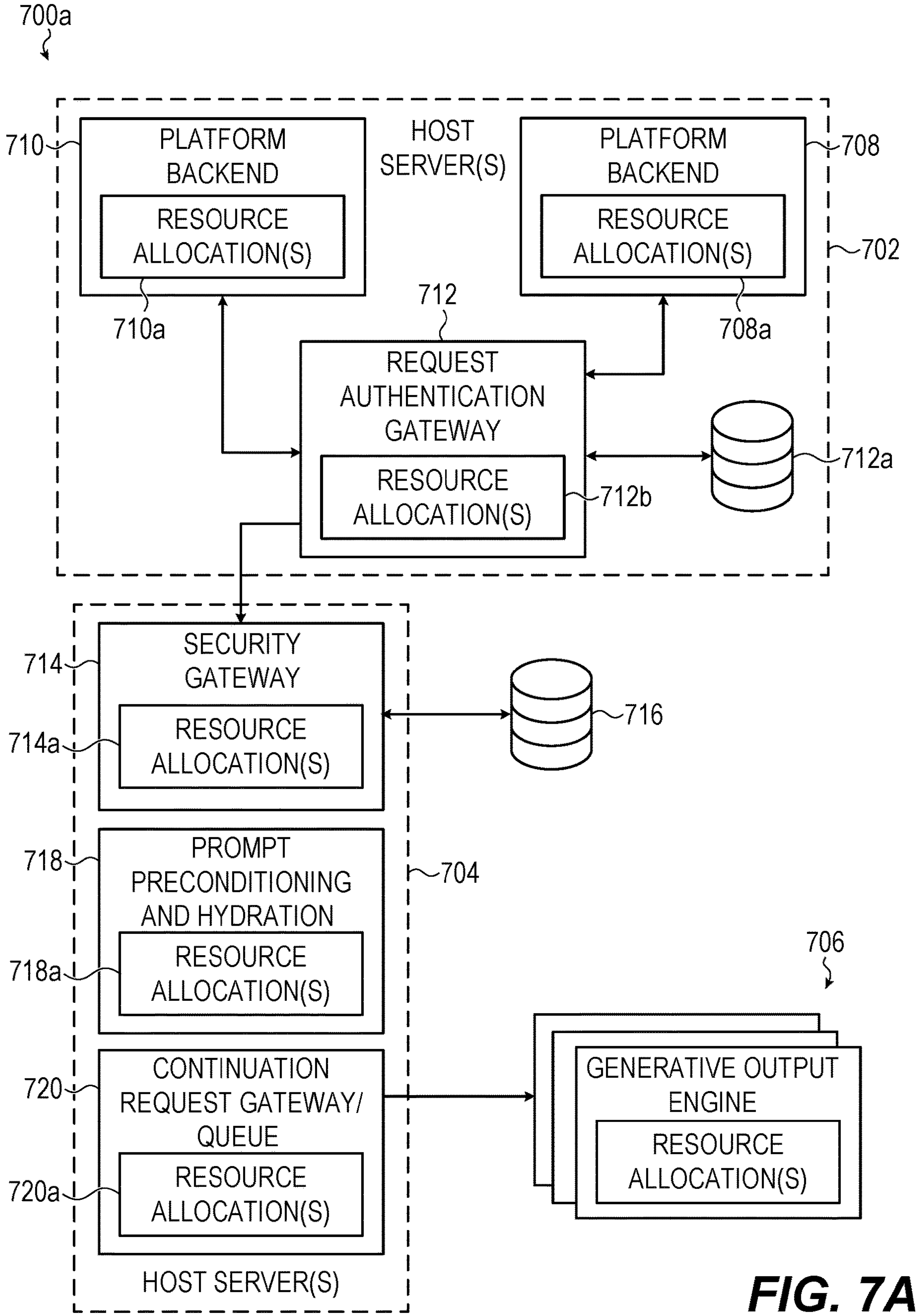
FIG. 7A depicts a simplified diagram of a system, such as described herein that can include and/or may receive input from a generative output engine.
Figure 7B:
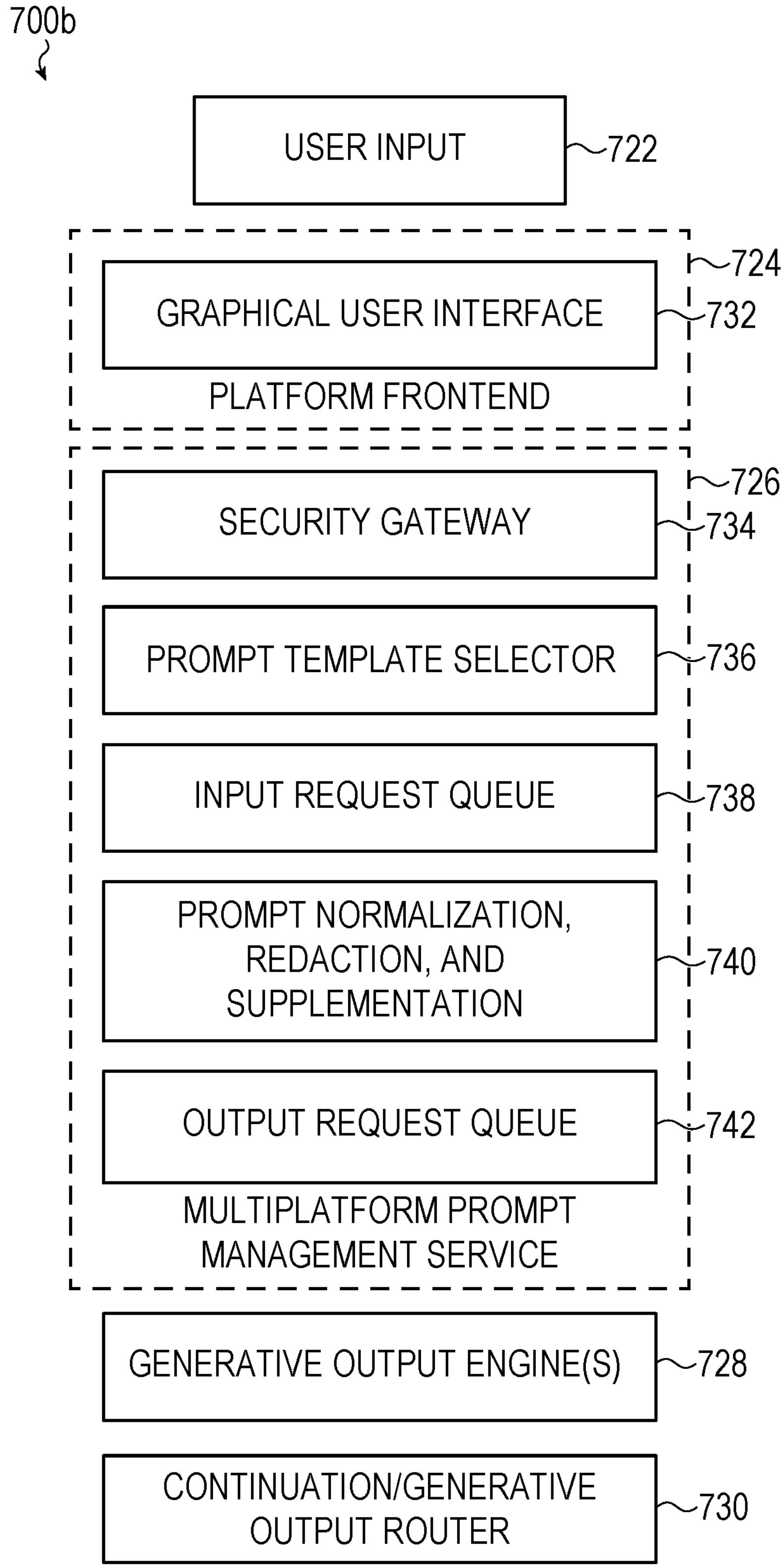
FIG. 7B depicts a functional system diagram of a system that can be used to implement a multiplatform centralized generative service.

FIGS. 7A-7B depicts system diagrams and network/communication architectures that may support a system as described herein. Referring to FIG. 7A, the system 700*a* includes a first set of host servers 702 associated with one or more software platform backends. These software platform backends can be communicably coupled to a second set of host servers 704 purpose configured to process requests and responses to and from one or more generative output engines 706.

Specifically, the first set of host servers 702 (which, as described above can include processors, memory, storage, network communications, and any other suitable physical hardware cooperating to instantiate software) can allocate certain resources to instantiate a first and second platform backend, such as a first platform backend 708 and a second platform backend 710. Each of these respective backends can be instantiated by cooperation of processing and memory resources associated to each respective backend. As illustrated, such dedicated resources are identified as the resource allocations 708*a* and the resource allocations 710*a*.

Each of these platform backends can be communicably coupled to an authentication gateway 712 configured to verify, by querying a permissions table, directory service, or other authentication system (represented by the database 712*a*) whether a particular request for generative output from a particular user is authorized. Specifically, the second platform backend 710 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 712 can deny the request for insufficient permissions. This example is merely one and is not intended to be limiting; many possible authorization and authentication operations can be performed by the authentication gateway 712. The authentication gateway 712 may be supported by physical hardware resources, such as a processor and memory, represented by the resource allocations 712*b*.

Once the authentication gateway 712 determines that a request from a user of either platform is authorized to access data or resources implicated in service that request, the request may be passed to a security gateway 714, which may be a software instance supported by physical hardware identified in FIG. 7A as the resource allocations 714*a*. The security gateway 714 may be configured to determine whether the request itself conforms to one or more policies or rules (data and/or executable representations of which may be stored in a database 716) established by the organization. For example, the organization may prohibit executing prompts for offensive content, value-incompatible content, personally identifying information, health information, trade secret information, unreleased product information, secret project information, and the like. In other cases, a request may be denied by the security gateway 714 if the prompt requests beyond a threshold quantity of data.

Once a particular user-initiated prompt has been sufficiently authorized and cleared against organization-specific generative output rules, the request/prompt can be passed to a preconditioning and hydration service 718 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 718 can be a software instance supported by physical hardware represented by the resource allocations 718*a*. In some implementations, the hydration service 718 may also be used to rehydrate personally identifiable information (PII) or other potentially sensitive data that has been extracted from a request or data exchange in the system.

One a prompt has been modified, replaced, or hydrated by the preconditioning and hydration service 718, it may be passed to an output gateway 720 (also referred to as a continuation gateway or an output queue). The output gateway 720 may be responsible for enqueuing and/or ordering different requests from different users or different software platforms based on priority, time order, or other metrics. The output gateway 720 can also serve to meter requests to the generative output engines 706.

FIG. 7B depicts a functional system diagram of the system 700*a* depicted in FIG. 7A. In particular, the system 700*b* is configured to operate as a multiplatform centralized generative service supporting and ordering requests from multiple users across multiple platforms. In particular, a user input 722 may be received at a platform frontend 724. The platform frontend 724 passes the input to a centralized generative service 726 that formalizes a prompt suitable for input to a generative output engine 728, which in turn can provide its output to an output router 730 that may direct generative output to a suitable destination. For example, the output router 730 may execute API requests generated by the generative output engine 728, may submit text responses back to the platform frontend 724, may wrap a text output of the generative output engine 728 in an API request to update a backend of the platform associated with the platform frontend 724, or may perform other operations.

Specifically, the user input 722 (which may be an engagement with a button, typed text input, spoken input, chat box input, and the like) can be provided to a graphical user interface 732 of the platform frontend 724. The graphical user interface 732 can be communicably coupled to a security gateway 734 of the centralized generative service 726 that may be configured to determine whether the user input 722 is authorized to execute and/or complies with organization-specific rules.

The security gateway 734 may provide output to a prompt selector 736 which can be configured to select a prompt template from a database of preconfigured prompts, templatized prompts, or engineered templatized prompts. Once the raw user input is transformed into a string prompt, the prompt may be provided as input to a request queue 738 that orders different user request for input from the generative output engine 728. Output of the request queue 738 can be provided as input to a prompt hydrator 740 configured to populate template fields, add context identifiers, supplement the prompt, and perform other normalization operations described herein. In other cases, the prompt hydrator 740 can be configured to segment a single prompt into multiple discrete requests, which may be interdependent or may be independent.

Thereafter, the modified prompt(s) can be provided as input to an output queue at 742 that may serve to meter inputs provided to the generative output engine 728.

These foregoing embodiments depicted in FIG. 7A-7B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 8A:
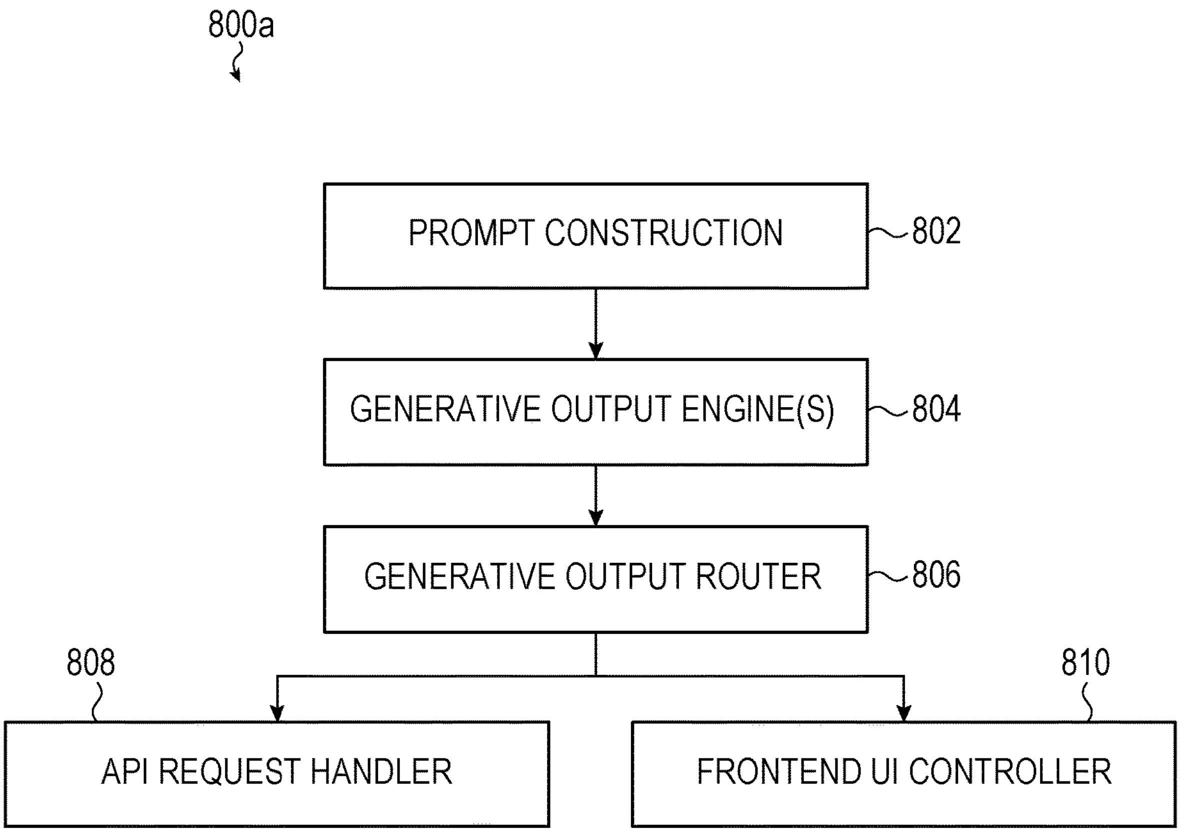
FIG. 8A depicts a simplified system diagram and data processing pipeline.

For example, although many constructions are possible, FIG. 8A depicts a simplified system diagram and data processing pipeline as described herein. The system 800*a* receives user input, and constructs a prompt therefrom at operation 802. After constructing a suitable prompt, and populating template fields, selecting appropriate instructions and examples for an LLM to continue, the modified constructed prompt is provided as input to a generative output engine 804. A continuation from the generative output engine 804 is provided as input to a router 806 configured to classify the output of the generative output engine 408 as being directed to one or more destinations. For example, the router 806 may determine that a particular generative output is an API request that should be executed against a particular API (e.g., such as an API of a system or platform as described herein). In this example, the router 806 may direct the output to an API request handler 808. In another example, the router 806 may determine that the generative output may be suitably directed to a graphical user interface/frontend. For example, a generative output may include suggestions to be shown to a user below a user's partial input, such as shown in FIGS. 2A-2B.

Figure 8B:
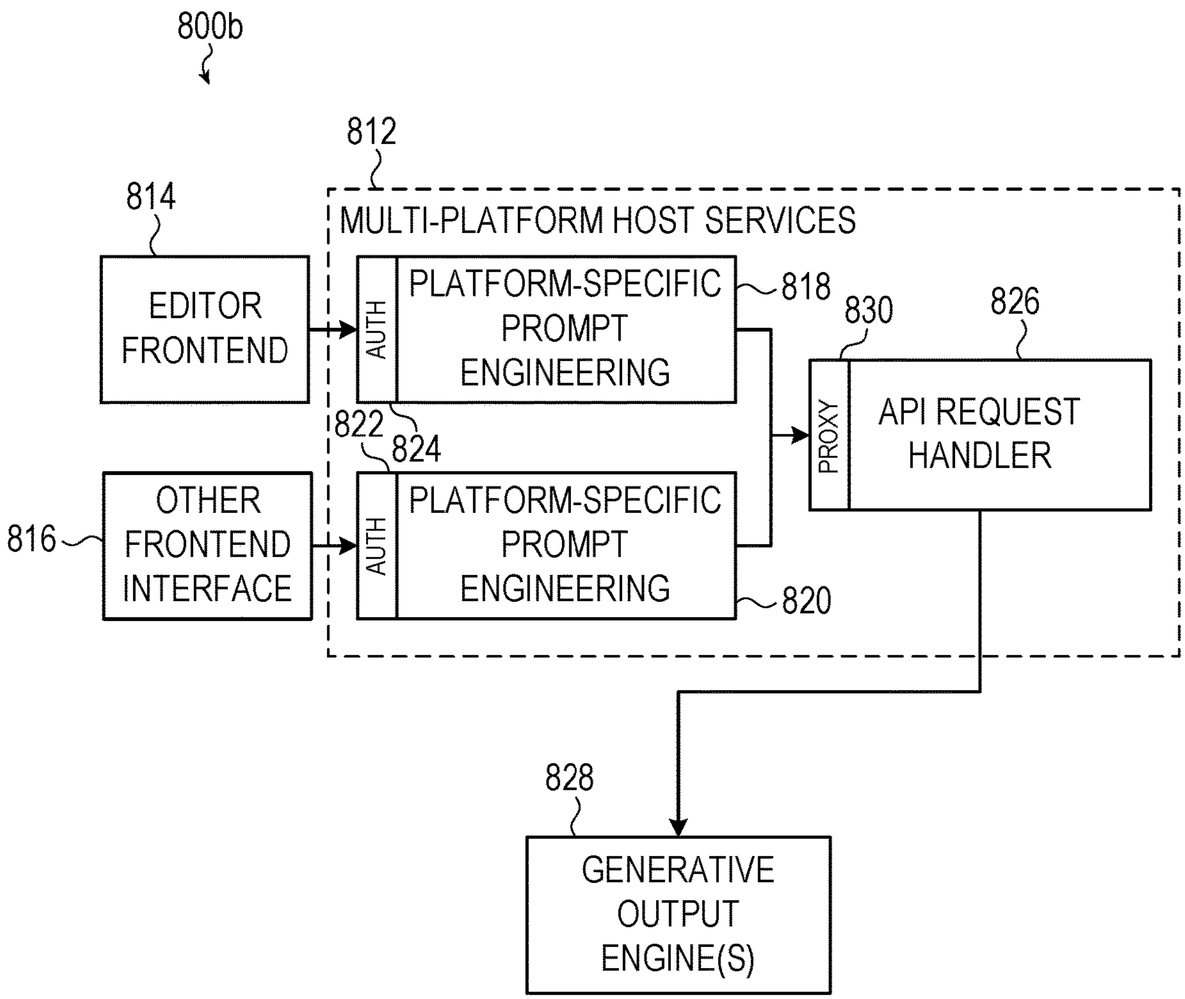
FIG. 8B depicts a system providing multiplatform prompt management as a service.

Another example architecture is shown in FIG. 8B, illustrating a system providing prompt management, and in particular multiplatform prompt management as a service. The system 800*b* is instantiated over cloud resources, which may be provisioned from a pool of resources in one or more locations (e.g., datacenters). In the illustrated embodiment, the provisioned resources are identified as the multi-platform host services 812.

The multi-platform host services 812 can receive input from one or more users in a variety of ways. For example, some users may provide input via an editor region 814 of a frontend, such as described above. Other users may provide input by engaging with other user interface elements 816 unrelated to common or shared features across multiple platforms. Specifically, the second user may provide input to the multi-platform host services 812 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 812 can include multiple software instances or microservices each configured to receive user inputs and/or proposed prompts and configured to provide, as output, an engineered prompt. In many cases, these instances—shown in the figure as the platform-specific prompt engineering services 818, 820—can be configured to wrap proposed prompts within engineered prompts retrieved from a database such as described above.

In many cases, the platform-specific prompt engineering services 818, 820 can be each configured to authenticate requests received from various sources. In other cases, requests from editor regions or other user interface elements of particular frontends can be first received by one or more authenticator instances, such as the authentication instances 822, 824. In other cases, a single centralized authentication service can provide authentication as a service to each request before it is forwarded to the platform-specific prompt engineering services 818, 820.

Once a prompt has been engineered/supplemented by one of the platform-specific prompt engineering services 818, 820, it may be passed to a request queue/API request handler 826 configured to generate an API request directed to a generative output engine 830 including appropriate API tokens and the engineered prompt as a portion of the body of the API request. In some cases, a service proxy 830 can interpose the platform-specific prompt engineering services 818, 820 and the request queue/API request handler 826, so as to further modify or validate prompts prior to wrapping those prompts in an API call to the generative output engine 828 by the request queue/API request handler 826 although this is not required of all embodiments.

These foregoing embodiments depicted in FIG. 7A-7B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Documentation Platforms & Shared Editors

FIGS. 9-15 are directed to example graphical user interfaces that demonstrate functionality of an editor and content viewer of a collaboration platform, as described herein. As described previously, a collaboration platform may include or be integrated with a content-creation and modification service that can be used to create, edit, or adapt content for use with the collaboration system. The content-creation and modification service may be operably coupled to or include a language model platform, as described herein, which may be used to automatically generate content in response to text-based prompts. As described in more detail below, the content creation and modification service may be used to (1) summarize existing user-generated content, (2) automatically edit or modify existing-user generated content to adjust for content length, content tone, or other content qualities, and (3) generate new user-generated content based on user-provided prompt or input. The content creation and modification service may also be adapted to pull content from other platforms, utilize user graphs, utilize project graphs, or utilize other cross-platform data in order to perform the various functions described herein.

As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular collaboration platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

Figure 9:
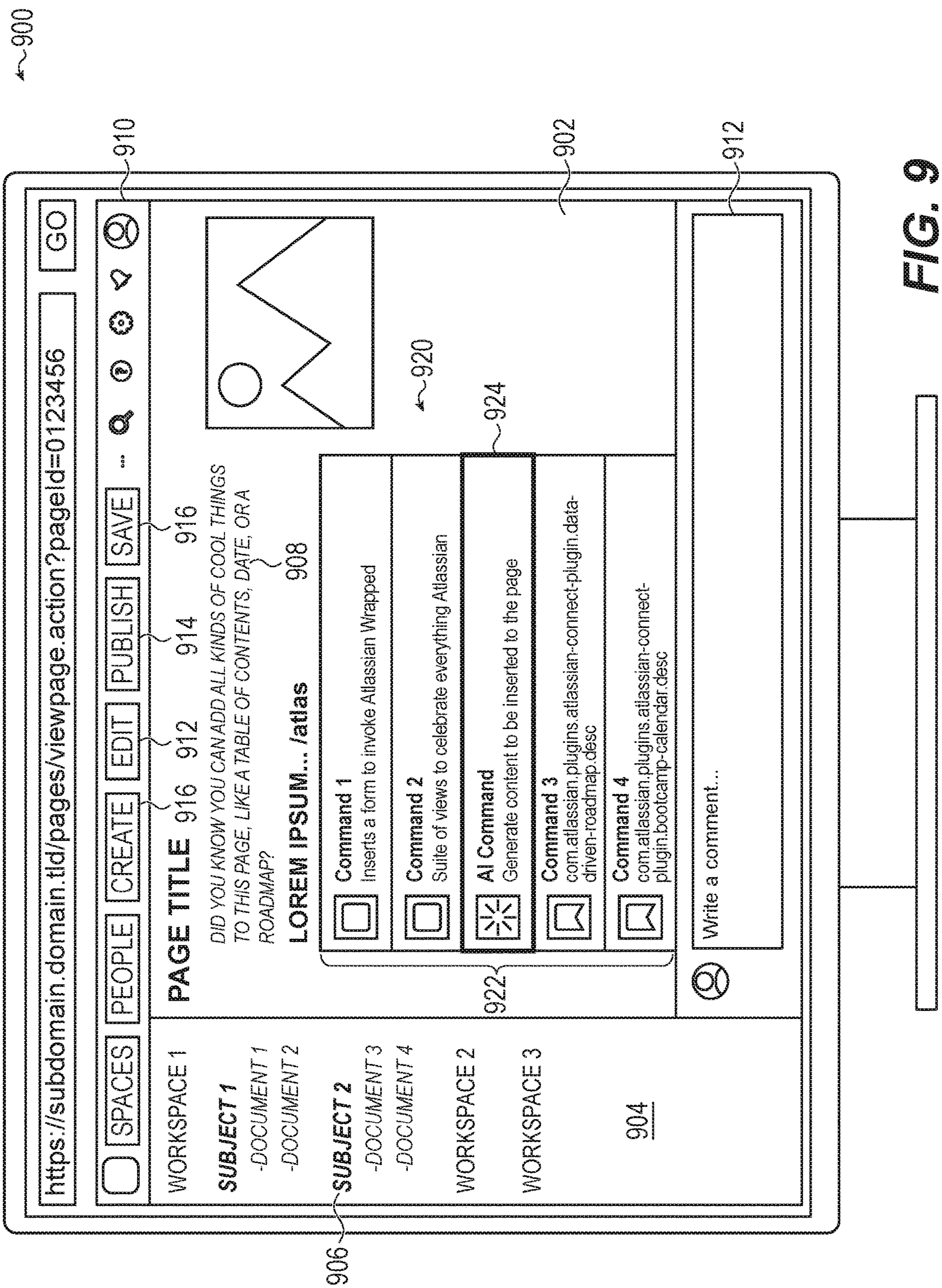
FIG. 9 depicts an example graphical user interface of a frontend of a collaboration platform.

FIG. 9 depicts an example graphical user interface of a frontend of a collaboration platform. The graphical user interface 900 may be provided by a client application operating on a client device that is operably coupled to a backend of the collaboration platform using a computer network. The client application may be a dedicated client application or may be a browser application that accesses the backend of the collaboration platform using a web-based protocol. As described herein, the client application may operate a frontend of the collaboration platform and is operably coupled to a backend of the collaboration platform operating on a server. The following example includes a content creation and modification service that is integrated with the client application or is invoked using the client application in order to provide the functionality described herein. In the following example, the collaboration platform is a documentation platform configured to manage content items like user-generated pages or electronic documents.

As shown in FIG. 9, the graphical user interface 900 includes an editor region 902 that includes user-generated content of the content item. The user-generated content may include text, images, audio and video clips, and other multi-media content. The user may transition the graphical user interface 900 into an editor mode by selecting the edit control 912 on the control bar 910. In the editor mode, the region 902 operates as an editor region and receives user input including text input from a keyboard, object insertions for images and other media, creation of embedded content, comments, labels, tags, and other electronic content. The user may transition the graphical user interface 900 into a content viewer mode by selecting the publish control 914 on the control bar 910. User selection of the publish control 914 may cause the content of the page or electronic document to be saved on the collaboration platform backend and the page or electronic document may be accessible to other users of the system having been authenticated and having a permissions profile that is consistent with a permissions profile of the page or electronic document. The user-generated content may be saved in accordance with a platform-specific markup language schema. An example of a platform-specific markup language schema is an Atlassian Document Format (ADF). The term platform-specific schema may be used to refer to a schema that is generally used with a particular platform but may also be used on other platforms having a similar rendering engine or editor functionality and may not be restricted to solely one platform.

As shown in the example of FIG. 9, the graphical user interface 900 includes an editor region 902 that is configured to interpret text commands when designated by a special character or set of characters. In the present example, when a designated character (e.g., a forward slash) is entered, the editor invokes a content creation and modification service, also referred to herein as an "editor assistant service," "prompt constructor," or "prompt management service." As described previously, the prompt constructor may interface with a generative output engine in order to provide suggested content or modifications that can be implemented directly in the editor or other aspects of the graphical user interface. In the present example, the designated character causes display of a command selection interface window 920 positioned at least partially over the editor region 902. The command selection interface window 920 is a floating window interface element or object and may overlap or overlay user generated content 908 of the electronic document or page. The command selection interface window 920 includes a set of command controls 922 (also referred to herein as "content-assistant controls" or simply "controls"). Each of the command controls 922 may correspond to a respective content modification action that can be performed by the editor assistant service. Content modification actions include actions that can be performed by the editor assistant service or prompt constructor including, for example, content summary actions, content creation actions, tone or voice modification actions, length modification actions, brainstorm actions, decision summary actions, task or action item actions, and other example actions consistent with the examples described herein.

In response to a user selection of a particular command control 924, a sequence of user-interface actions may be initiated, which may guide the user in providing user input for the corresponding content modification action. FIGS. 10A-11B depict example user-interface functionality that may be initiated through the selection of a particular command control 924. While the following examples are described as being triggered or initiated through a command selecting interface window 920 and selection of a particular command control 924, in other implementations, the same or similar functionality may result from a single selection of a control within the graphical user interface or may be automatically triggered as a result of a command 922 entered following the designated character 908.

The graphical user interface 900 of the present example may correspond to the frontend of a documentation platform, which may be configured to manage or host user-generated electronic documents or pages. As shown in the example of FIG. 9, the graphical user interface 900 includes various features to facilitate the editing and viewing of electronic documents or pages. Specifically, as shown in FIG. 9, the graphical user interface includes a navigational region 904 that includes a hierarchical navigational tree of elements 906, also referred to herein as a hierarchical navigational tree, a navigational tree, a page tree, or other similar term. Each element of the hierarchical navigational tree is selectable to cause display of corresponding page or document content of the page or document associated with the selected element. The hierarchical navigational tree of elements 906 may indicate parent-child relationships between documents or pages in a document space. Each document space may have a unique or distinct set of documents or pages, each related to each other, as indicated by indentations or other visual indicia in the hierarchical navigational tree of elements 906. The navigational region 904 may also include other selectable elements including, for example, calendar elements, blog entry elements, analytics, document space home page elements, and other items that are selectable to cause corresponding content to be displayed in the editor region/content region 902.

The graphical user interface 900 also includes a control bar 910, which may be used to provide other functionality for the frontend application. For example, the control bar 910 may include various controls 916 for changing document spaces ("SPACES"), viewing document spaces associated with particular users ("PEOPLE"), creating new documents or pages ("CREATE") or other similar controls. In the example of FIG. 9, the control bar 910 also includes an edit control 912 causes the region 902 to transition from a viewer or content region to an editor or editor region. In a typical implementation, the user must be an authenticated user having a permissions profile that is consistent with an edit permission associated with the respective electronic document or page. If the user is not authenticated or is authenticated and does not have a permissions profile that allows edit permissions with respect to the currently displayed electronic document or page, the edit control 912 is rendered inoperable or, in some cases, display of the edit control 912 is suppressed from the graphical user interface 900. In response to the edit control 912 being selected by an authenticated user having the appropriate permissions, the region 902 transitions to an editor region, which is configured to receive user input including, for example, text input provided by a keyboard, images, video or audio clips, links, selectable link objects, and other content that is generated by the user or otherwise provided by the user, which may be considered user-generated content with respect to document editing activities. The content may be saved periodically and/or may be saved in response to a save control 916 on the graphical user interface. The control bar 910 also includes a publish control 914 that is selectable to cause the document content to be saved and published on the documentation platform. As discussed previously, a published document or page may be viewable by other authenticated system users having a permissions profile consistent with at least a view permission associated with the respective document or page.

The graphical user interface 900 may also have other regions or fields that are configured to receive user-generated content. For example, the graphical user interface 900 may include a comments region 912 in which users may add comments, which may be viewed in conjunction with the corresponding document or page. Comments may be entered by system users who may not otherwise have edit permissions with respect to the respective document or page. Similarly, the graphical user interface 900 may allow for in-line comments, which may be inserted within the document content, as viewed in the region 902 and may be expanded in a region at the periphery of the region 902 or in a separate in-line comment region. The functionality described herein with respect to the editor or an editor region may also be applied to these other regions and other types of user-generated content and the examples provided herein are not limited to a document editor or document content creation or modification functionality.

FIGS. 10A-12 depict example excerpts of a graphical user interface of a collaboration platform. Specifically, the sequence of figures depict example functionality that may be accomplished using an editor assistant service or prompt constructor in conjunction with a generative output engine. The following examples may occur in the context of a frontend of a collaboration platform, similar to the example of FIG. 9. A depiction of duplicative functionality has been omitted from some of the figures to reduce redundancy.

Figure 10A:
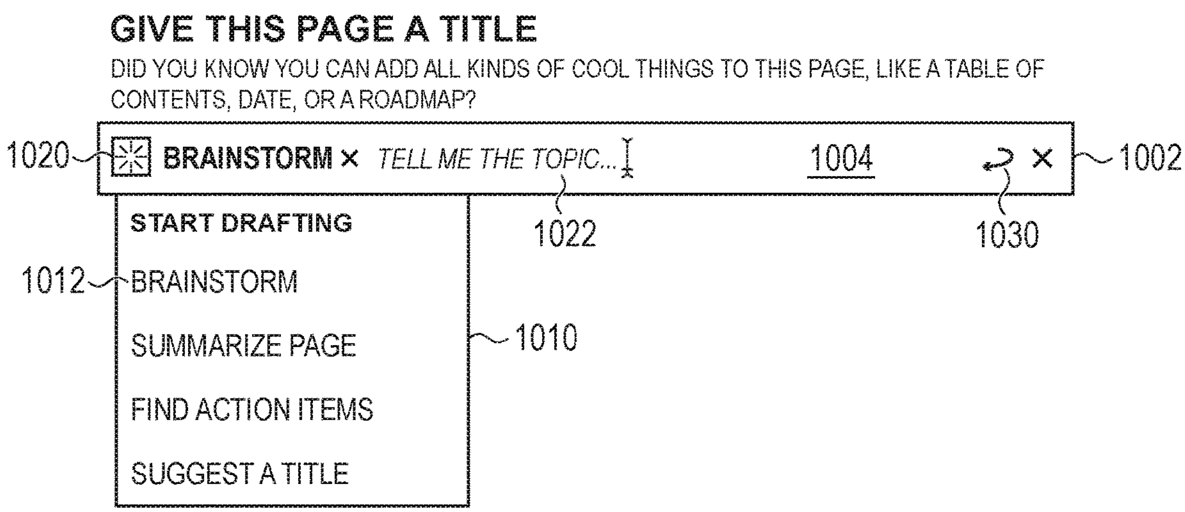
FIGS. 10A-10B depicts an example result of invocation of an editor assistant service that can be used create or modify content in an editor region of a graphical user interface.

FIG. 10A depicts an example result of invocation of the editor assistant service that can be used create or modify content in an editor region of a graphical user interface. The editor assistant service may be invoked using a designated character or character sequence (e.g., a slash command of FIG. 9) or make be invoked using another control or user interface element. As shown in FIG. 10A, the editor assistant service may cause display of a command prompt interface 1002, which may replace an in-line command character or character sequence entered into the editor region.

As shown in FIG. 10A, the command prompt interface 1002 includes a user input region 1004 which is configured to receive user input. The user input region 1004 may receive user-entered text, which may specify a content modification action, prompt text, or source of content to be analyzed or modified. In the example of FIG. 10A, the user input is facilitated by a series of menus and selectable elements that help guide the user in constructing the user-prompt input. For example, as shown in FIG. 10A, a command selection interface window 1010 may be displayed including a list of command controls 1012, also referred to herein as content-assistant controls. Each command control 1012, or at least some of the command controls, are associated with a content modification action, which may be partially described or indicated in the respective command controls 1012. Example content modification actions include, but are not limited to, a brainstorm action, a summarize content action, find action item action, suggest a title action, change tone action, content length modification action, improve writing, summarize topics, identify action items or tasks, identify decisions, or perform other actions.

In response to a user selection of a command control 1012, user input is provided in the user input region 1004 of the command prompt interface 1002. In some cases, selection of the command control 1012 causes text to be automatically entered into the user input region 1004. In the example of FIG. 10A, selection of the command control 1012 causes a graphical object 1020 to be entered into the user input region 1004. The graphical object 1020 may represent a placeholder for a larger text string or command that may be expanded when the prompt is generated for the generative output engine. In some cases, the graphical object 1020 may serve as a label or identifier used to select predefined query prompt text when generating the prompt for the generative output engine. In general, the predefined query prompt text is configured to implement or trigger the corresponding content modification action when provided to the generative output engine. For example, a selection of the "brainstorm" command control may insert a corresponding graphical object 1020 in the user input region 1004, which may be used to select predefined query prompt text associated with a brainstorm content modification action.

Figure 11A:
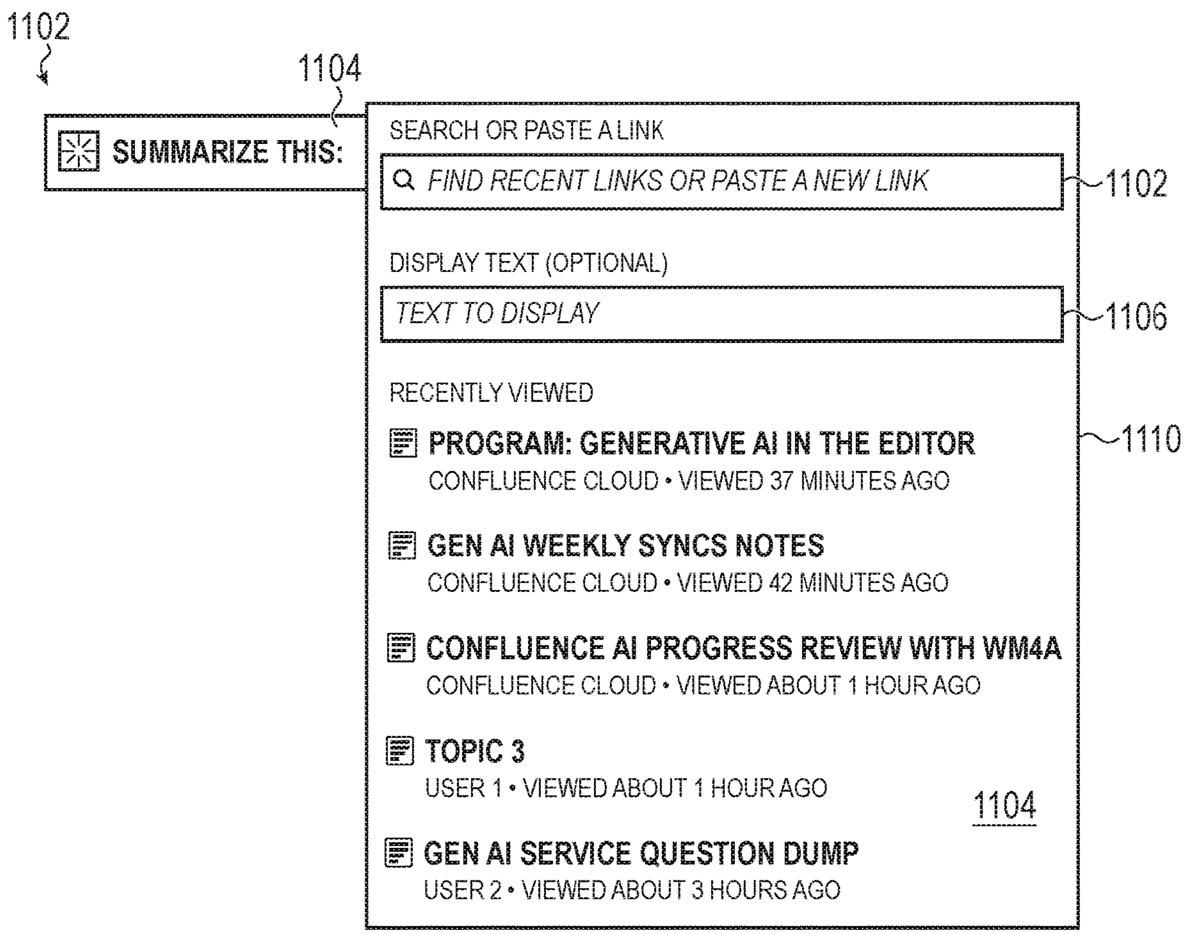
FIGS. 11A-11B depict another example result of invocation of an editor assistant service that can be used create or modify content in an editor region of a graphical user interface.

In addition to insertion of graphical object 1020 or other auto-populated user input as a result of a user selection of the command control 1012, the user may provide further user input that may be used to supplement or replace the action indicated by the graphical object 1020. For example, the additional user input may specify a format for the output or a further instruction (e.g., insert in table, sorted alphabetically). In the present example, the additional user input provides a topic for the brainstorm action to be performed. The additional user input may also specify an object to be acted on or to be a subject of the action. The additional user input may include a text string to be analyzed or a pointer or link to content to be used as part of the proposed action. FIG. 11A, for example, depicts an interface for creating a link object by selecting from a list of content items identified using a search tool. The additional user input may also include selected text within the graphical user interface, which may be provided by the user through a cursor drag gesture, but may not be expressly copied or identified within the user input region 1004 of the command prompt interface 1002. Examples of selected text being used for a proposed action is provided in FIGS. 14A-14B, described in more detail below.

In response to a user input indicating the completion of the user prompt input entered into the input region 1004, a prompt is generated and provided to a generative output engine. For example, as shown in FIG. 10A, the user may indicate that the user prompt input is complete by selecting the return control 1030 or by pressing the "return" key on a keyboard. In response to the completion command, a prompt may be generated including predefined query prompt text and at least a portion of the user prompt input provided to the input region 1004 or the command prompt interface 1002. In general, the predefined query prompt text may be selected or generated in accordance with the proposed action (e.g., the selected command control or other indication of a content modification action). The predefined query prompt text may include a request, example formatting or schema examples, example input-output pairs, instructions regarding what not to include in a response, or context for the requested action. Various examples of predefined query prompt text are provided throughout the specification.

The generated prompt may then be provided to an external (or integrated) generative output engine. The prompt may be provided as part of an API call, which may include the transmission of the prompt in a JSON object, text file, or other structured data format. In response, the generative output engine may provide a generative output or generative response, which is used to generate content for insertion into the electronic document or page.

As with other embodiments described herein, the user prompt input can be modified, corrected, supplemented and/or inserted into an engineered prompt as described above. Any suitable system or instance can operate to determine whether modification to the user prompt input is required.

Figure 10B:
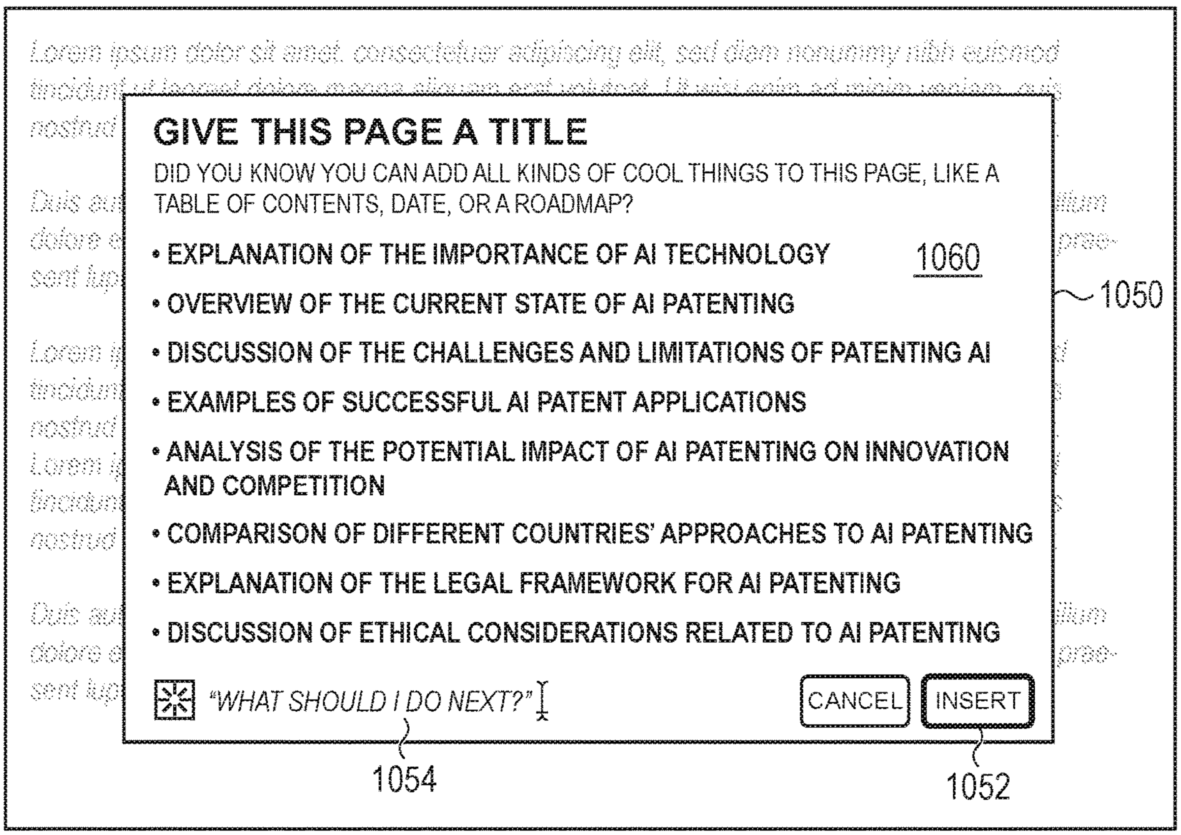

FIG. 10B depicts an example generative response 1060 that is displayed in a preview window 1050. In the present example, the generative response 1060 includes a list of brainstorming topics or items that are generated in response to the "brainstorming" action and a proposed topic provided in the command prompt interface 1002. The user may edit or delete portions of the content displayed in the preview window 1050 and, using controls 1052, may insert the content into the current electronic document via the editor region, underlying the preview window 1050. In some cases, the controls 1052 include controls for inserting the content into a user-selected document, insert the content into a newly created document, copy the content to a clipboard, or direct the content into another aspect of the collaboration platform.

The generative response 1060 may be used as a basis for further prompts and further generative responses. For example, as shown in FIG. 10B, the preview window 1050 may include an input region 1054 that is configured to receive additional user commands or instructions for further refining the generative response 1000. For example, the user may provide an instruction to summarize the response, expand on a subtopic, or otherwise use the generative response 1000 as input to a further prompt to be sent to a generative output engine. As a result, at least a portion of the generative response 1000 may be used as part of a subsequent prompt resulting in a modified or second generative response. This can be continued until the response provided in the preview window 1050 accomplishes the desired task.

Figure 11B:
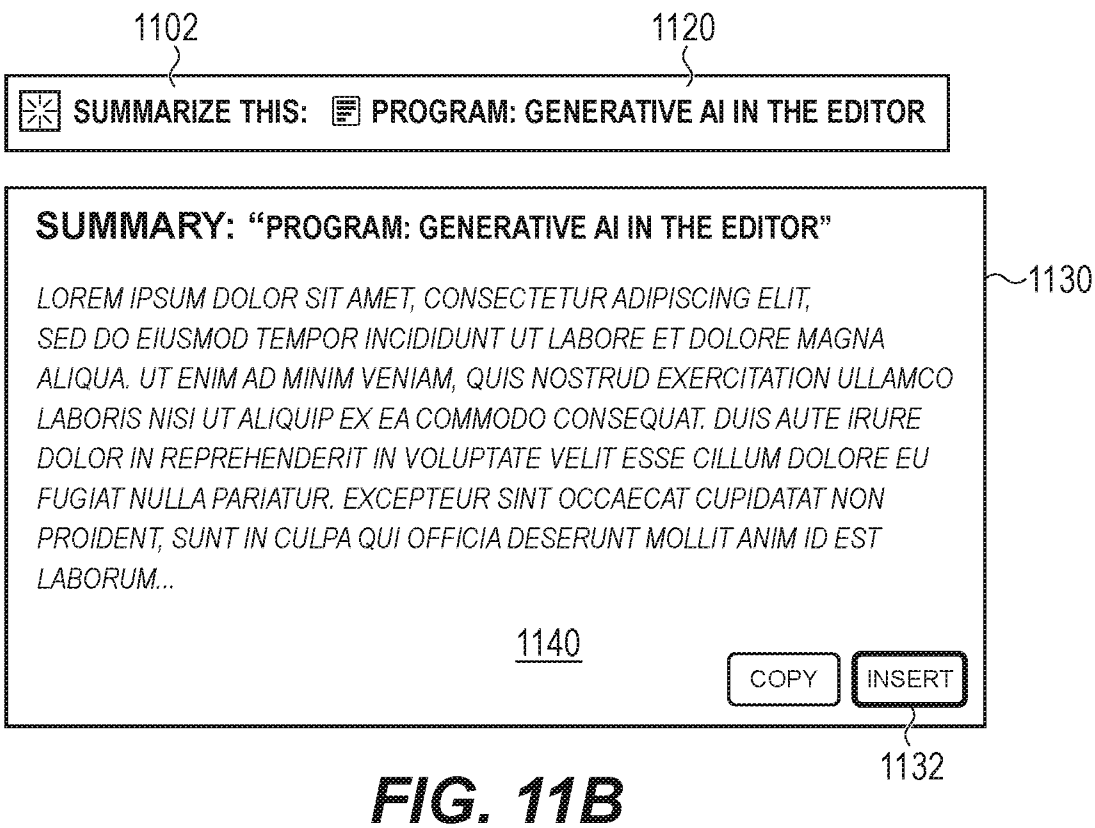

As described previously, link objects may be created and provided to the command prompt interface in order to indicate which content is to be subject to the content modification action or other processing by the generative output engine. FIGS. 11A-11B depict an example user interface that guides the user through a link object creation for use with a command prompt interface. The user interface of FIGS. 11A-11B can be used to select content items within the same collaboration platform, a separated distinct collaboration platform, or a third-party content provider.

As shown in FIG. 11A, a command prompt interface 1102 may be displayed overlaying a portion of an editor region, similar to the examples discussed above, the command prompt interface 1102 includes a user input region 1104 and may have similar functionality as described above with respect to the previous examples. A user may create a link object for use by the editor assistant service by selecting a control or typing a designated character or command into the user input region 1104. In response to a user input, the system may cause display of an object selection interface 1110. The object selection interface 1110 includes an input region 1102 for receiving user search terms or other input that may be used to identify content items. The object selection interface 1110 also includes a results region 1104, which may display a list of selectable elements, each element associated with a content item that was identified using user input provided to the input region 1102. In some cases, the results region 1104 displays recently selected, recently viewed content items, or another curated list of content items predicted to be relevant to the object link creation process. The object selection interface 1110 also includes other regions 1106 and controls that may be used to configure how the object is to be displayed or used. For example, the link object may be renamed or the region 1106 may be used to designate a particular portion or aspect of the object to be used for the linked content. In some implementations, multiple tabs or other selectable area may be used to toggle between different content providers. The list of content providers may be determined by a registry of validated content providers that have registered with the service and are able to provide access to remotely hosted content items based on a user credential, token, or other authenticating element, which may be authenticated in advance of the object search process using a single-sign-on or other authentication scheme. In response to a user selection of a particular element displayed in the results region 1104, a link object may be created and positioned within the user input region 1104.

FIG. 11B depicts a command prompt interface 1102 having a link object 1120 positioned in the user input region 1104. In the present example, the link object 1120 includes a link or path designating a location or endpoint at which the electronic document can be accessed. The link object 1120 includes a graphical element or icon that represents the type of object that is linked and a text descriptor, which may be obtained from the linked object or may be expressly entered using the object selection interface 1110 of FIG. 11A.

In response to a user input indicating that the prompt is complete, the editor assistant service or related service may access the linked content item using the path of the link object 1120 and obtain content from the linked content item. In some cases, text is extracted from the linked content item. In other cases, formatting, markup tags, and non-text objects are also obtained from the linked content item. The remote content item may be an electronic document, page, issue, or other digital object accessible via a link or path. In some cases, the content item is another page or electronic document that is native to the current collaboration platform or may even be associated with the current document space. Some or all of the extracted content may be used in the prompt, which is ultimately provided to the generative output engine.

As shown in FIG. 11B, in response to a prompt, including the content extracted from the linked content item, is used to generate a generative response using the generative output engine, consistent with many of the examples described herein. The generative response 1140 is displayed in the preview window 1130 and may be inserted in the current document, copied to a clipboard, or inserted into other content using one or more controls (e.g., control 1132).

Figure 12:
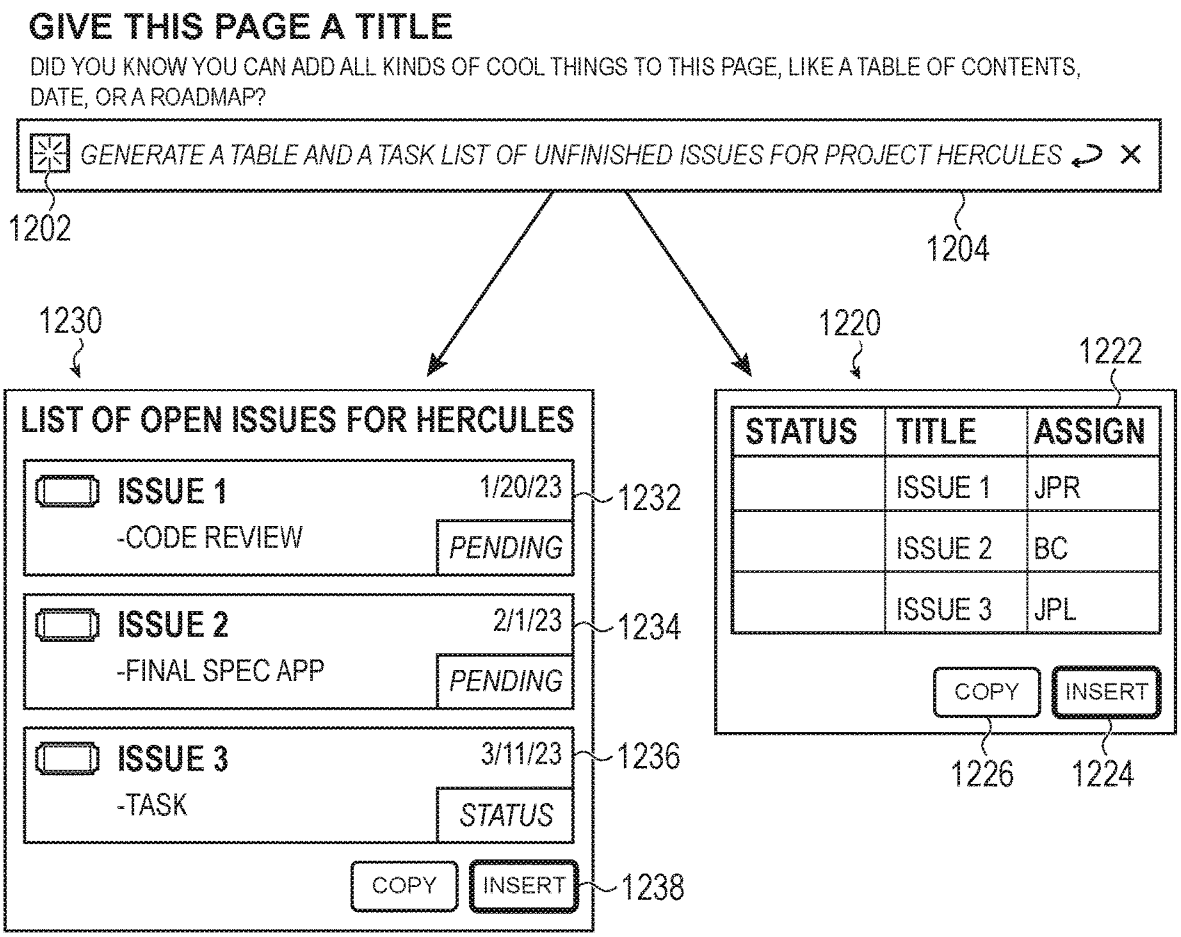
FIG. 12 depicts another example of an editor assistant service and command prompt interface in an editor of a collaboration platform.

FIG. 12 depicts another example use of an editor assistant service and command prompt interface in an editor of a collaboration platform. Similar to other user interface examples, the editor and surrounding context has been omitted from the example in order to reduce redundancy. Also similar to previous examples, and omitted to reduce redundancy, a command prompt interface 1202 may be created using a command line input or other similar technique to invoke or initiate the editor assistant service. Also similar to previous examples, the user input provided to the user input region 1204 is used to generate a prompt, which is transmitted to and processed by a generative output engine. In this example, the response or generative output includes formatting instructions for the text, which may include instructions to create a table, bulleted list, or other specifically formatted content. The response or generative output may also include embedded commands or calls to retrieve content for the generative action. Furthermore, the example of FIG. 12 illustrates how processing can be performed on the user input provide to the command prompt interface 1202 in order to generate the prompt for processing by the generative output engine.

In the example of FIG. 12, the user input provided to the command prompt interface 1202 includes reference to a project name ("Project Hercules"). The editor assistant service or other similar service may process the user input before or while generating the prompt for processing by the generative output engine. For example, the editor assistant service may parse the input text to screen for proper names, key words, and other grammatical content that indicates the user input is referencing a particular user, object, or grouping of objects. Triggering words or phrases may include "my," "project," "team," "standup," "weekly meeting," "recent," "last week" or the use of capitalized or proper nouns. In this example, the editor assistant service parses the user input and recognizes the term "Hercules," which is a proper noun and used in conjunction with a triggering word "project." In response, the editor assistant service may substitute the text of the user input with a link or identifier to a platform that is predicted to contain content related to the named project. In this example, the editor assistant service identifies an external issue tracking platform (example other collaboration platform), which includes issues and other content associated with the named project. When constructing the prompt, the system may either provide a link (if the content is able to be accessed by the generative output engine) or may retrieve content from the source and add the retrieved content to the prompt for processing. As shown in the example of FIG. 12, both the generated table of preview window 1220 and the list of selectable object links of window 1230 relate to content (e.g., issues) that are hosted on or provided by the issue tracking platform or system.

As mentioned previously, the prompt that is generated in response to the command prompt interface 1202 may include links to respective content or may include content that has been extracted and inserted into the prompt. In another example, the prompt may include an embedded command or API call to the other platform or system hosting the data. The embedded command or API call may be processed by the generative output engine or may be processed in advance of providing the prompt to the generative output engine.

An embedded command can be explicit or implicit. For example, an explicit command may be a HTTP request, TCP request, and the like. In other cases, an explicit command may be a command word or phrase associated with a specific action in the target platform. In other cases, a command may be implicit. An implicit command may be a word or phrase that is associated with a particular operation in the target platform, such as "create new document in document platform" or "create new task in task platform." These commands may be executed prior to and/or in parallel with remaining portions of prompts provided as input to a generative output engine. In other cases, an embedded call may be expressly performed before any call to a generative output engine is made. For example, an explicit or implicit command may be a field identifier, such as "$ {task (id=123) .name.asString( )}" that requires a request to retrieve a name attribute of a specified task, cast as a string. This command may be executed before, and the response from it may be replaced within, a prompt submitted to a generative output engine.

As shown in FIG. 12, the generative response may be formatted in accordance with predefined text of the prompt. In the example depicted in the preview window 1220, the generative output is formatted in a table format that may be in an editor-specific format or object type. Further, the content inserted in the table 1222 may be content generated by the generative output engine using data extracted from the issue tracking platform or other platform associated with the named project in the user input. The generative output engine may provide the formatting or may provide the response in a format that can be interpreted by and converted using the editor assistant service. In one example, the predefined prompt query text includes example input output pairs that instruct the generative output engine to provide the response or output in accordance with a particular schema. For example, the predefined prompt query text may request the content in a comma or other character delineated format. In some cases, the predefined prompt query text requests that the output be formatted in a markdown format. The output formatted in accordance with the requested schema may then be transformed or converted into a format or schema consistent with the editor of the current collaboration platform. An example of how a platform-specific or editor-specific schema or format can be handled using a generative service is described above in more detail with respect to FIGS. 4 and 5.

In the example depicted in the preview window 1230, the generative output may be displayed as a list of selectable object links 1232, 1234, 1236, each selectable object link having content extracted from the respective source platform (e.g., the issue tracking platform). Additionally, the selectable object links 1232, 1234, 1236 may include content generated by the generative output engine. For example, the generative output engine may be used to generate a title, summary, or bulleted action for each selectable object links. The selectable object links may also include embedded content (e.g., graphics or other content) obtained from the respective source platform and each object link may be selectable to cause redirection to the respective item or object on the respective source platform.

Similar to the table example, the generative output engine may be instructed on the editor-specific format or schema used to define the selectable object links in the editor of the current collaboration platform. In other implementations, the editor assistant service may transform or convert the generative response into the editor-specific format or schema in response to the generative output engine providing the content in accordance with a schema instructed in the predefined query prompt text.

Similar to the previous examples, each of the preview windows 1220 and 1230 may include controls for inserting the response content into the editor, copying the content into a clipboard, or directing the content to another aspect of the system. Specifically, preview window 1220 includes copy control 1226 and insert control 1224 and preview window 1230 includes a similar copy control 1240 and insert control 1238. Further, similar to previous examples, the content may be edited within the preview windows 1220, 1230 prior to being inserted or copied. Also, similar to previous examples, the content provided in the preview windows may be used to construct additional prompts for further processing by the generative output engine.

Figure 13A:
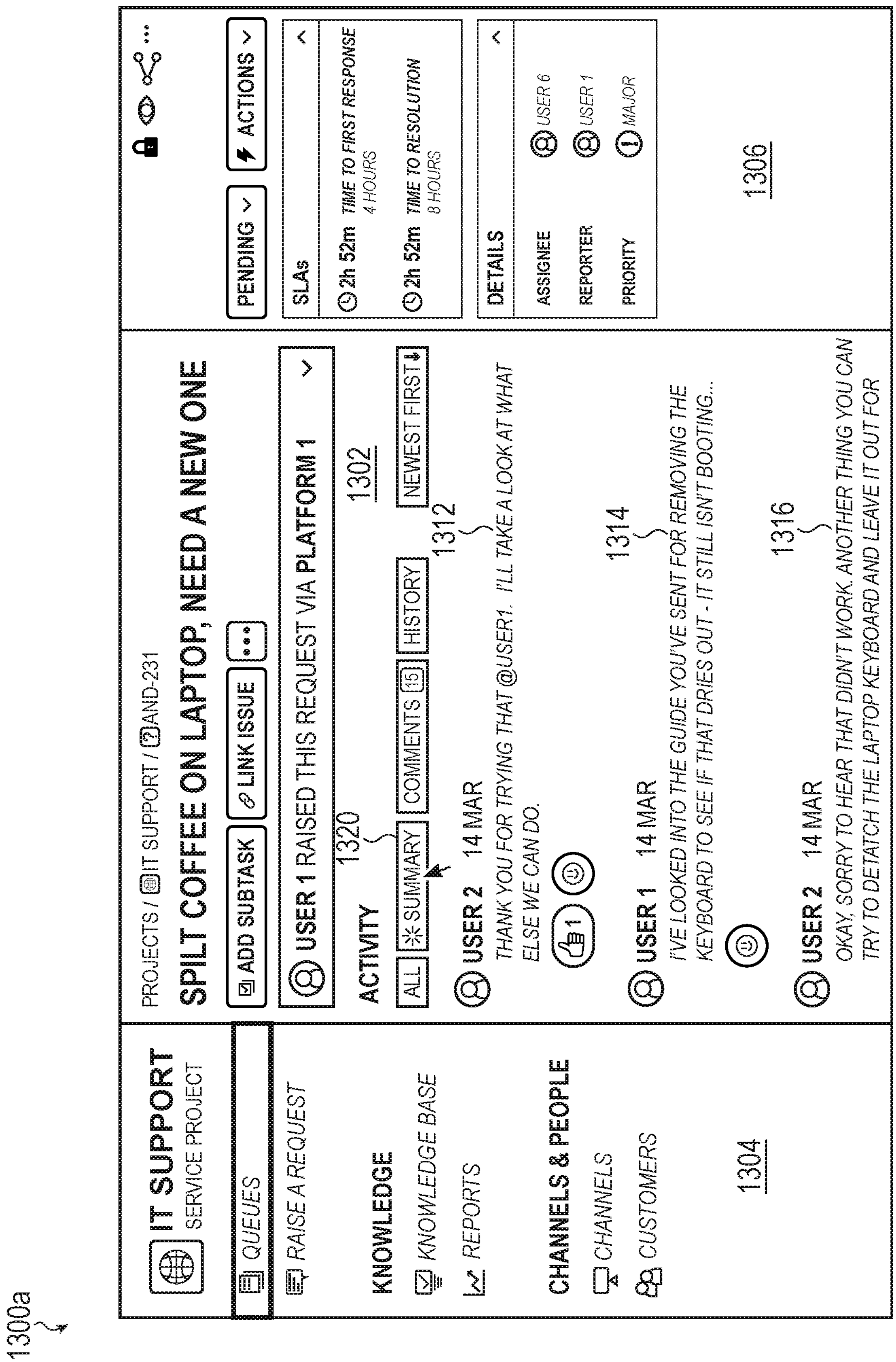
FIGS. 13A-13B depict an editor assistant service invoked to provide a summary of comments, events, or other entries associated with an object of a collaboration platform.
Figure 13B:
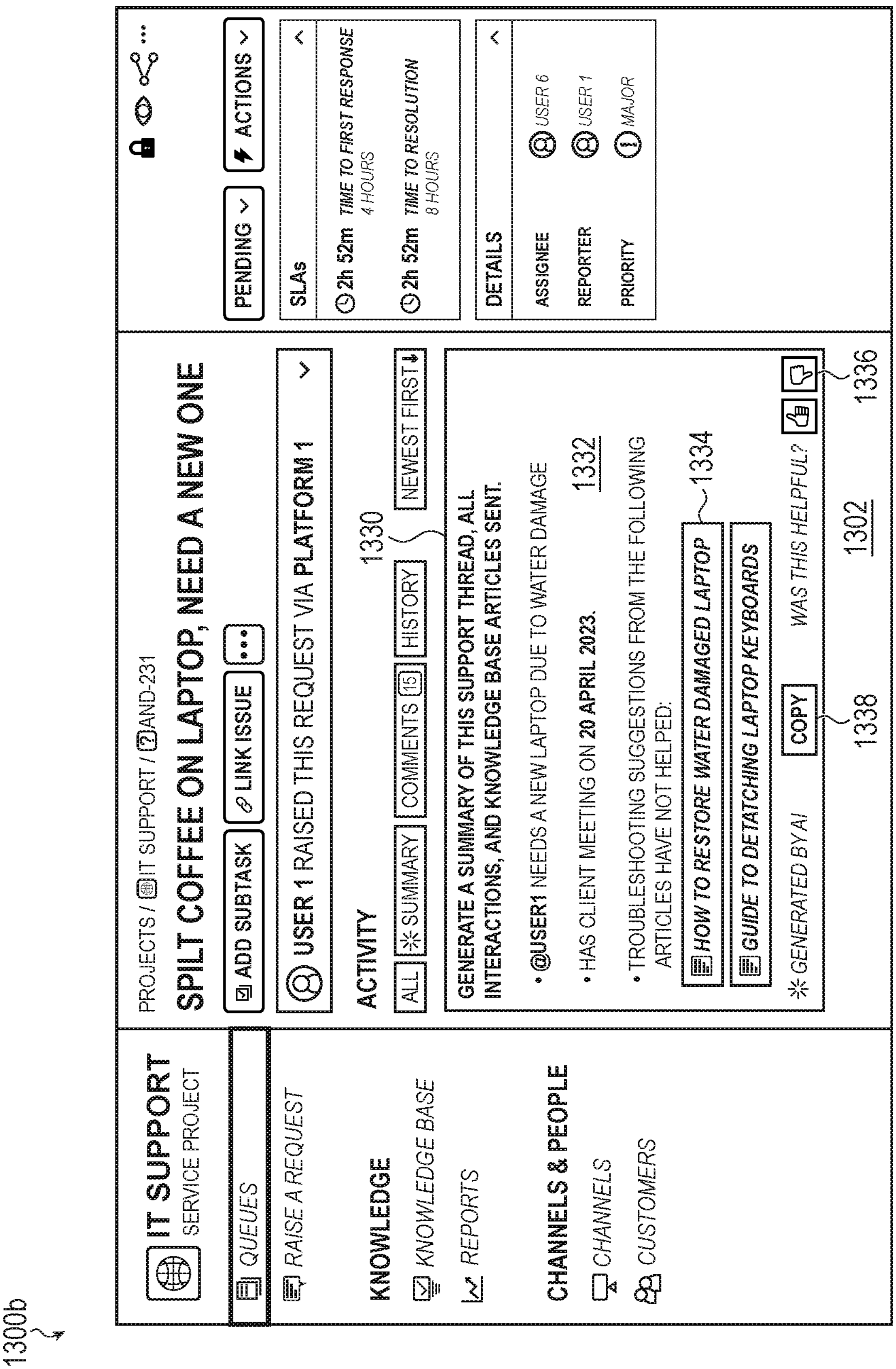

FIGS. 13A-13B depict additional examples in which an editor assistant service may be used to transform content or provide other generative output using content that is not necessarily contained in a single or continuous region. Specifically, as shown in the graphical user interfaces 1300*a*, 1300*b*, an editor assistant service may be used to summarize a series of user comments, event entries, or other discrete items associated with a system object. This functionality may help a user more easily digest a large amount of content that may extend beyond a single screen or view of the graphical user interface. The summary may also omit non-substantive content, repeat entries, and other content that may be distracting or difficult to review quickly. These examples also illustrate how an editor assistant service may be invoked through a dedicated control 1320 provided by the graphical user interface.

The example graphical user interfaces 1300*a*, 1300*b* of FIGS. 13A-13B are an example issue view of an issue tracking platform or system. As shown in the illustrated examples, the graphical user interfaces 1300*a*, 1300*b* include multiple regions. Specifically, the graphical user interfaces 1300*a*, 1300*b* include a navigational region 1304, an issue summary or quick-view region 1306 and a main region 1302. In some implementations, the main region 1302 may be a single continuous editor region. However, in the present example, the main region 1302 includes a series or set of distinct entries, which may each included an individual editor region or may simply include text in a series of discrete event or comment objects.

With reference to the graphical user interface 1300*a* of FIG. 13A, in response to a user selection of the control 1320, the editor assistant service may be invoked to provide a summary of the comments, events, or other entries associated with the current object. Similar to the previous examples, selection of the control 1320 may cause the editor assistant service to extract content from each of the entries and insert the extracted content into a prompt. The prompt may also include predefined query prompt text that includes instructions or examples for providing a summary of the entries. The prompt is provided to a generative output engine, which produces a generative output or response.

An example prompt provided as input may be:

```
{
  "input_prompt": "List all changes to this document since I
last visited.",
```

-continued

```
  "prompt_with_embedded_command" : "${SELECT
description FROM TABLE edit_log WHERE date_added <
User123.ThisPage.LastVisit }"
}
```

In some cases, the pseudo-query language translation of the input prompt may be, itself, a generative output of a generative output engine. In these examples, a first request may be submitted to a generative output engine such as:

```
{
  "input_prompt": "List all changes to this document since I
last visited.",
  "modified_prompt " : "Convert the following phrase [list all
changes to this document since I last visited] into a Query Language
query against a table named 'edit_log' with columns: id, description,
date, user.id. Consider 'this document' to be Page123 or by the
variable name ThisPage, which is an attribute of the user User123."
}
```

In response to receiving this modified prompt, the generative output engine may generate the previous example pseudo-query language query.

FIG. 13B depicts the graphical user interface 1300*b* subsequent to the selection of the control 1320 of FIG. 13A. In the graphical user interface 1300*b*, a preview window 1330 is displayed overlaying the main region 1302. The preview window 1330 includes an output response 1332 provided by the generative output engine. The output response 1332 includes a summary of the extracted content and may be a curated list and summary of the key events or comments that were provide in the prompt. The current example depicts the summary as a bulleted list. In other implementations, the summary may be provided in a narrative or paragraph format. The preview window 1330 also includes a list of link objects 1334, which may have been identified by the generative output engine or may have been gathered by the editor assistant service. Similar to previous examples, the link objects 1334 may be selectable link objects that contain content extracted from the respective linked content and/or may include content generated by the generative output engine. The link objects 1334 may also include embedded content and are selectable to cause redirection to the respective content item hosted by the respective platform or system.

Similar to previous examples, the preview window 1330 also includes controls 1338 for copying or directing the content. The example preview window 1330 also includes feedback control 1336, which may be used to indicate whether the articles or the summary are accurate or helpful. Selection of a positive or negative feedback may influence the creation of subsequent prompts. For example, if a threshold number or relative percentage of negative feedback results are received, the predefined prompt query text may be supplemented or modified to provoke a different response from the generative output engine. This may be performed automatically and without significant intervention from a system administrator. In some cases, the feedback is collected and used for system analytics or performance measurements.

Figure 14A:
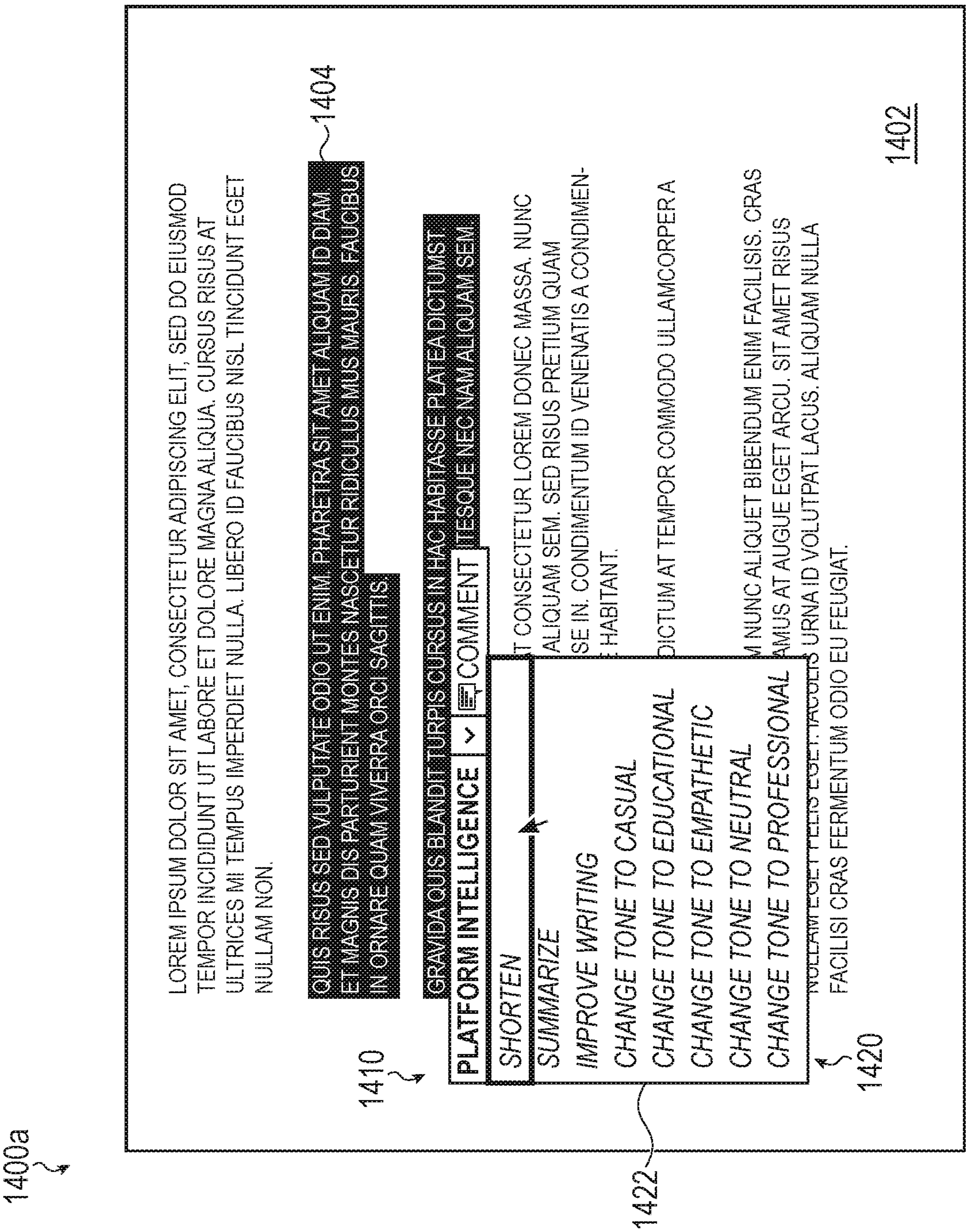
FIGS. 14A-14B depicts an editor assistant service causing display of a command selection interface window including a list of command controls.
Figure 14B:
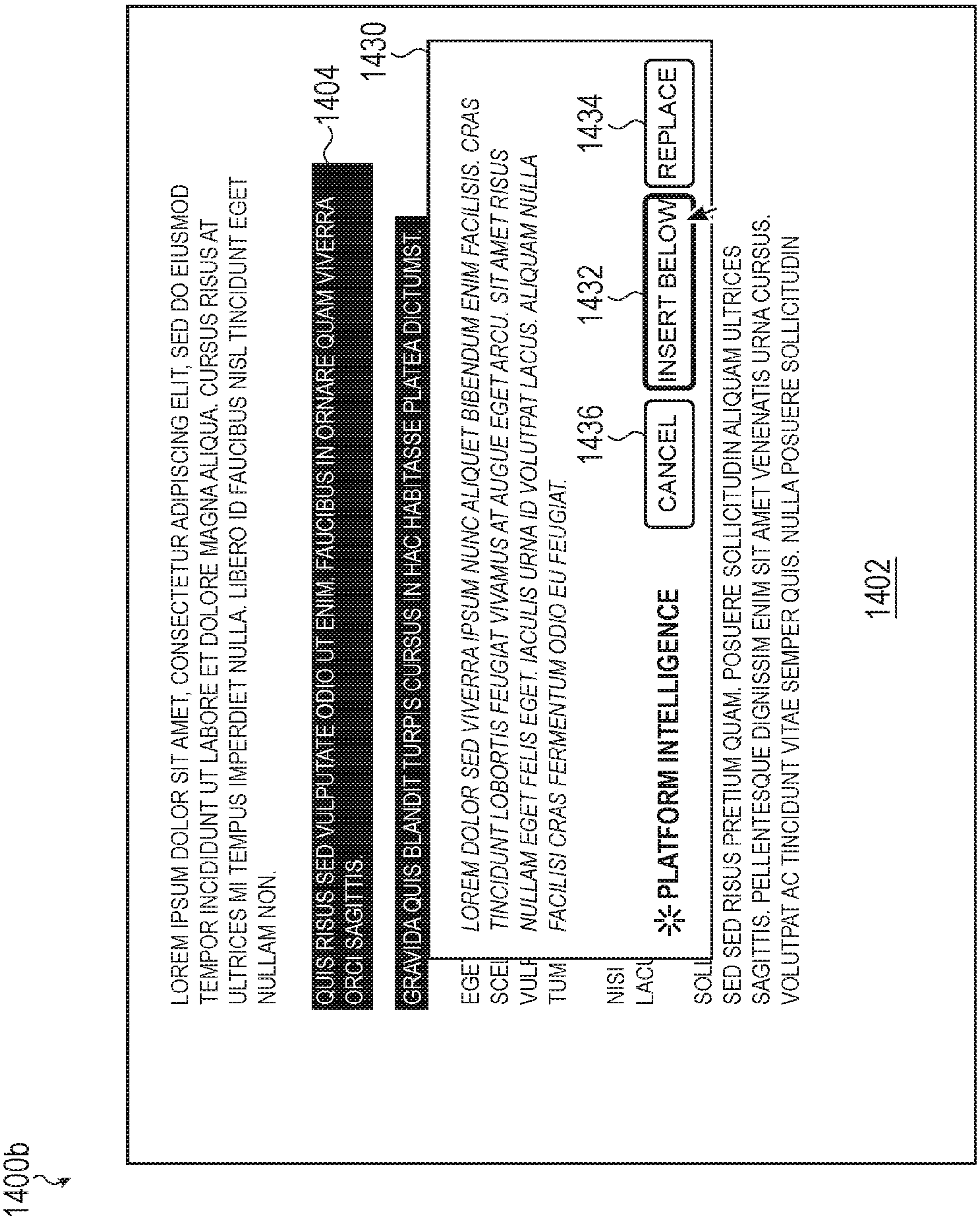

FIGS. 14A-14B depict further examples of use of an editor assistant service with a collaboration platform. In particular, the examples of FIGS. 14A-14B depict an editor assistant service that is able to operate on a snippet or portion of user-selected content within an electronic document. The example graphical user interfaces 1400*a* and 1400*b* of FIGS. 14A and 14B represent a portion of an editor or content region 1402 of a graphical user interface similar to the examples provided above with respect to FIGS. 5 and 13A-13B. A description of the various aspects of an editor region and content region are not repeated here to reduce redundancy.

As shown in FIG. 14A, a user may select a portion of content 1404 of an electronic document or page using a cursor drag or gesture input to the graphical user interface 1400*a*. As shown in FIGS. 14A-14B, the selected portion 1404 of the electronic document may be displayed in highlight or using some other visually distinguishing graphical effect. In response to an input (e.g., a pause, hover, right-hand mouse button selection), a control 1410 may be displayed with an option for invoking the editor assistant service. Alternatively, the graphical user interface 1400*a* may include a dedicated control (similar to the control 1320 of FIG. 13A) which is selectable to cause invocation of the editor assistant service. As shown in FIG. 14A, the editor assistant service may cause display of a command selection interface window 1420 may be displayed including a list of command controls 1422. Similar to the examples described above, the command controls 1422 may each correspond to a different content modification or content generation action, which includes, but is not limited to, a summarize action, writing improvement suggestion action, a change tone action (e.g., change tone to casual, change tone to educational, change tone to empathetic, change tone to neutral, change tone to professional), create a list of action items, summarize decisions, suggest a title or heading, or other potential actions.

As discussed previously, in response to a user selection of a particular command control 1422, the system may generate a prompt including predefined prompt query text that corresponds to the selected command control. In some cases, the system may include predefined prompt templates or excerpts that are used to generate the custom prompt. In this example, all or at least a portion of the selected content is also added to the prompt. In some cases, the selected portion of the document is modified or adapted before it is added to the prompt. For example, non-standard characters, formatting tags, and multi-media content may be removed before inserting the selection in the prompt. In other cases, non-standard characters, formatting tags, and even images or other multi-media content may be included in the prompt or modified to conform with a format compatible with the generative output engine. Similar to previous examples, the prompt may be provided to the generative output engine, which produces a generative output or generative response based on the prompt.

As shown in FIG. 14B, the generative output or response is displayed in a preview window 1430 which overlaps or is otherwise displayed over the content of the editor or content region 1402. The generative output or response may be formatted in accordance with a schema corresponding to the selected portion 1404 including editor-specific markup tags, text arrangement, non-textual elements, and other content present in the selected portion 1404. Similar to the previous examples, the preview window 1430 may include multiple controls 1432, 1434, 1436 for inserting or otherwise directing the response into electronic content. Specifically, the preview window 1430 includes a control 1432 for inserting the response content below the selected portion 1404, a control 1434 for replacing the selected portion 1404 with the response content, and a cancel control 1436. Other controls may include copying to a clipboard, inserting the response content into another document or other electronic content, or other actions. The response content of the preview window 1430 may also be user editable, as described previously. The preview window 1430 may also include controls or fields for using the response content in a prompt for further processing by the generative output engine.

Figure 15:
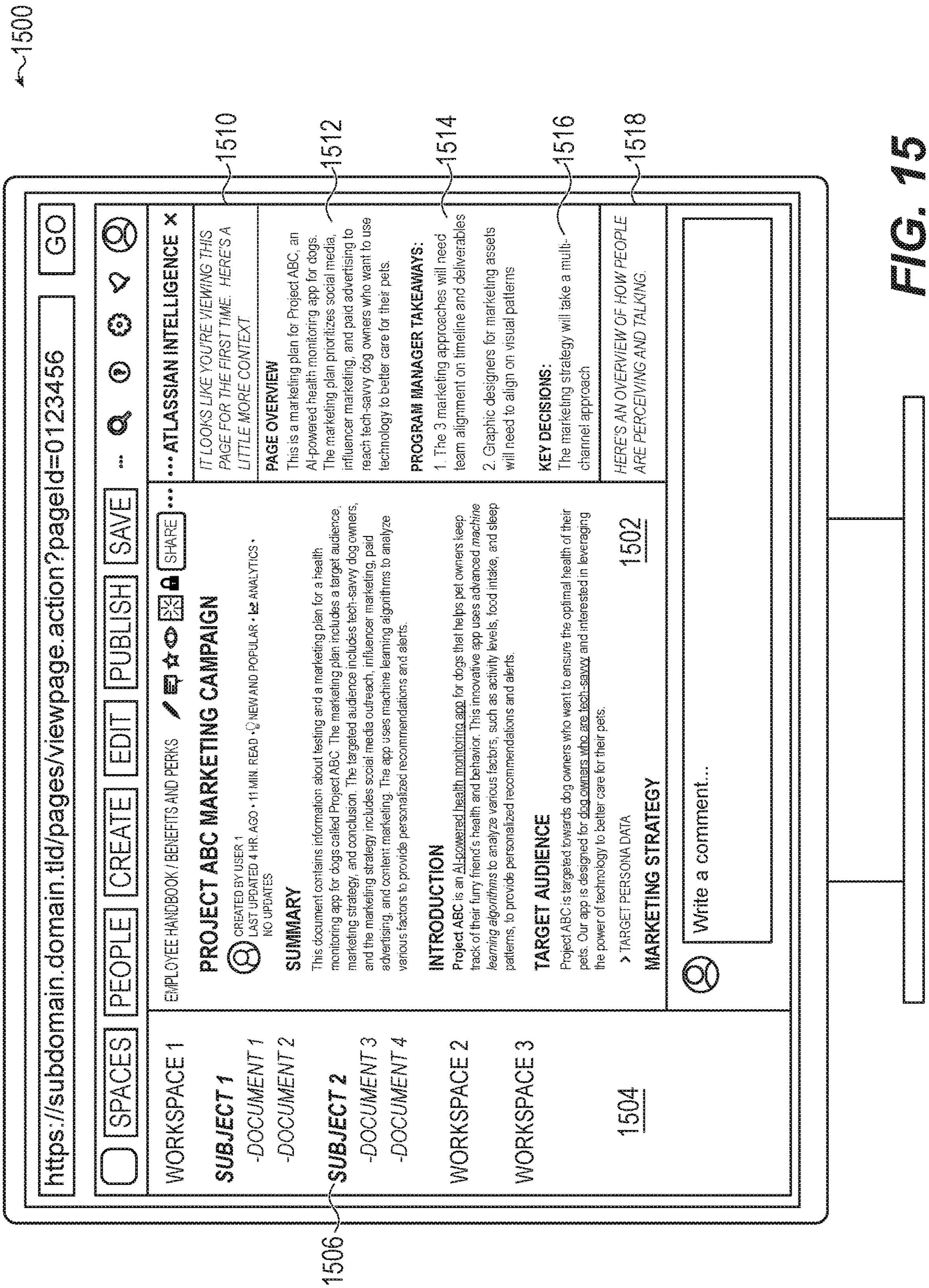
FIG. 15 depicts another example of use of a generative output engine with a collaboration platform.

FIG. 15 depicts another example of use of a generative output engine with a collaboration platform. In the current example, the collaboration platform is a documentation platform with a frontend operating on a client device. The frontend of the documentation platform causes display of a graphical user interface 1500 on the display of a client device. This particular graphical user interface 1500 includes a multiple panel or multiple region graphical user interface, similar to the example described above with respect to FIG. 9. Similar to previous examples, the graphical user interface 1500 includes a main panel 1502, which may be operated as a content viewing or content reading panel and transitioned to a content editor panel. Also similar to previous examples, the graphical user interface includes a navigational panel 1504 that includes selectable navigational elements. In particular, the navigational panel 1504 includes a hierarchical navigational element tree 1506 of elements in which each element is selectable to cause display of the respective content of a corresponding content item (electronic document or page) within the main panel 1502. Similar to other examples described herein, the navigational panel 1504 may include other navigational trees or elements that are selectable to cause display of respective content. The navigational panel 1504 may also include other selectable elements that are selectable to cause navigation to other aspects of the system including, without limitation, calendars, blogs, analytics, user profiles, and other endpoints accessible by the graphical user interface 1500.

In the example of FIG. 15, the graphical user interface 1500 of FIG. 15 includes an additional region referred to herein as a summary region 1510. The summary region 1500 is positioned along the periphery of the graphical user interface 1500 and, in this example, is positioned along a side of the main region 1502 opposite to the navigational region 1504. The summary region 1510 includes multiple sub-regions or predefined areas that may include generative output provided by a generative output engine. In general, the summary region 1510 includes content that is generated based on content displayed in the main panel 1502 using content extracted from the electronic document or page being viewed or edited in the main panel 1502.

In accordance with the techniques and examples provided herein, content may be extracted from the corresponding document or page content and may be used to generate one or more prompts. The one or more prompts may include predefined query prompt text that is selected in accordance with a content type of the particular page, a role of the user, or other context data associated with the current session. For example, the one or more prompts may include predefined query prompt text that is adapted for one or more of: a project content type, a knowledge base or knowledge base documentation content type, a user or product profile content type, a blog or journal content type, a meeting notes content type, a code summary or code documentation content type, or other content type. The content type of the particular or current page or document may be determined in advance and the content may include one or more tags or document metadata that indicates the content type. In other implementations, the content type may be determined based on a semantic analysis or other natural language processing analysis of the page or document content subsequent to the page or document being loaded into the graphical user interface for display. In some cases, the content type is based on pages or documents that are proximate to the current page or document in the hierarchical navigational tree of elements 1506.

Similarly, the predefined query prompt text may be based on a user role or other aspect of the user profile. For example, the type of summary, tone of the summary, technical character of the summary may vary depending in accordance with a predicted use of the authenticated user. Specifically, an authenticated user having a role that is more technical (e.g., engineer or software developer) may be provided with content that is more technical or detailed as compared to an authenticated user having a role that is less technical. In this way, the content of the summary region 1510 may change in accordance with the authenticated user accessing the page or document. Similarly, the predefined query prompt text may also vary in accordance with other context data including, for example, other applications being concurrently used, user view history of user event logs from a current or recent session, other content or objects being concurrently viewed or edited or having been viewed or edited in a recent session. For example, the system may detect a concurrent use of a messaging platform or issue tracking platform indicating that the current user is providing assistance in accordance with an information technology system management (ITSM) role or session. As a result, the predefined query prompt text may be selected in order to extract steps or a procedure outline from the currently viewed content. When the same user views the current page or document during another session (not associated with an ITSM role or session), the predefined query prompt may be selected in order to provide a more general content summary or other information to the user. Thus, the content provided in the summary region 1510 may vary for a particular user in accordance with a change in context data.

As described previously, a prompt, including the predefined query prompt text and content extracted from the current page or document, may be provided to a generative output engine. The generative output engine may produce a generative output or generative response, which is used to generate or render the content in the summary panel 1510. In one example implementation, the summary panel includes multiple generative content that may be generated in response to a single composite prompt or in response to multiple prompts that are provided to the generative output engine. In the example of FIG. 15, the summary panel 1510 includes a content summary that is based on content extracted from the current page or document. In some cases, the content summary includes content that is extracted from pages or documents that are proximate to the current page or document in the hierarchical navigational tree of elements 1506. In some cases, the content summary also includes content that was extracted from pages associated with the current user or with a project associated with the current user. In the summary panel 1510 of FIG. 15, the generative response may also include a list of task summary items generated by the generative output engine using the page or document content and predefined query prompt text. As described herein, the predefined query prompt text may be formulated to cause the generative output engine to identify action items or task summaries in a portion of provided content.

The summary panel 1510 may also include link objects or other selectable objects that correspond to other content items that are related to the current page or document. In some cases, one or more additional prompts are provided to the generative output engine, which is used to provide summaries, brief titles, or other generative content based on content extracted from each respective linked content item. The summary panel 1510 may include other content including related user accounts, related projects, or other information derived from the currently displayed content and/or the current user session.

Task Extraction, Decision Points, & Summaries

FIGS. 16A-17B depict examples of how a generative output engine can be used to provide a task or action item summary for content of a collaboration platform. For example, a generative output engine can be used to identify a set of tasks or predicted action items in either an entire document or in a set of selected text. The tasks or action items may be inserted into the content or they may be used to automatically generate a set of issues or tasks in an issue tracking platform or system.

Figure 16A:
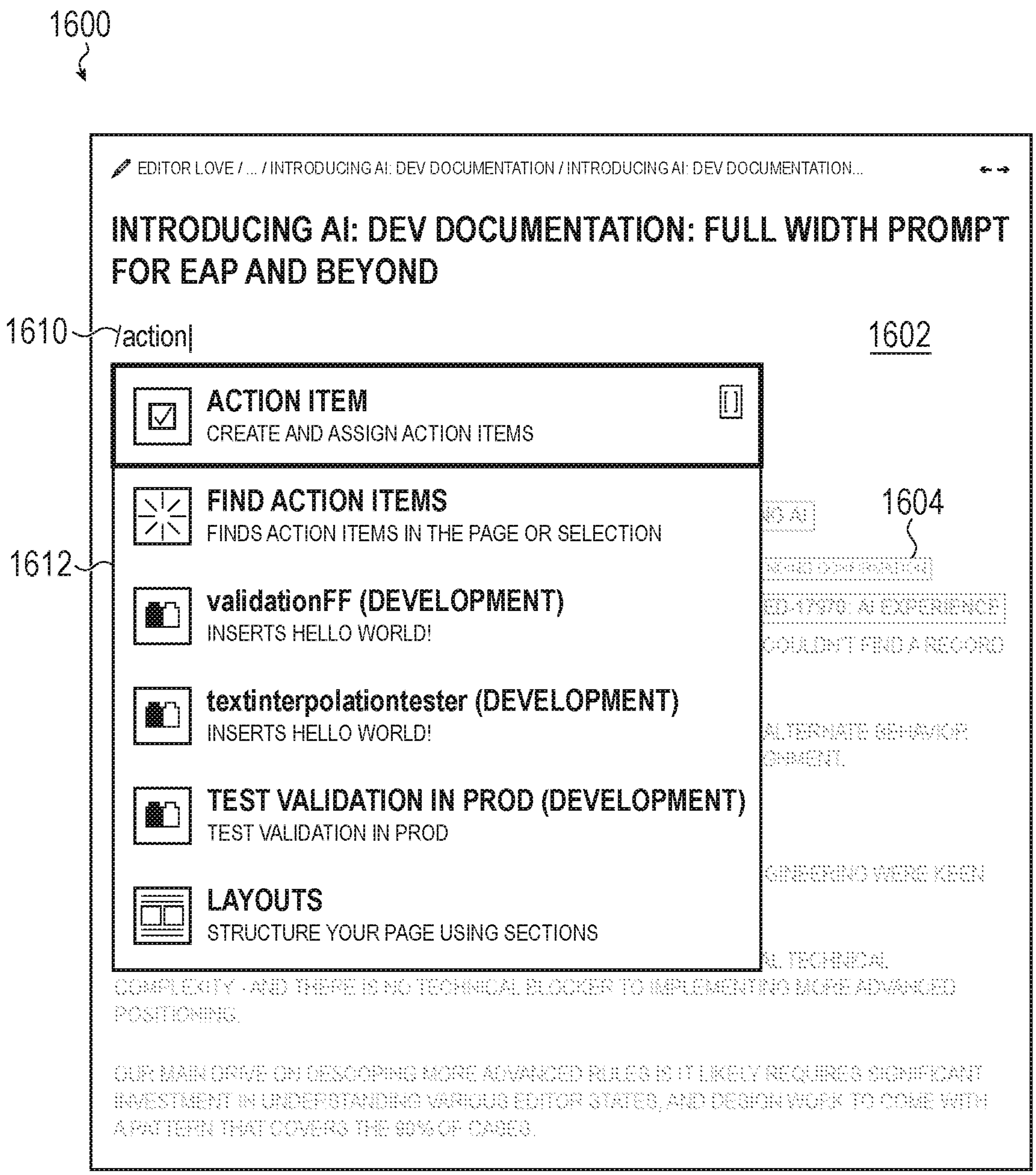
FIGS. 16A-16D depict an example result of invocation of an editor assistant service that can be used to generate a list of tasks or action items in an editor region of a graphical user interface.

FIG. 16A depicts an example result of invocation of the editor assistant service that can be used as a list of tasks or action items in an editor region of a graphical user interface. Similar to preview examples, the editor assistant service may be invoked using a designated character or character sequence (e.g., a slash command of FIG. 6A-6B) or make be invoked using another control or user interface element. In the present example, a designated character or character sequence 1610 is entered into an editor region 1602 of a graphical user interface 1600.

In response to a user input comprising the designated character 1610, a command selection interface window 1610 may be displayed including a list of command controls 1612, also referred to herein as content-assistant controls. Each command control 1612 or at least some of the command controls, are associated with a content modification action, which may be partially described or indicated in the respective command controls 1612. In some cases, the command controls 1612 include functions or operations that do not necessarily invoke the editor assistant service or the use of the generative output engine.

Figure 16B:
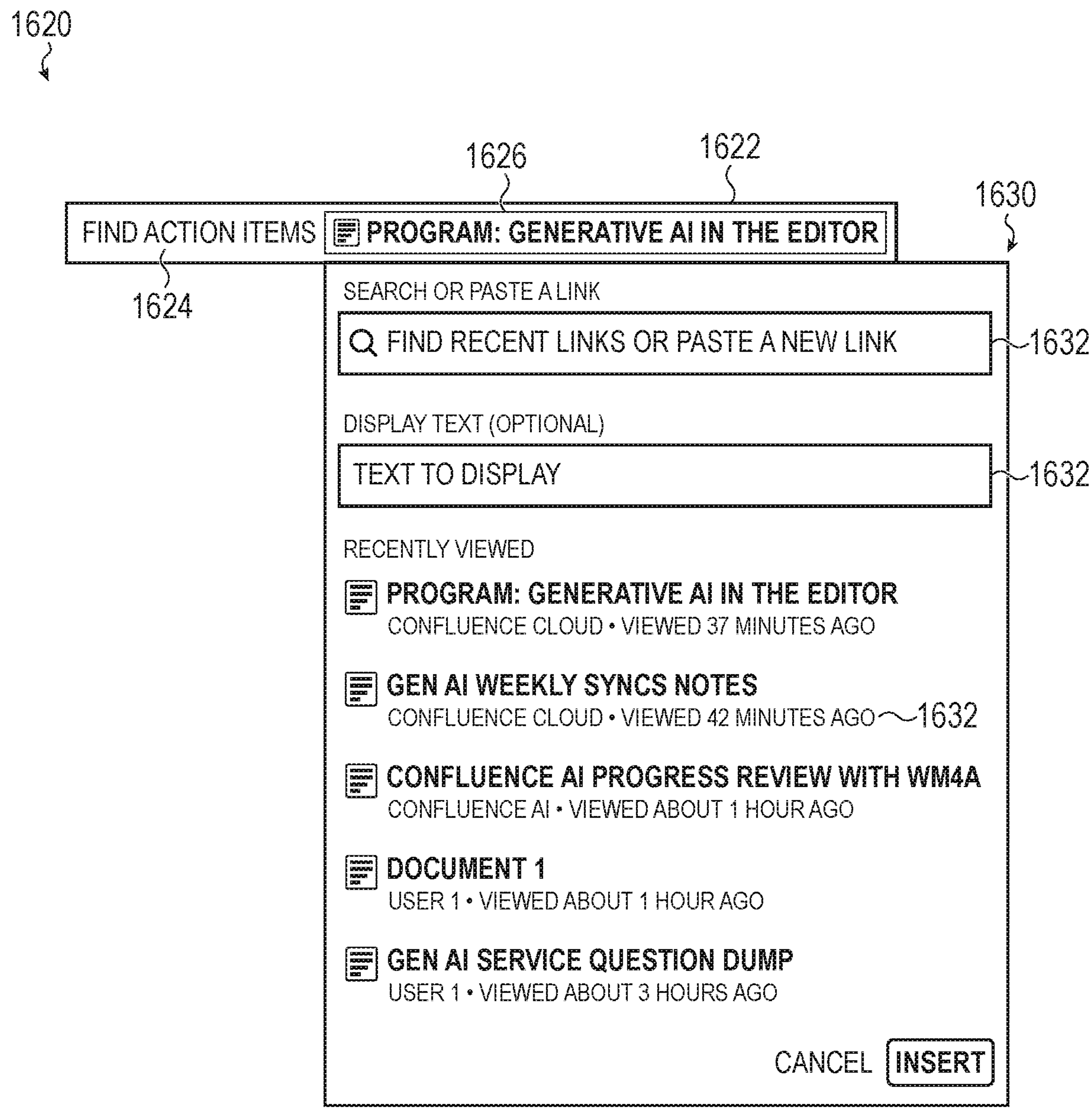

In response to a user selection of the action item command control 1612, the editor assistant service may cause display of a command prompt interface 1620 as shown in FIG. 16B. The command prompt interface 1620, may replace an in-line command character or character sequence entered into the editor region 1602. As shown in FIG. 16B, the command prompt interface 1620 includes a user input region 1622 which is configured to receive user input. The user input region 1622 may receive user-entered text, which may specify a content modification action, prompt text, or source of content to be analyzed or modified. In the present example, the user input includes a graphical object 1624 corresponding to an action to "find action items," which was inserted as a result of the selection of the command control 1612.

Similar to other examples provided herein, the user may provide further user input that may be used to supplement or replace the action indicated by the graphical object 1624. For example, the additional user input may specify a format for the output or a further instruction (e.g., generate in a table format, sort results chronologically). The user may also specify an object to be acted on or to be a subject of the action. The additional user input may include a text string to be analyzed or a pointer or link to content to be used as part of the proposed action. In this example, the system renders an object selection interface 1630. The object selection interface 1630 includes an input region 1632 for receiving user search terms or other input that may be used to identify content items.

The object selection interface 1630 also includes a results region 1634, which may display a list of selectable elements, each element associated with a content item that was identified using user input provided to the input region 1632. In some cases, the results region 1634 displays recently selected, recently viewed content items, or another curated list of content items predicted to be relevant to the object link creation process. Similar to previous examples, the object selection interface 1630 also includes other regions 1636 and controls that may be used to configure how the object is to be displayed or used. In some implementations, multiple tabs or other selectable area may be used to toggle between different content providers. The list of content providers may be determined by a registry of validated content providers that have registered with the service and are able to provide access to remotely hosted content items based on a user credential, token, or other authenticating element, which may be authenticated in advance of the object search process using a single-sign-on or other authentication scheme. In response to a user selection of a particular element displayed in the results region 1634, a link object may be created and positioned within the user input region 1622.

In response to selecting an item in the results region 1634 of the object selection interface 1630, link object 1626 is positioned in the user input region 1622 of the command prompt interface 1620. In the present example, the link object 1626 includes a link or path designating a location or endpoint at which the electronic document can be accessed. Similar to previous examples, the link object 1626 includes a graphical element or icon that represents the type of object that is linked and a text descriptor, which may be obtained from the linked object or may be expressly entered using the object selection interface 1630.

In response to a user input indicating that the user input region is complete, the editor assistant service creates a prompt including predefined query prompt text having an action-request instruction set and content extracted from the linked object. In some implementations, the content extracted from the linked object is a text-formatted version of the content extracted from the linked object. The action-request instruction set may include instructions for generating a list of items that require an action, a list of tasks to be completed, a request for ordering the list, and a format request for the resulting list. In some cases, the action-request instruction set is adapted in accordance with a user profile of the requesting user. In particular, the action-request instruction set may be adapted to include role-focused tasks. For example, in accordance with a determination that the requesting user has a role consistent with a technical position, the action-request instruction set may be adapted to request engineering or technical tasks to be performed. Similarly, in accordance with a determination that the requesting user has a role consistent with a business or marketing position, the action request instruction set may be adapted to request strategic or marketing related tasks. In some instances, a user graph or project graph generated by the system may be used to adapt the action-request instruction set. In some cases, user event logs or user creation history is used to adapt the action-request instruction set.

Figure 16C:
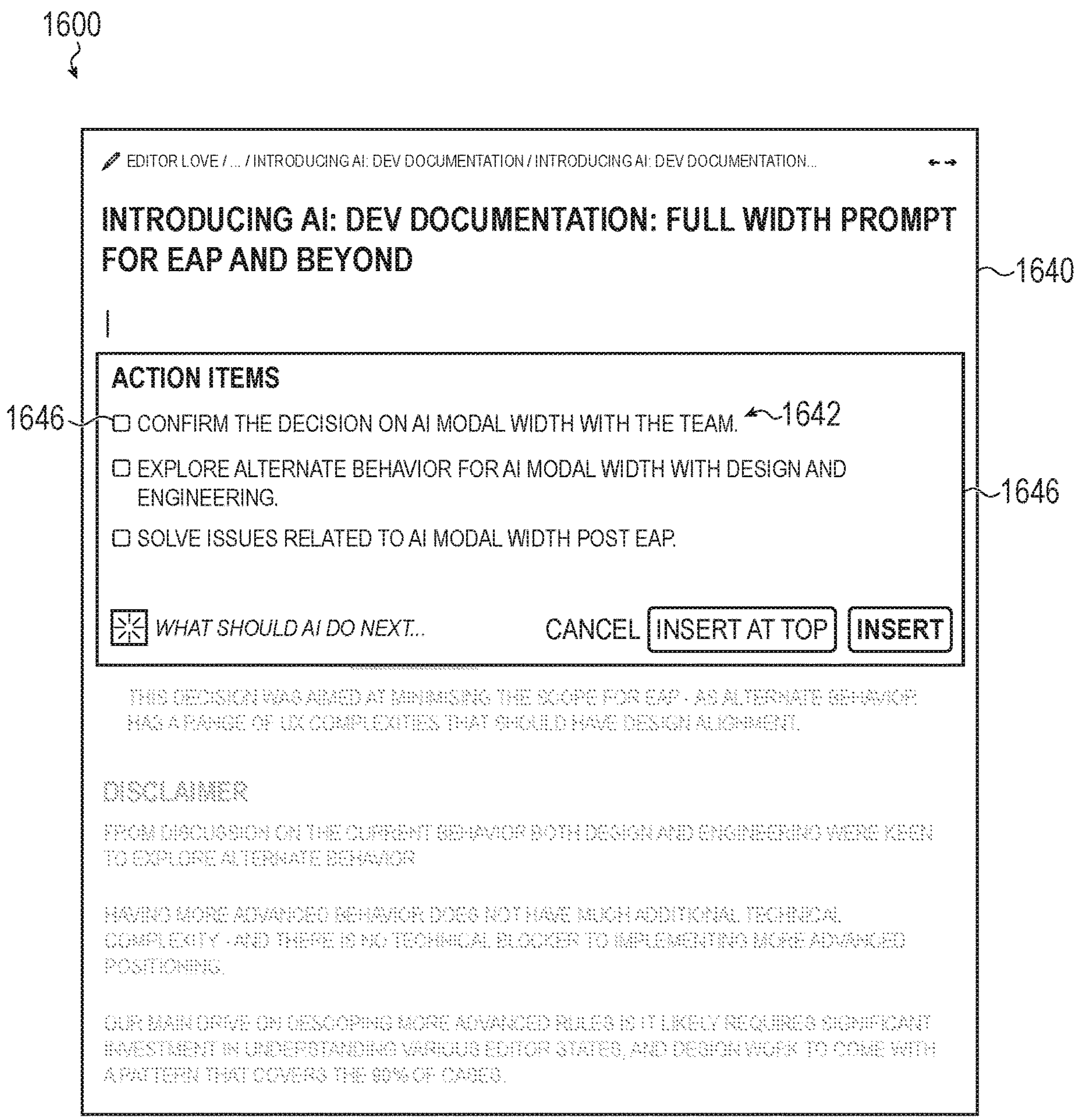

Similar to other examples described herein, once the prompt has been constructed, the prompt may be transmitted or communicated to a generative output engine, which generates a generative output or generative response. FIG. 16C depicts an example generative result 1642 rendered in a preview window 1640. The generative result 1642 includes a list of action items or tasks that were derived from the content of the selected object and are formatted in an editor-specific format to include icons 1646, which are selectable in order to indicate completion of a task or action item. In some cases, the generative result received from the generative output engine is transformed into the format of the result 1642, as shown in FIG. 16C. In other instances, the formatting may be generated by the generative output engine based on example input-output pairs demonstrating the desired formatting and schema requirements.

Figure 16D:
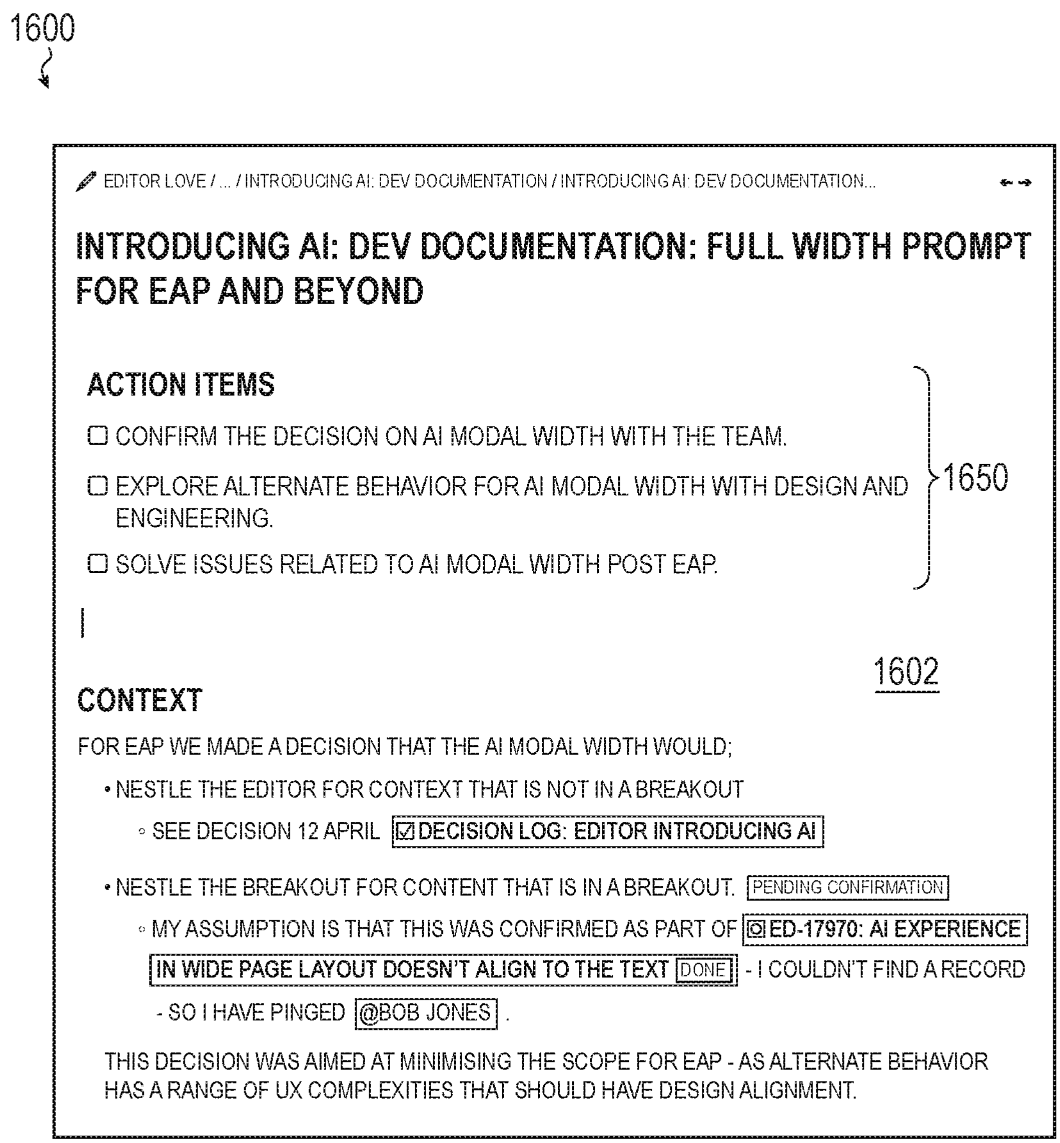

Similar to previous examples, the preview window 1640 includes one or more controls 1646 for directing the insertion of the response 1642 into a particular location within the document content, copying the response 1642 to a clipboard, or performing other actions with respect to the response 1642. FIG. 16D depicts the resulting document or page that is generated in result to a user selection of "insert at top" (from control 1646). As shown in the editor region 1602 of FIG. 16D, the results are generated as content 1650 near the top of the document and under the title and other possible header content.

In the event that only one or no tasks or action items are identified, an alternative message or communication may be displayed in the graphical user interface 1600. For example, if a threshold number of tasks or action items are not returned in the generative response, the system may cause display of a message that an insufficient number of results were found or that no results were found. In some cases, the threshold number of tasks or action items is one. In some cases, the threshold number is zero such that even if one result is found, it will be rendered in the preview window 1640. In other cases, the threshold number is greater than one. In some cases, the user can set the threshold number by adjusting a setting or configuration of the service.

Figure 17A:
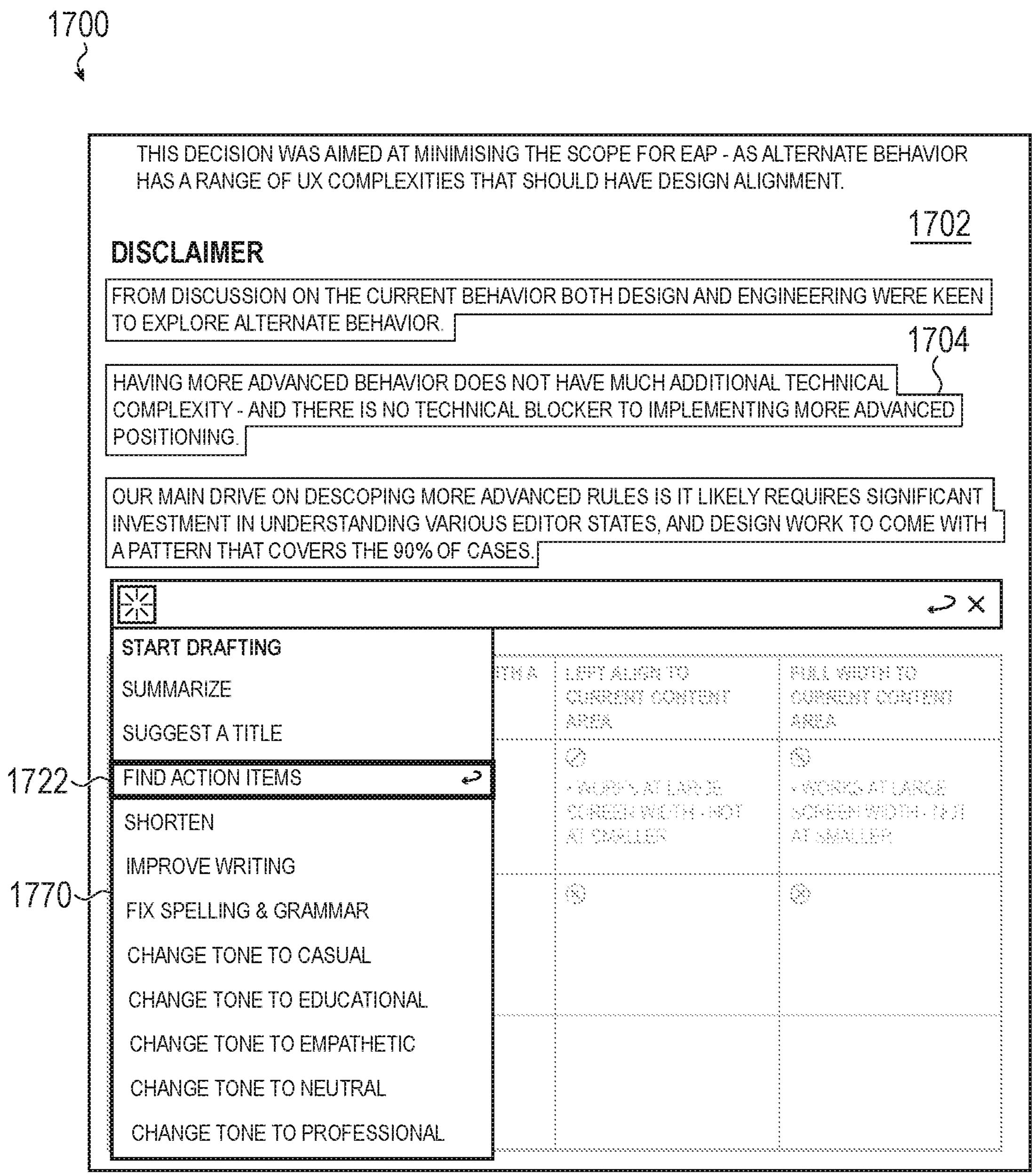
FIGS. 17A-17B depict an example result of invocation of an editor assistant service that can be used perform generative commands in an editor region of a graphical user interface.
Figure 17B:
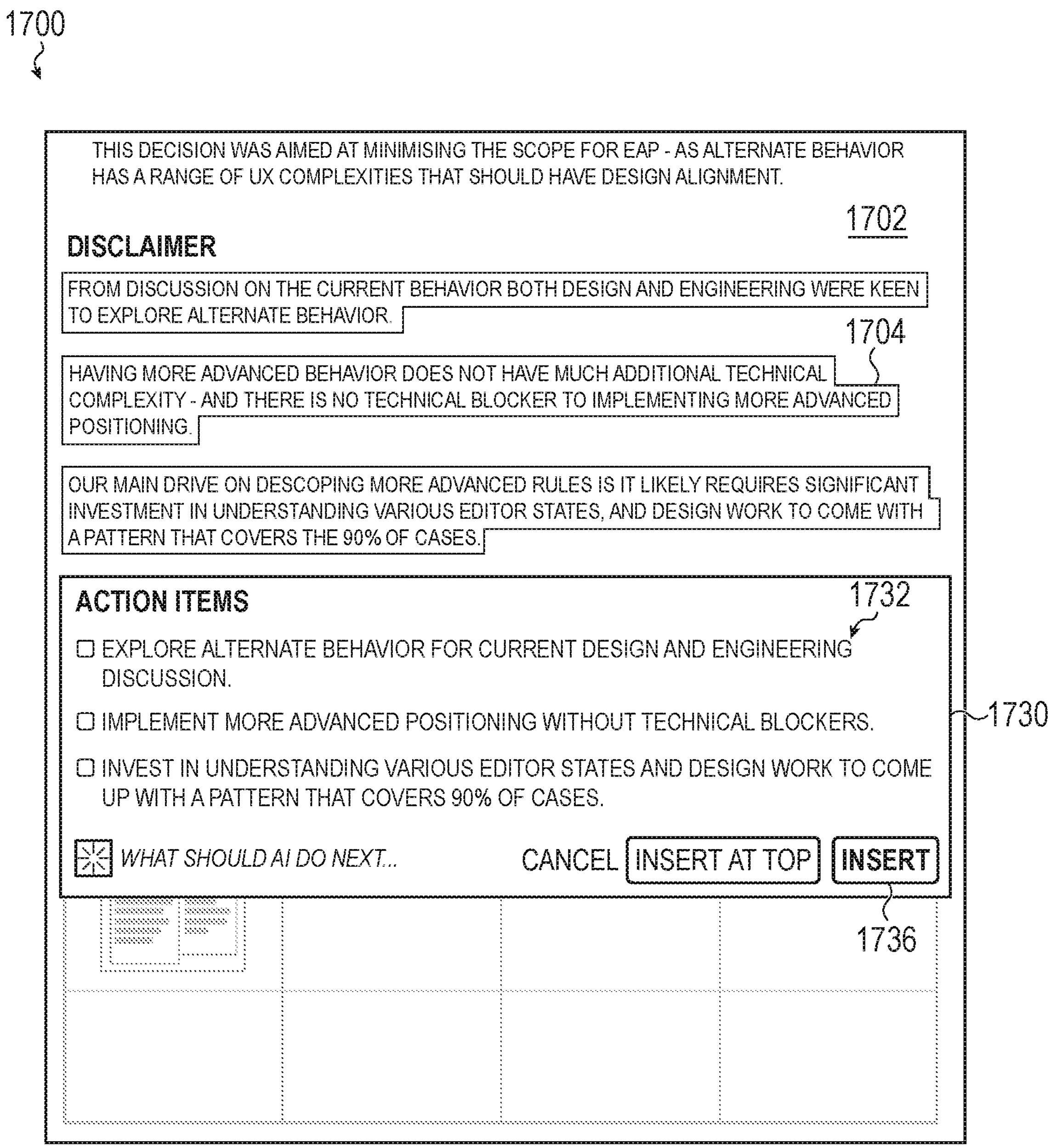

FIGS. 17A-17B depict another example sequence for generating a list of tasks or action items but using a user-selected content snippet or portion of a current document or pages. As shown in FIG. 17A, subsequent to a user selecting a portion of content 1704 displayed in an editor or content region 1702, a user may select a control or provide an input invoking the editor assistant service. As a result, a command prompt interface 1710 including a user input region 1712 may be rendered overlapping the or overlaying some portion of the content displayed in the editor or content region 1702. Similar to previous examples, a command selection interface window 1720 may be displayed including a list of command controls 1722, also referred to herein as content-assistant controls. Each command control 1722, or at least some of the command controls, are associated with a content modification action, which may be partially described or indicated in the respective command controls 1722. Generally, the command controls 1722 that are rendered in the command selection interface window 1720 may be selected based on the previous user action (e.g., the selection of the portion of the text 1704) and may be limited to actions that can be performed or are likely to be most applicable to selected portion 1704 of the content.

In response to a user selection of a particular command control (e.g., "find action items"), the editor assistant service may generate a prompt and communicate the prompt to a generative output engine, as described with respect to the previous example of FIGS. 16A-16D. Also similar to the previous example, the generated response 1732 (or transformed or formatted version of the generated response) is rendered in the preview window 1730. The response 1732 may be inserted into the content, saved to a clipboard, or otherwise directed as provided by controls 1736, similar to other examples described herein.

Content Contextualization & Specialized Summaries

A generative output engine may be used to assist other aspects of a collaboration platform. FIGS. 18-22 depict example implementations in which a generative output engine can be used to provide explanatory interface elements on request of a user viewing content provided by the collaboration system. As described in more detail below, the explanatory interface elements may include content obtained from a directory platform or other separate platform and include content that has been generated by the generative output engine. In some many internal documentation and project planning documents, code names, project names, and acronyms are used extensively as shorthand for various projects or initiatives within a company. While use of these words may improve efficiency in communication by eliminating the need to explain the context in a redundant fashion, the terms may not have meaning outside of a project or team. It may also be difficult to determine the meaning of the words or phrases without conducting independent research, which may involve multiple page access events, navigational interactions, and, in some cases, cross-product interactions. The system and functionality described with respect to FIGS. 18-22 can be used to provide supplemental content with respect to selected words or phrases that can help explain the use a meaning of internally coined terms, without having to navigate away from the current interface or platform.

Figure 18:
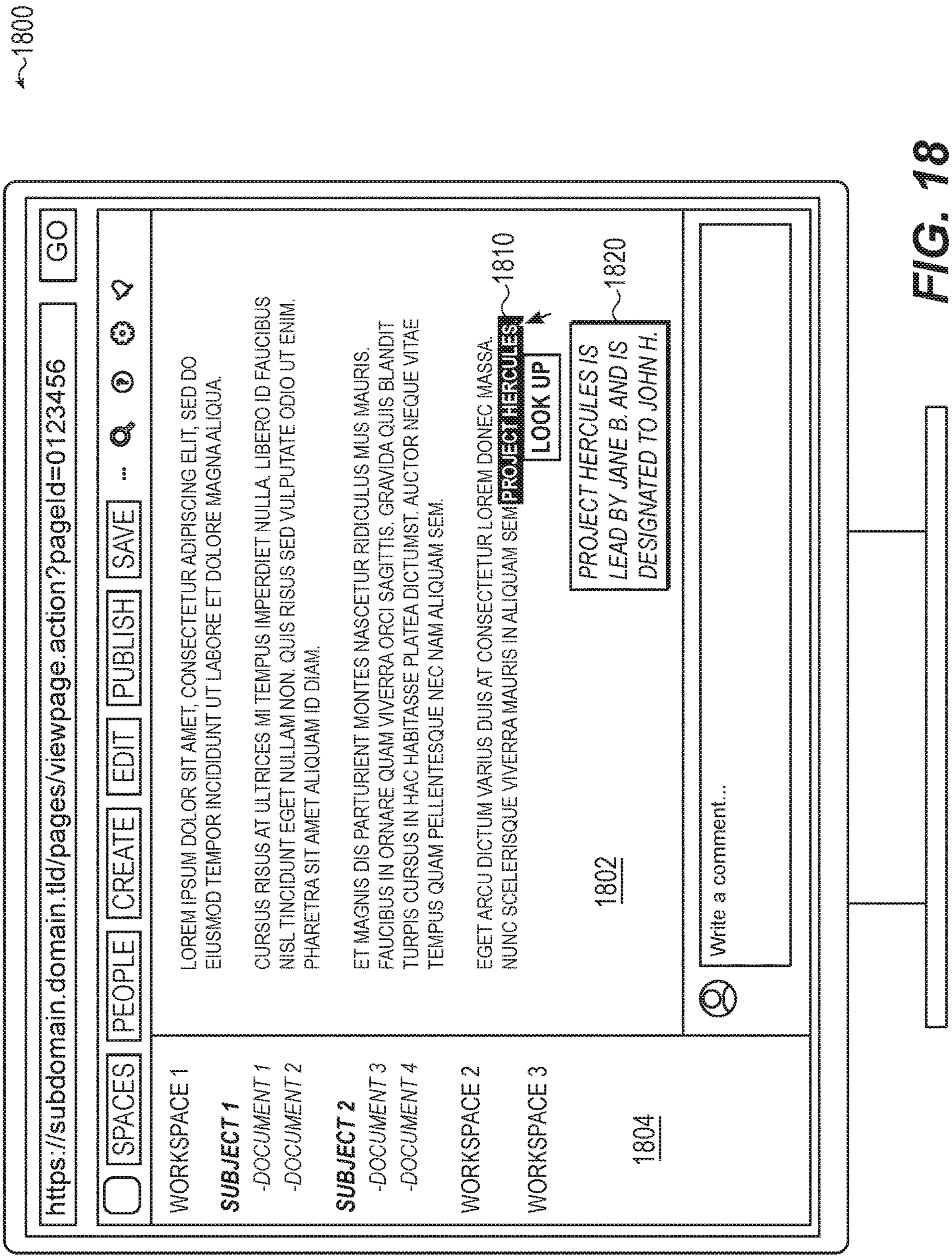
FIG. 18 depicts an example graphical user interface of a collaboration platform that includes supplemental content provided by a generative output engine.

FIG. 18 depicts an example graphical user interface 1800 of a collaboration platform that includes supplemental content provided by a generative output engine. In particular, the graphical user interface 1800 includes a tool or service that allows the system to provide supplemental explanatory content for selected words or phrases 1810 in the page or document content. As shown in FIG. 18, the graphical user interface 1800 is configured to render a supplemental content window 1820 (e.g., a window interface element) including content obtained from a separate platform or from content within the current collaboration platform. In the simplified example of FIG. 18, the supplemental content window 1820 includes a summary generated by a generative output engine in response to a prompt created, in part, using content extracted from a separate directory platform. A more detailed explanation of the generative creation process and the features of the content window 1820 are provided below with respect to FIGS. 19A-22.

Similar to previous examples, the graphical user interface 1800 includes multiple regions including a main or central region 1802, which may operate as a content viewing region or a content editor region, depending on the selected mode of the graphical user interface 1800. Further, similar to previous examples, the graphical user interface 1800 also includes a navigation region 1804 and other controls and graphical objects, previously described. While the following examples are provided with respect to a documentation platform, similar or the same functionality may be used in other collaboration platforms including issue tracking platforms, code management platforms, ITSM platforms, or other software applications.

FIGS. 19A-22 provide further example implementations of supplemental content that can be provided by a generative output engine. Each of the examples depicts how different information may be extracted from a separate platform in order to provide a generative response, that is used to render a supplemental content window, also referred to as a window interface element. Some of the context details or surrounding features of the graphical user interfaces have been omitted from some of the figures to reduce redundancy and focus the description on highlighted functionality.

Figure 19A:
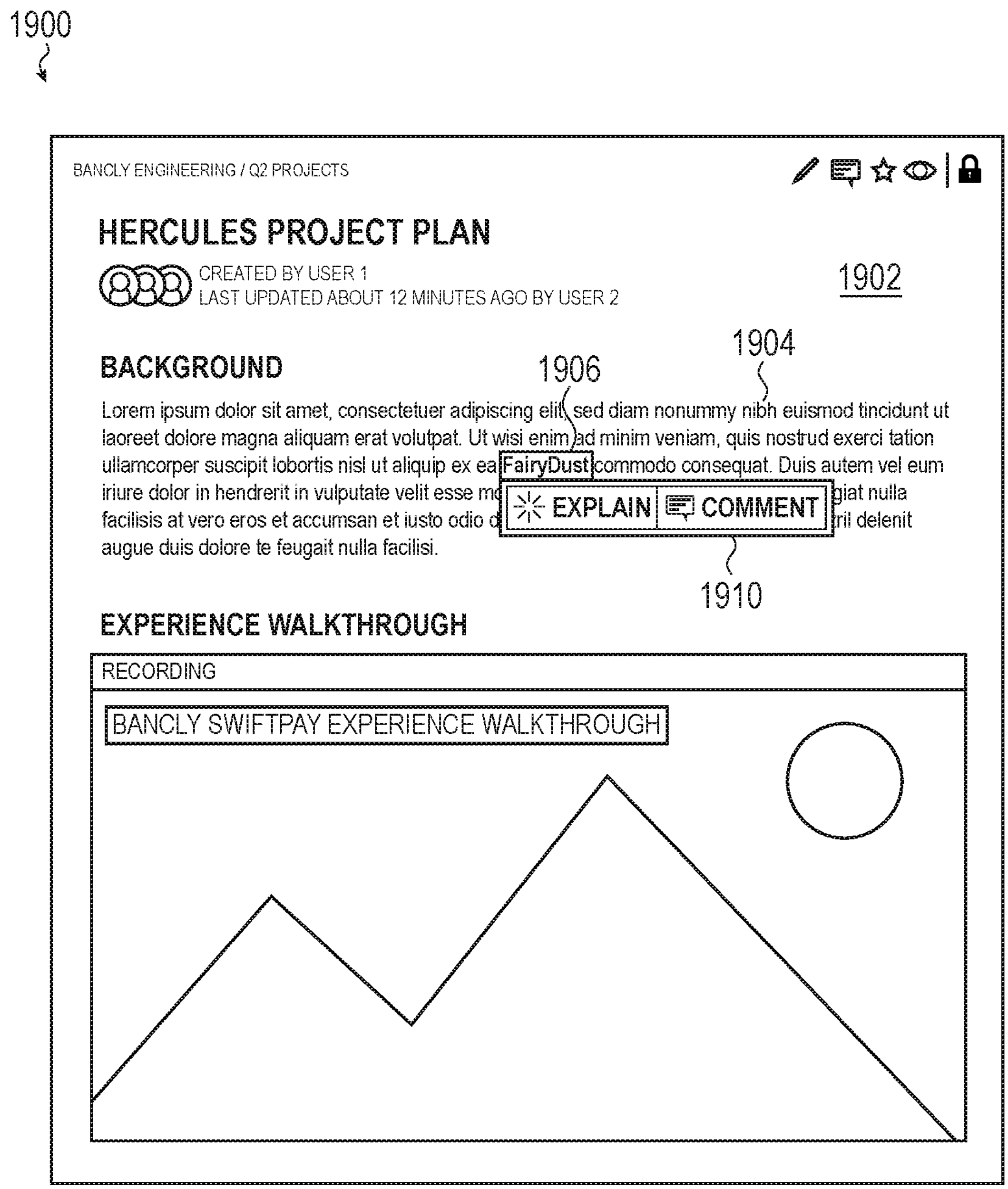
FIGS. 19A-19B depict an example supplemental content window, which may be displayed in response to a user selection of control in a graphical user interface as described herein.
Figure 19B:
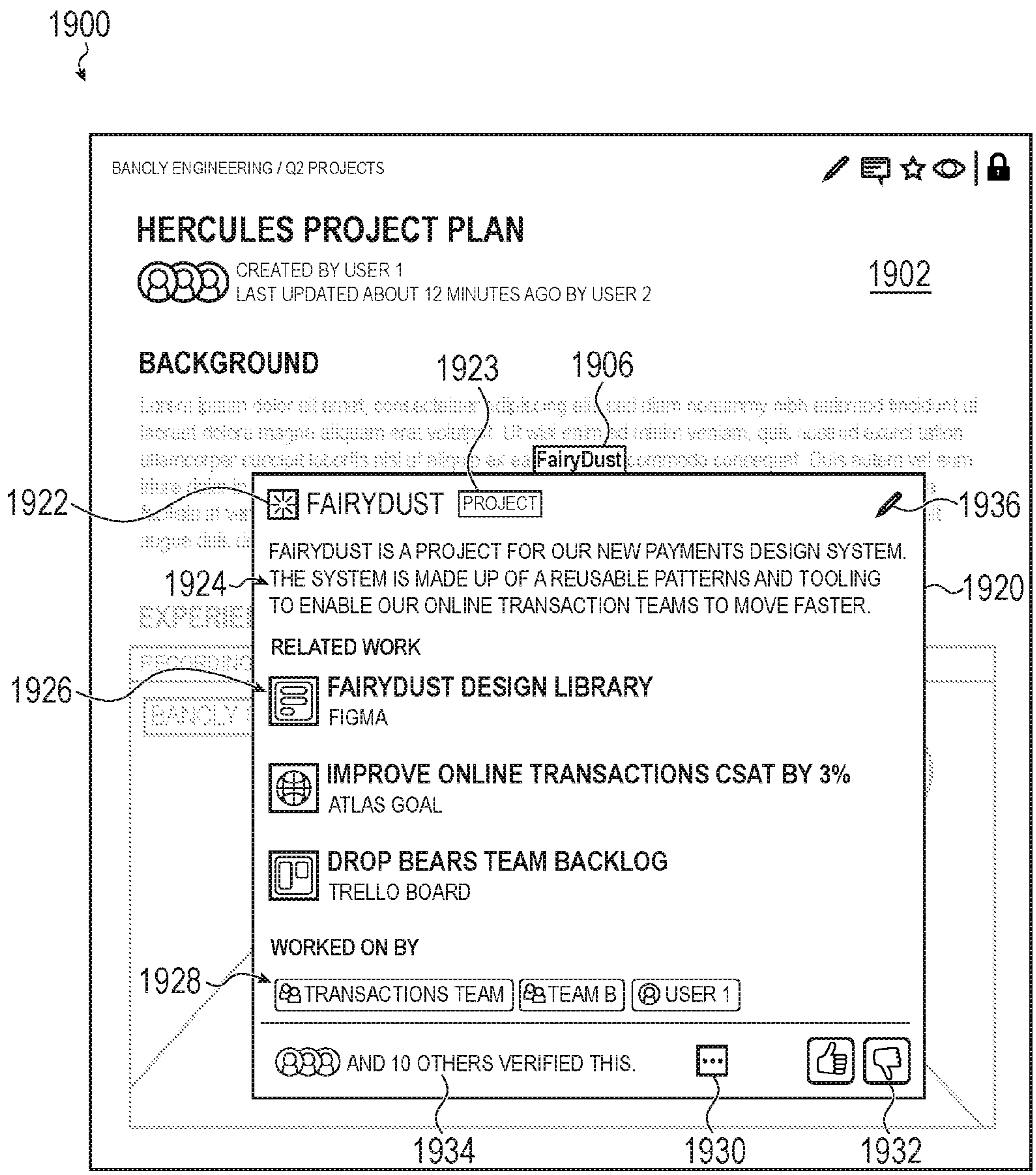

FIGS. 19A-19B depict an example graphical user interface 1900 of a collaboration platform in which supplemental content may be provided using a generative output engine. In particular, the graphical user interface 1900 includes a content region 1902 including content 1904. In response to a user input provided with respect to a word 1906 or phrase, a control 1910 may be rendered over the content 1904. In this example, the control 1910 includes multiple selectable elements, each element providing different functionality. One of the selectable elements is an "explain" function which, when selected, causes the system to generate supplemental content to provide context and meaning for the selected word 1906.

Figure 20:
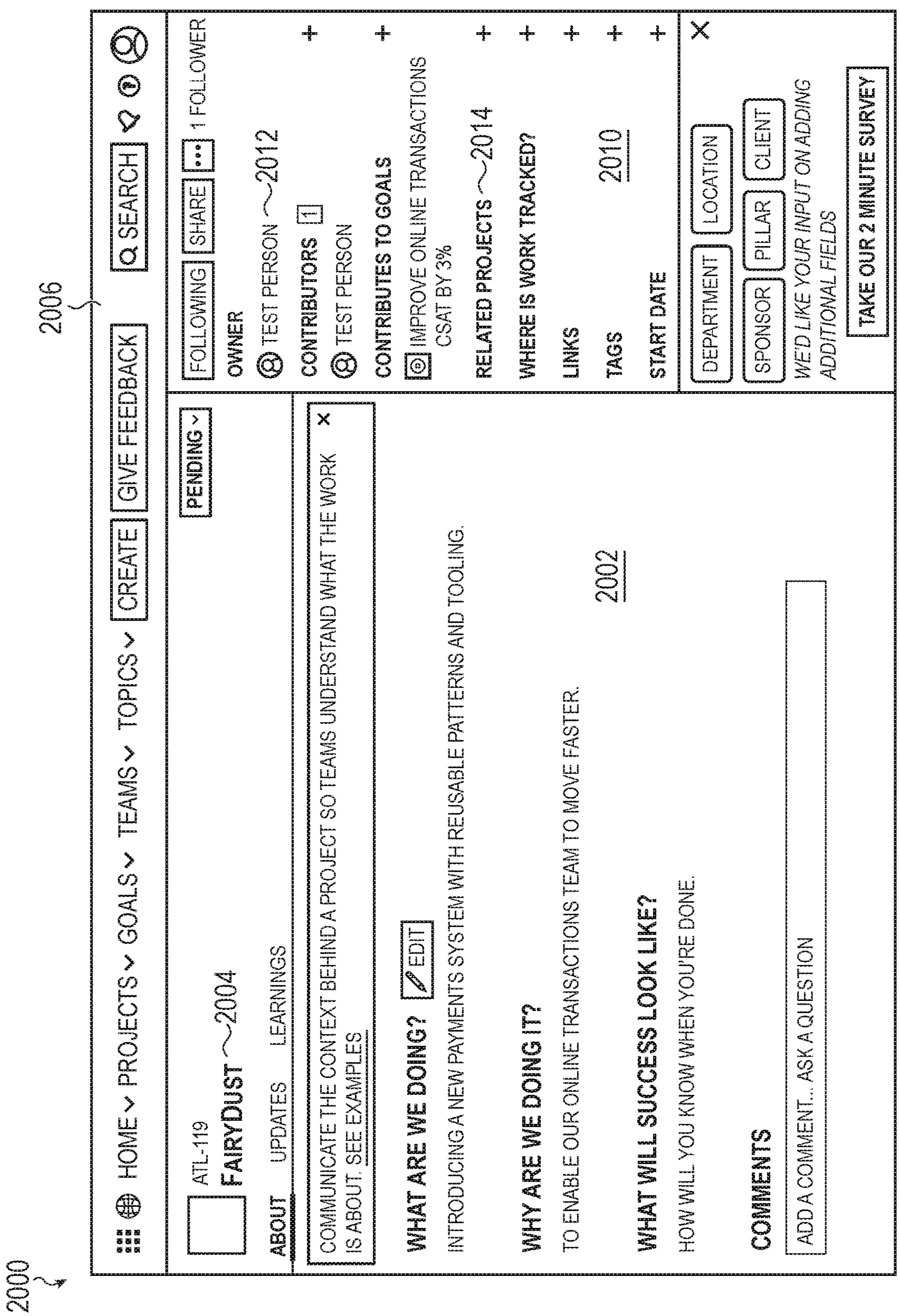
FIG. 20 depicts an example directory platform having a graphical user interface including a home page for an entry.

FIG. 19B depicts an example supplemental content window 1920, which may be displayed in response to a user selection of control 1910. The supplemental content window 1920 may include content summaries 1924 and other content that is produced using a generative output engine, as described herein. In particular, in response to a user selection of a word 1906 or phrase, the system may access a directory platform, conduct a keyword search, or perform other content searching activities to obtain one or more pages or document related to the selected word 1906. In this example, the system conducts a search on a separate directory platform to identify a home page or entry associated with the selected word 1906. FIG. 20 depicts an example directory platform having a graphical user interface 2000 including a home page for an entry associated with the selected word "FairyDust" as indicated by the title or label 2004. In response to user selection of the corresponding word 1906, the system may access the entry 2002 depicted in the graphical user interface 2000 of FIG. 20, and extract content from the entry 2002 and use the extracted content to generate a prompt to be transmitted to the generative output engine. In some implementations, content from the description in the entry and other descriptive text may be extracted and used to generate the prompt. Other information that may be used to generate the prompt include user accounts or related users 2012, content from related projects 2014 or other information that may be associated with the entry 2002, as indicated in the region 2010 of the example graphical user interface 2000.

In other example implementations, a search of the current collaboration platform or another type of platform may be conducted using the selected word 1906. In response to identifying content that is predicted to contain descriptive content related to the selected word 1906, content from that item may be extracted and used to generate the prompt. In some cases, the system may use labels, tags, metadata, or other content in order to identify descriptive content related to the selected word 1906. In some implementations, the system may also use project graphs, user graphs, or other object graphs constructed using the content of one or more collaboration platforms to identify descriptive content.

An output or response from the generative output engine may be used to populate the supplemental content window. Turning to the example of FIG. 19B, the output or response may be used to generate the description summary 1924 rendered in the supplemental content window 1920. The supplemental content window 1920 also includes an edit control 1936, which may transition the supplemental content window into a content editor and allow the user to modify or edit the generated summary 1924. In some instances, a modified summary is saved on the system and used for subsequent request for supplemental content. In this way, the generative output engine can be used to provide an initial summary or context, which may be checked, modified, and verified by system users. As shown in the example supplemental content window 1920, users may confirm or verify a summary by selecting feedback controls 1932. An indication of the number of verifications may be provided in region 1934. In some cases, verifications are only shown for user accounts that are related to the original descriptive content used to generate the content summary. For example, users that are associated with the entry (e.g., entry 2004) may verify the content. In some cases, associated users are shown in the region 1934.

Once a content summary or supplemental feedback has been edited and/or verified in an amount that meets a criteria, some or all of the content of the supplemental content window 1920 may be saved on the system. In response to a subsequent selection of the word (e.g., word 1906) by another user or the same user, the system may check for a cached or saved copy and, if one does not exist, the system may generate new content in accordance with the technique outlined above. Further, in some cases, new content is generated in accordance with a predicted or actual age of a saved or cached item in order to ensure that the description summary or other content is current and reflects up-to-date information.

As shown in FIG. 19B, the supplemental content window 1920 includes additional information or content items. In this example, the window 1920 includes link objects 1926, which are selectable to cause redirection to the respective content items and platforms. The selectable link objects 1926 may include embedded graphics and extracted item data in accordance with other examples described herein. The link objects 1926 may be obtained from the entry (e.g. entry 2002) or may be generated in response to a content search performed using the data summary or a search query generated by the generative output engine. In some cases, the generative output engine is also used to generate brief summaries of the content contained in each of the link objects 1926 and the summaries are rendered in the window 1920.

The supplemental content window 1920 may also include other content including team identifiers, user identifiers, and other content 1928 that is related to the selected word 1906. This content 1928 may also be generated using the directory entry (e.g., entry 2002) or may be obtained from a user graph, project graph, or other object graph generated using system data. The window 1920 may also include various other controls 1930 for copying the content, inserting the content into the current page or document, sharing the content, or directing the content to another aspect of the platform or system. In the current example, the title 1922 is selectable to cause the user interface to be redirected to the graphical user interface of the corresponding entry (e.g., the graphical user interface 2000 of the entry 2002). The window 1920 also includes an entry type or word classifier 1923, which indicates whether the word is a "project," "service," "team," "epic," "initiative," or other item managed by the directory platform, other type of platform, or used within an organization in accordance with the word classifier 1923. In some cases, the word classifier 1923 is also selectable to cause display of other uses of that word in the platform or organization in a similar context.

Figure 21:
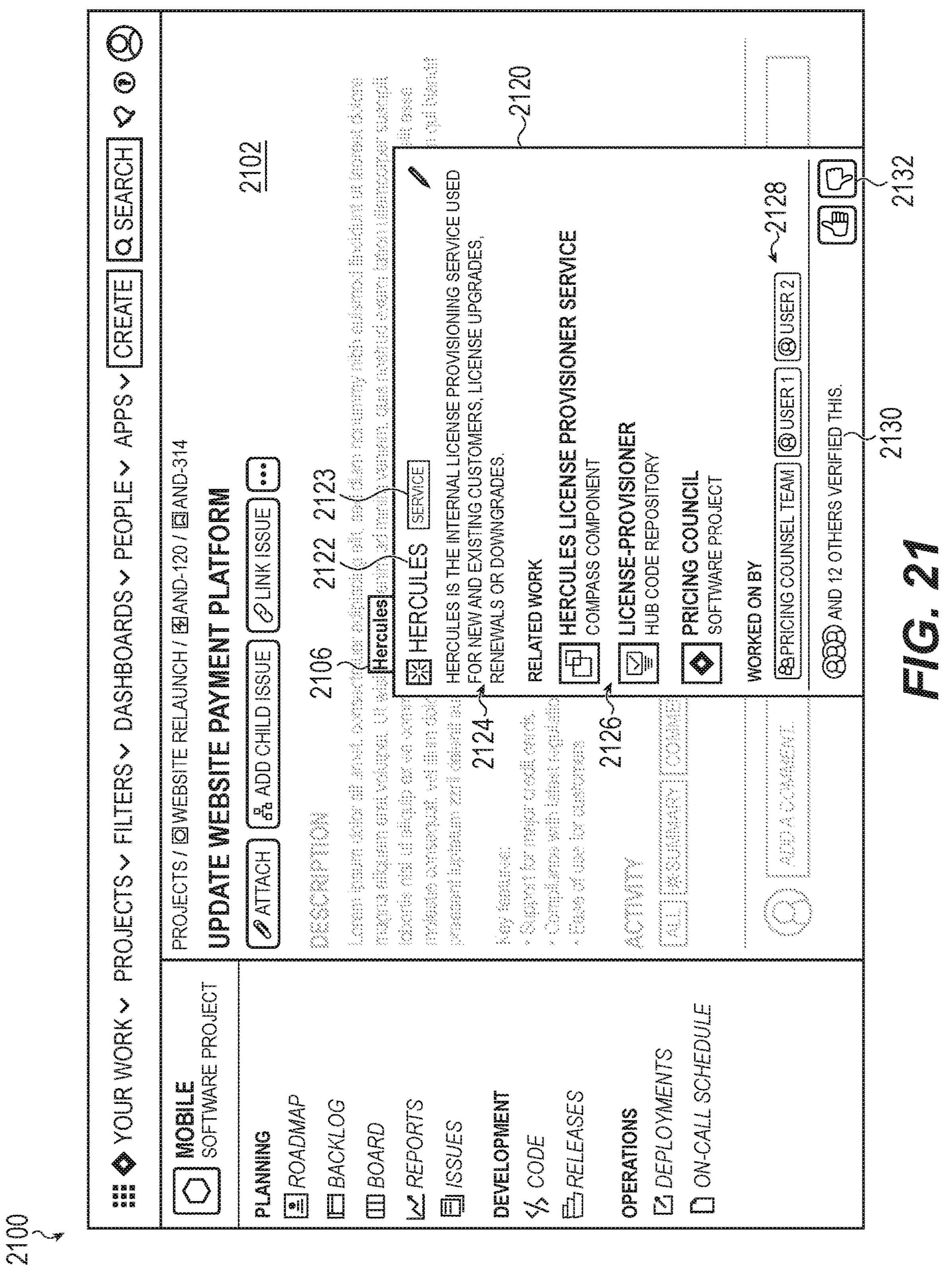
FIG. 21 depicts an example graphical user interface of an issue tracking platform and an example supplemental content window.
Figure 22:
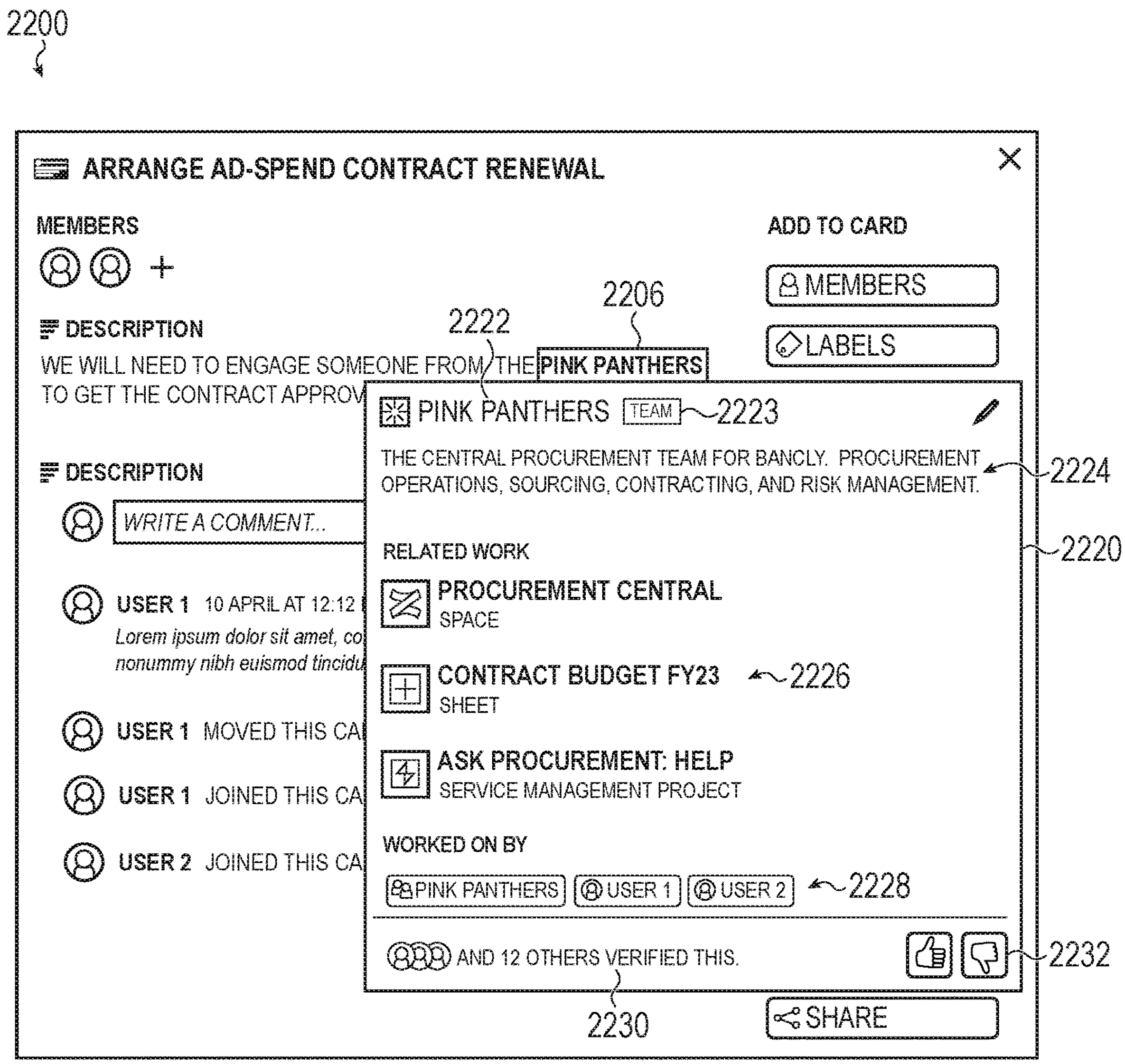
FIG. 22 depicts an example graphical user interface of an example supplemental content window in a project management platform.

FIGS. 21 and 22 provide additional examples of a supplemental content window rendered in a graphical user interface of a platform. FIG. 21 depicts an example graphical user interface 2100 of an issue tracking platform (also referred to as an issue tracking system or "ITS"). Similar to the previous examples, the supplemental content window 2120 is displayed in response to a user selection of a word 2106 within a content region 2102. The window 2120 includes a content summary 2124 that may be produced using a generative output engine, in accordance with the previous examples described herein. The window 2120 also includes link objects 2126 and related entities 2128, which may be generated in fashion similar to as described above. The window 2120 also includes feedback controls 2132 and verification indicia within region 2130 indicating the amount and users who have verified the content. In the example of FIG. 21, the word classifier 2123 indicates that the word is classified as a "service."

FIG. 22 depicts an example graphical user interface 2200 of a task card or tile in a project management platform. Similar to the previous examples, the supplemental content window 2220 is displayed in response to a user selection of a word 2206 within a content region 2202. The window 2220 includes a content summary 2224 that may be produced using a generative output engine, in accordance with the previous examples described herein. The window 2220 also includes link objects 2226 and related entities 2228, which may be generated in fashion similar to as described above. The window 2220 also includes feedback controls 2232 and verification indicia within region 2230 indicating the amount and users who have verified the content. In the example of FIG. 22, the word classifier 2223 indicates that the word is classified as a "team."

Natural Language to Custom Structured Query Language(s)

Figure 23A:
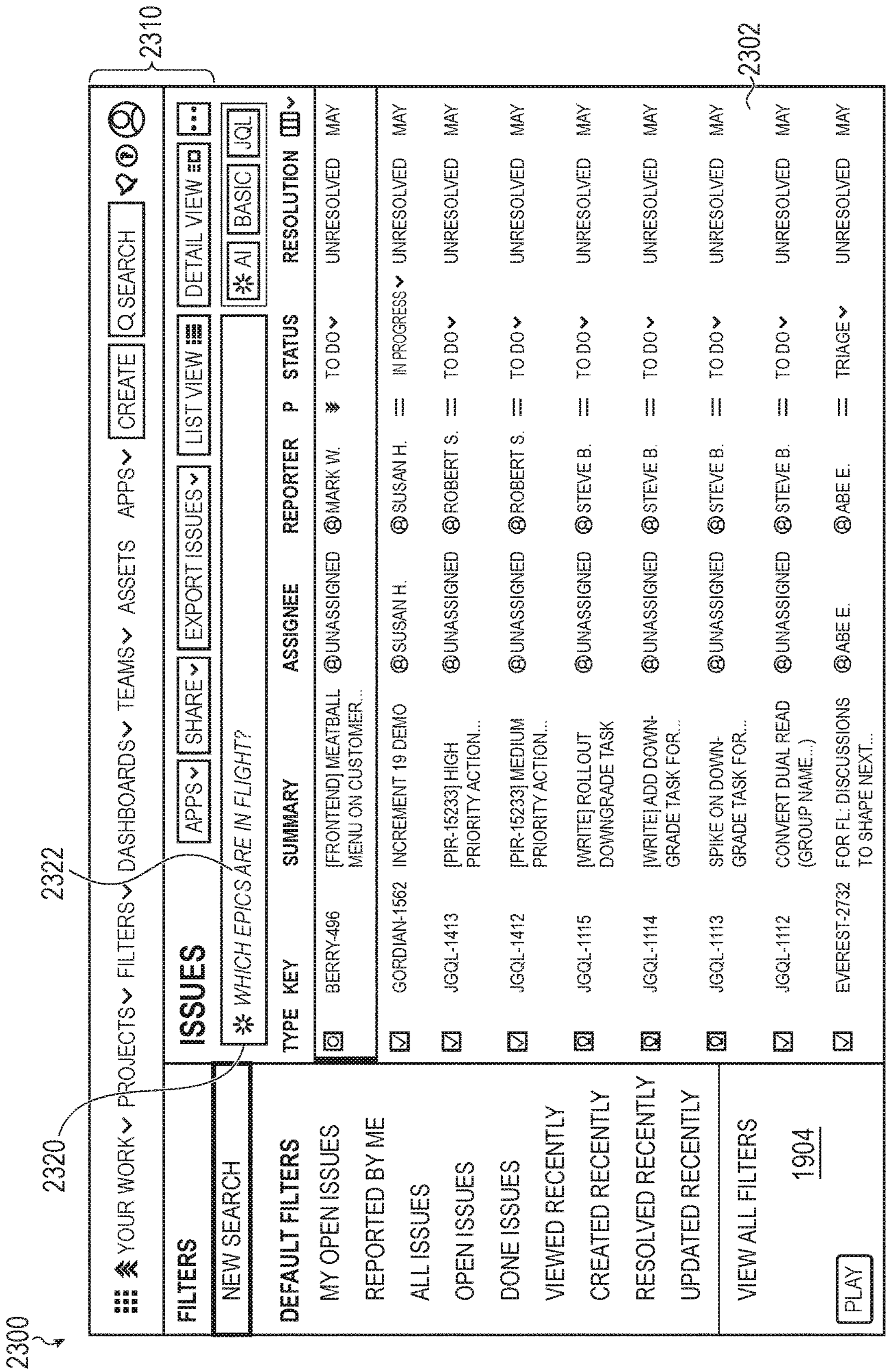
FIGS. 23A-23B depict a list of issues displayed in an issue listing region of a graphical user interface.
Figure 23B:
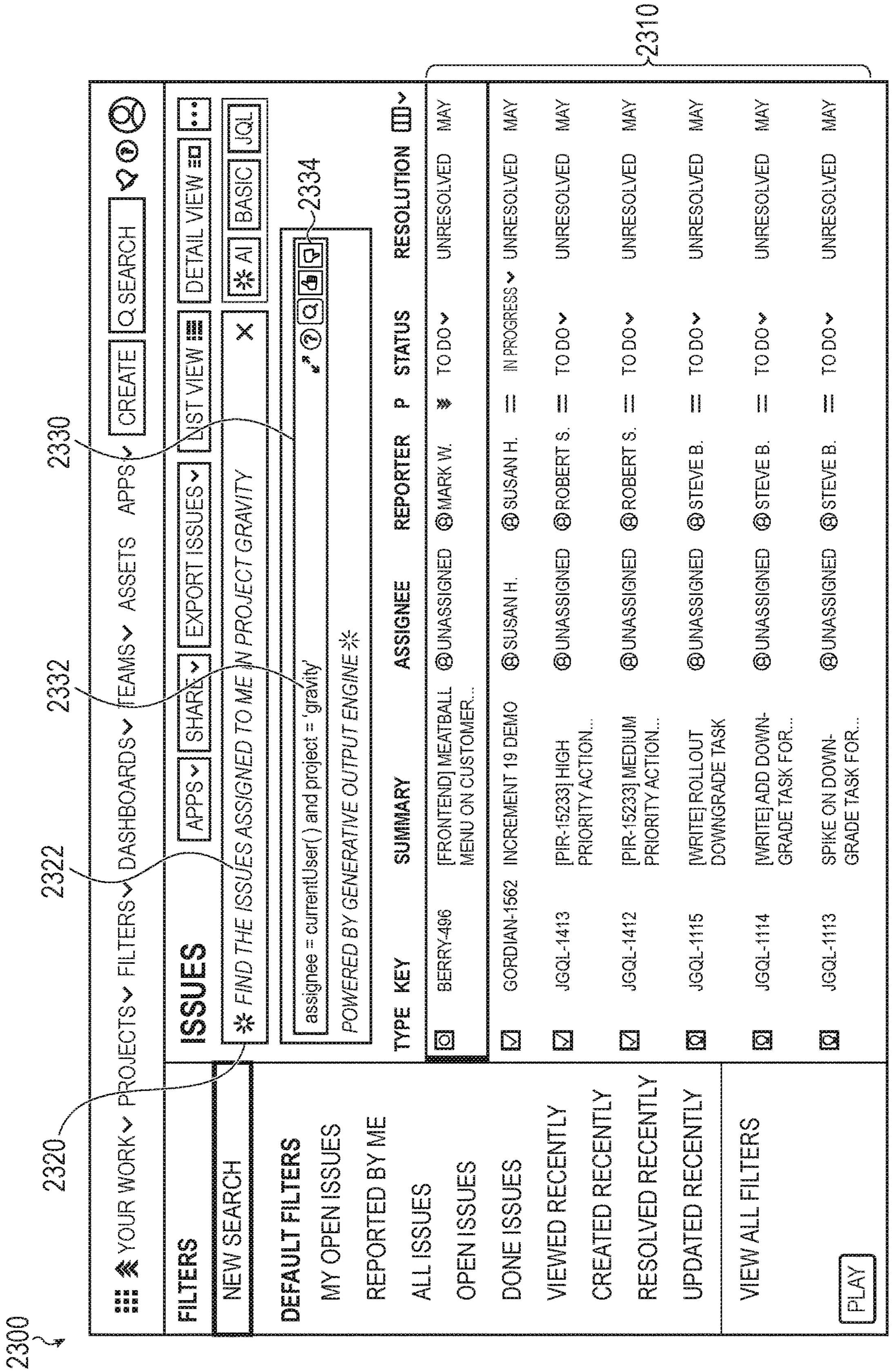
Figure 23C:
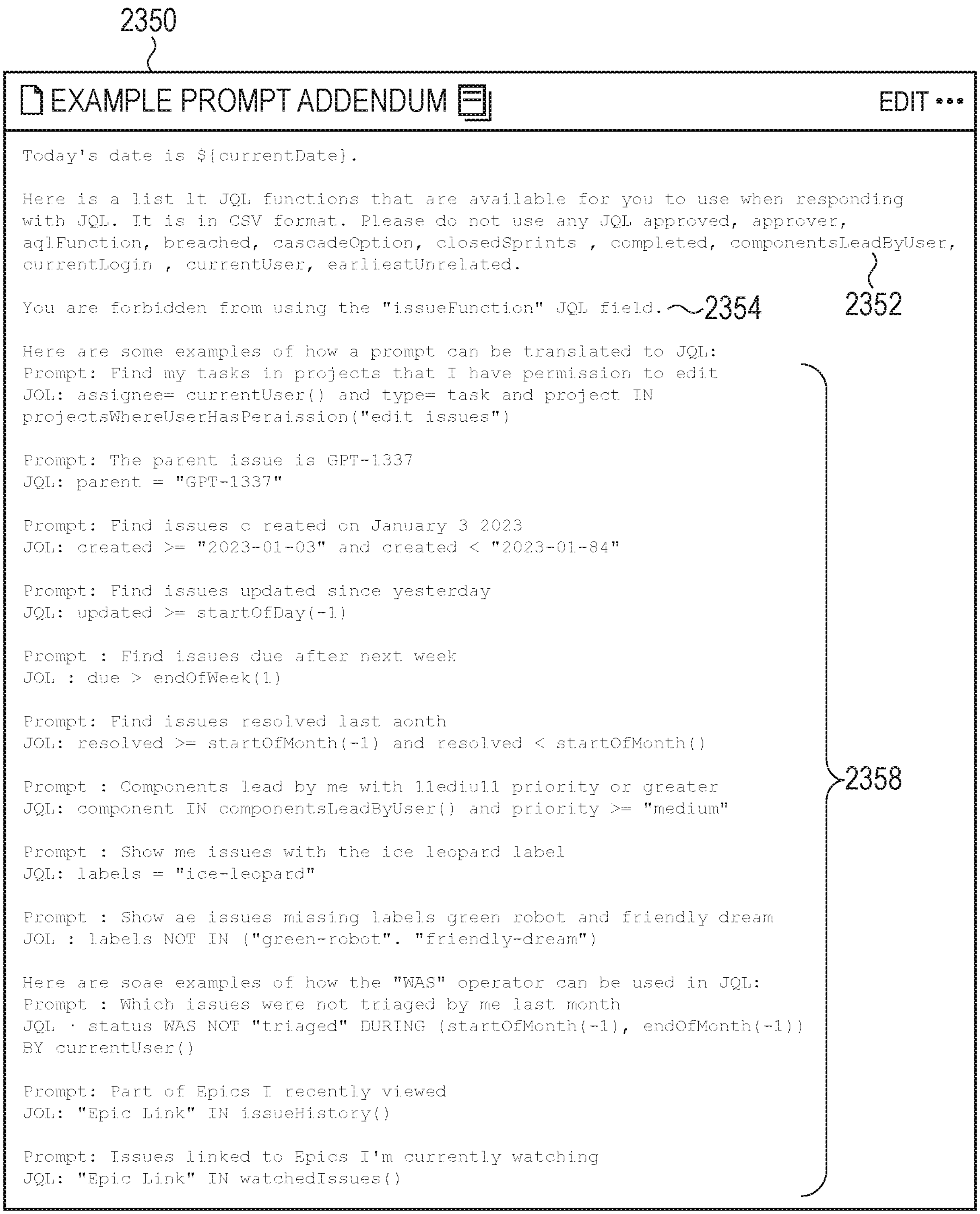
FIG. 23C depicts an example prompt that can be used to produce a particular schema response.

In addition to content editing assistance, a generative output engine can also be used to perform tasks for a variety of aspects of a collaboration platform. In particular, a generative output engine may be used to assist with specialized queries of an issue tracking platform. FIGS. 23A-23C, described below, provide illustrative examples of how a generative output engine can be used in conjunction with a graphical user interface to perform sophisticated structured queries of a database or data store of issues. Some issue tracking platforms enable structured queries but only using a query schema that has been adapted for a particular issue tracking platform. Casual users may not have the experience or detailed knowledge of the specialized schema in order to perform advanced searching on such platforms. The techniques and systems described herein can be used to assist a user in the construction and use of specialized query terms and clauses. The interface described herein can also be used to help train users on the construction of custom queries by providing visual mapping tools and explanations for machine-generated queries. Many of the features previously described with respect to other examples, herein, are not repeated with respect to the present examples to reduce redundancy. However, many of the generative output engine assisted functions described within the present disclosure may be applied to the following examples as well.

FIGS. 23A-23B depict an example graphical user interface 2300 of an issue tracking platform, also referred to as an issue tracking system. As described herein, an issue tracking platform is a system that manages user-generated issues or tickets in accordance with an issue or ticket workflow. Typically, each issue or ticket represents a task or a portion of a project that is assigned to a person or team (assignee). As the task or project progresses, the issue or ticket may transition through a series of predefined states in accordance with an issue workflow or process. Issue tracking platforms are also an essential tool for information technology management systems (ITSM) designed to handle technical issues or tickets submitted on behalf of employees or customers seeking technical assistance. Over time, the issue tracking platform may manage a large number of issues or tickets, which can be difficult to navigate without the help of sophisticated search and query tools. The graphical user interface 2300 of FIGS. 23A-23B can be used to obtain an overview of open issues for a project, issues assigned to a particular user, or issues satisfying a particular criteria defined by a search query.

FIG. 23A-23B depict list of issues 2340 displayed in an issue listing region 2302. Each of the items displayed in the list may be selectable and, in response to a user selection of a respective item, the graphical user interface may be redirected to an issue view of an issue corresponding to the selected item. The graphical user interface 2300 may also allow for bulk actions (e.g., bulk state changes, bulk assignments, bulk deletions) using the various controls provided in the graphical user interface 2300. In the present example, the graphical user interface includes a main panel or issue listing region 2302, a navigational region 2304 and a toolbar or controls region 2310. The user can navigate to various issue views and issue lists of the issue tracking platform by selecting a corresponding entry in the navigational region 2304. The user can also navigate to various projects, dashboards, teams, and other aspects of the issue tracking platform using corresponding controls in the toolbar 2310.

In order to conduct a new search or issue query, the graphical user interface provides a user input region 2320 which can be used to initiate a search or query. In the present example, the user input region 2320 is configured to receive a natural language search string. That is, a formal or structured query is not required as input to initiate a search. However complete, or partial structured search terms or clauses may also be provided to the user input region 2320. As shown in FIG. 23A, the user input region 2320 may be a special region adapted to work with the generative services available on the platform, as indicated with the star icon. In other implementations, the user input region 2320 may be a general purpose input region and the generative services may be invoked or initiated in response to another input or control.

In response to a natural language input 2322 provided to the user input region 2320, the system may generate or construct a prompt to be communicated to a generative output model. The prompt may include both predetermined query prompt text and at least a portion of the natural language input. The predetermined query prompt text may include instructions and/or examples that are configured to generate a response from the generative output engine that is compatible with a query schema used by the issue tracking platform.

FIG. 23C includes an example prompt 2350 of predetermined query prompt text that can be used to cause the generative output engine to produce a particular schema response. In this particular example, the predetermined prompt text includes a list of permitted commands 2352 for a Jira Query Language (JQL) query schema. This designates an open set of commands that are available for use in the construction of the structured query. The structured query is not necessarily limited to the open set of permitted commands 2352 but the open set may include commonly used terms or phrases. The prompt 2350 also includes prohibited terms 2354, which may specify which clauses or terms are restricted from the output. The prohibited terms 2354 may eliminate terms or phrases that may provide functionality that is beyond the scope of a tailored query or may result in an unintended modification of system data. The prompt 2350 also includes a set of structured query examples 2358 that provide demonstrative input-output pairs. Specifically, the input-output pairs include an example natural language input or prompt paired with an example schema-formatted output. The set of structured query examples 2358 are not exhaustive but may include common or representative queries that demonstrate typical search functions.

A prompt including the predetermined query prompt text and at least a portion of the natural language input is transmitted to or otherwise communicated to the generative output engine. As described with respect to previous examples, the prompt may be provided as part of an API call to an external generative output engine. The prompt text may be formatted as a JSON or other similar data format. In response, the generative output engine produces a generative output or response that includes a proposed structured query having a format consistent with the schema compatible to the particular issue tracking platform.

The generative result or output produced by the generative output engine may be displayed in a query region or field 2330. As shown in FIG. 23B, the result is a structured query 2332 that is formatted in accordance with the issue query schema examples provided in the prompt. A list of results 2310 may be updated or generated on execution of the structured query 2332. Each result of the list of results 2310 may be selectable to cause redirection of the graphical user interface 2300 to an issue view or project view associated with the selected result or item. In some implementations, the generative result or output is not displayed and the list of results 2310 is generated automatically in response to entry of the natural language user input may change the list of results 2310.

In the present embodiment, the structured query 2332 is user editable and may be modified before or subsequent to the structured query 2332 being executed with respect to the database or data store of the issue tracking platform. In some cases, the list of results 2310 may be automatically and dynamically updated in response to modifications to the structured query 2332. This may allow the user to adapt the machine-generated query on the fly to achieve the results that are desired. As shown in FIG. 23B, the query region 2330 also includes controls 2334 including feedback controls that can be used to provide positive or negative feedback with respect to a particular result. The feedback may be used to automatically adapt the predetermined query prompt text by adding example pairs that have received a threshold amount of positive feedback or remove example pairs that have received a threshold amount of negative feedback.

The current example, the natural language prompt 2322 includes terms that may not directly translate into query terms. For example, the natural language user input that indicates a reference to a user (e.g., "my," "me," "my team," "our project,") may be modified by the system to replace references to a user with an application call that is configured to extract a user id, user name or other data item that is used by the issue tracking platform. Similarly, natural language user input that indicates reference to a project, team, initiative, site, or other similar reference may be modified by the system to replace references to these items with an application call that is configured to extract a team id, project name, site, or other data item that is used by the issue tracking platform. The system calls may be substituted for the more colloquial words before the natural language input is added to the prompt. In other cases, the system calls may be substituted after the structured query is produced by the generative output engine.

In some cases, potentially personally identifiable information (PII) may be identified by analyzing the natural language user input. Any predicted or potential PII may be extracted from the natural language user input before the user input is added to the prompt. PII may be identified by a generative output engine operating in a zero retention mode or in some cases, may be detected by a business rules engine or regular expression set.

This may provide additional protection against exposing PII outside of the platform, particularly if the generative output engine is provided by a third-party. While many third-party systems do not save received prompts and generative results, extraction of potential PII provides additional security and may be required by some customer operating requirements. The potential PII that was extracted may be added back to the structured query after generation but the generative output engine.

In some implementations, the accuracy or quality of the generative response may be improved by breaking down the natural language user input into smaller more discrete subparts or portions that relate more directly to a structured query clause or part. Thus, in some implementations, the natural language user input is divided into multiple sub-parts or portions, each portion used to generate a separate prompt. The respective results from the prompts can then be recombined or formulated to generate a complete structured query that is executed with respect to the issue tracking platform. In some cases, natural language processing is performed on the user input to identify potentially divisible requests that may be serviced using separate prompts. In some cases, the multiple requests or prompts are dependent such that the result of one prompt is used to generate another prompt. In the scenario of a series of dependent prompts, the results generated by the last prompt may be determined to be the complete structured query.

Figure 24:
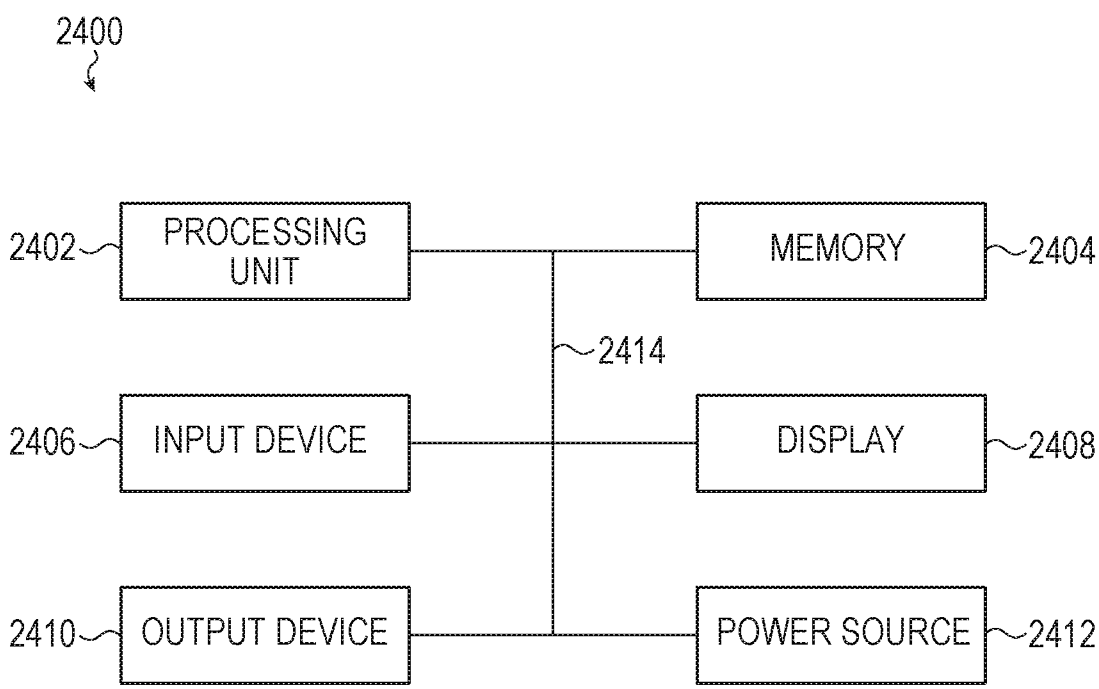
FIG. 24 shows a sample electrical block diagram of an electronic device that may perform the operations described herein.

FIG. 24 shows a sample electrical block diagram of an electronic device 2400 that may perform the operations described herein. The electronic device 2400 may in some cases take the form of any of the electronic devices described with reference to FIGS. 1, 2A-2E. 3, and 4, including client devices, and/or servers or other computing devices associated with the collaboration system 100. The electronic device 2400 can include one or more of a processing unit 2402, a memory 2404 or storage device, input devices 2406, a display 2408, output devices 2410, and a power source 2412. In some cases, various implementations of the electronic device 2400 may lack some or all of these components and/or include additional or alternative components.

The processing unit 2402 can control some or all of the operations of the electronic device 2400. The processing unit 2402 can communicate, either directly or indirectly, with some or all of the components of the electronic device 2400. For example, a system bus or other communication mechanism 2414 can provide communication between the processing unit 2402, the power source 2412, the memory 2404, the input device(s) 2406, and the output device(s) 2410.

The processing unit 2402 can be implemented as any electronic device capable of processing, receiving, or transmitting data or instructions. For example, the processing unit 2402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 2400 can be controlled by multiple processing units. For example, select components of the electronic device 2400 (e.g., an input device 2406) may be controlled by a first processing unit and other components of the electronic device 2400 (e.g., the display 2408) may be controlled by a second processing unit, where the first and second processing units may or may not be in communication with each other.

The power source 2412 can be implemented with any device capable of providing energy to the electronic device 2400. For example, the power source 2412 may be one or more batteries or rechargeable batteries. Additionally, or alternatively, the power source 2412 can be a power connector or power cord that connects the electronic device 2400 to another power source, such as a wall outlet.

The memory 2404 can store electronic data that can be used by the electronic device 2400. For example, the memory 2404 can store electronic data or content such as, for example, audio and video files, documents and applications, device settings and user preferences, timing signals, control signals, and data structures or databases. The memory 2404 can be configured as any type of memory. By way of example only, the memory 2404 can be implemented as random access memory, read-only memory, flash memory, removable memory, other types of storage elements, or combinations of such devices.

In various embodiments, the display 2408 provides a graphical output, for example associated with an operating system, user interface, and/or applications of the electronic device 2400 (e.g., a chat user interface, an issue-tracking user interface, an issue-discovery user interface, etc.). In one embodiment, the display 2408 includes one or more sensors and is configured as a touch-sensitive (e.g., single-touch, multi-touch) and/or force-sensitive display to receive inputs from a user. For example, the display 2408 may be integrated with a touch sensor (e.g., a capacitive touch sensor) and/or a force sensor to provide a touch- and/or force-sensitive display. The display 2408 is operably coupled to the processing unit 2402 of the electronic device 2400.

The display 2408 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 2408 is positioned beneath and viewable through a cover that forms at least a portion of an enclosure of the electronic device 2400.

In various embodiments, the input devices 2406 may include any suitable components for detecting inputs. Examples of input devices 2406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 2406 may be configured to detect one or more particular types of input and provide a signal (e.g., an input signal) corresponding to the detected input. The signal may be provided, for example, to the processing unit 2402.

As discussed above, in some cases, the input device(s) 2406 include a touch sensor (e.g., a capacitive touch sensor) integrated with the display 2408 to provide a touch-sensitive display. Similarly, in some cases, the input device(s) 2406 include a force sensor (e.g., a capacitive force sensor) integrated with the display 2408 to provide a force-sensitive display.

The output devices 2410 may include any suitable components for providing outputs. Examples of output devices 2410 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 2410 may be configured to receive one or more signals (e.g., an output signal provided by the processing unit 2402) and provide an output corresponding to the signal.

In some cases, input devices 2406 and output devices 2410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 2402 may be operably coupled to the input devices 2406 and the output devices 2410. The processing unit 2402 may be adapted to exchange signals with the input devices 2406 and the output devices 2410. For example, the processing unit 2402 may receive an input signal from an input device 2406 that corresponds to an input detected by the input device 2406. The processing unit 2402 may interpret the received input signal to determine whether to provide and/or change one or more outputs in response to the input signal. The processing unit 2402 may then send an output signal to one or more of the output devices 2410, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for producing generative content for a document of a document management platform, the method comprising:

causing display of user-generated content in an editor region of a graphical user interface of the document management platform, the editor region operable to receive new user-generated content and modify existing user-generated content, the user-generated content including editor-specific objects in-line with text content;

in response to a user input including a generative command, identifying at least a portion of the document subject to the generative command;

causing a parsing of the user-generated content of the document to identify a set of editor-specific objects;

causing a generation of an identity map including a set of entries, each entry including a respective content identifier associated with a respective editor-specific object of the set of editor-specific objects;

causing generation of a modified version of the user-generated content replacing each editor-specific object with a respective tagged string;

generating a prompt comprising:

predefined query prompt text corresponding to the generative command; and at least a portion of the modified version of the user-generated content corresponding to the portion of the document subject to the generative command;

providing the prompt to a generative output engine;

obtaining a generative response from the external generative output engine, the generative response including a set of tagged strings;

causing generation of a modified response by replacing each respective tagged string of the set of tagged strings with a corresponding editor-specific object by referencing the identity map; and causing display of at least a portion of the modified response in the graphical user interface.

2. The computer-implemented method of claim 1, wherein:

each respective tagged string includes the respective content identifier that was included in the identity map for the replaced editor-specific object; and causing generation of the modified response includes identifying the corresponding editor-specific object using the respective content identifier included in the respective tagged string.

3. The computer-implemented method of claim 1, wherein the set of tagged strings included in the generative response is at least a subset of a set of tagged strings included in the modified version of the user-generated content.

4. The computer-implemented method of claim 1, wherein:

causing generation of the modified response further comprises:

performing a validation check on each respective tagged string of the set of tagged strings; and in response to a particular tagged string of the set of tagged strings failing the validation check, replacing the particular tagged string with a text value included in the particular tagged string.

5. The computer-implemented method of claim 1, wherein:

each respective tagged string includes the respective content identifier that is included in the identity map for the replaced editor-specific object; and each respective tagged string includes a text value extracted from the editor-specific object.

6. The computer-implemented method of claim 5, wherein the prompt further comprises instructions to preserve any tagged strings contained in the modified version of the user-generated content.

7. The computer-implemented method of claim 6, wherein the prompt further comprises instructions to use the text value of any tagged strings contained in the modified version of the user-generated content when evaluating the prompt.

8. The computer-implemented method of claim 1, wherein, in response to a user insertion command, the method further comprises causing at least the portion of the modified response to be inserted into the editor region of the graphical user interface.

9. The computer-implemented method of claim 1, wherein the set of editor-specific objects comprises one or more of: a user mention object, a graphical link object or a list element object.

10. A computer-implemented method for producing generative content for a document of a content collaboration platform, the method comprising:

causing display of content of a content item in a graphical user interface of the content collaboration platform, the content including non-text objects in-line with text content;

in response to a user input including a generative command, identifying at least a portion of the content item subject to the generative command;

causing a generation of an identity map include a set of entries, each entry including a respective content identifier associated with each respective non-text object identified in the content item;

causing generation of a modified version of the content replacing each non-text object with a respective tagged string;

generating a prompt comprising:

predefined query prompt text corresponding to the generative command; and at least a portion of the modified version of the content corresponding to the portion of the content item subject to the generative command;

providing the prompt to a generative output engine;

obtaining a generative response from the external generative output engine, the generative response including a set of tagged strings;

causing generation of a modified response by replacing each respective tagged string of the set of tagged strings with a corresponding non-text object by referencing the identity map; and causing display of at least a portion of the modified response in the graphical user interface.

11. The computer-implemented method of claim 10, wherein:

each respective tagged string includes the respective content identifier that was included in the identity map for the replaced non-text object; and each respective tagged string includes a text value corresponding to the non-text object.

12. The computer-implemented method of claim 11, wherein the prompt further comprises instructions to preserve any tagged strings contained in the modified version of the content.

13. The computer-implemented method of claim 12, wherein the prompt further comprises instructions to use the text value of any tagged strings contained in the modified version of the content when evaluating the prompt.

14. The computer-implemented method of claim 10, wherein:

causing generation of the modified response further comprises:

performing a validation check on each respective tagged string of the set of tagged strings; and in response to a particular tagged string of the set of tagged strings failing the validation check due to the particular tagged string being incomplete, omitting the particular tagged string from the modified response.

15. The computer-implemented method of claim 10, wherein the non-text objects comprise one or more of: a user mention object, a graphical link object or a list element object.

16. A system for providing generative content, the system comprising:

one or more processors;

computer readable media storing computer instructions that, when executed by the one or more processors cause the system to:

cause display of content of a content item in a graphical user interface of a content collaboration platform, the content including platform-specific objects in line with text content;

in response to a user input including a generative command, identify at least a portion of the content item to be processed using the generative command;

cause generation of an identity map include a set of entries, each entry associated with each respective platform-specific object identified in the content item;

cause generation of a modified version of the content replacing each platform-specific object with a respective tagged string;

generate a prompt comprising:

predefined query prompt text corresponding to the generative command; and at least a portion of the modified version of the content corresponding to the portion of the content item to be processed using the generative command;

provide the prompt to a generative output engine;

obtain a generative response from the external generative output engine, the generative response including a set of tagged strings;

cause generation of a modified response by replacing each respective tagged string of the set of tagged strings with a corresponding platform-specific object;

cause display of at least a portion of the modified response in the graphical user interface.

17. The system of claim 16, wherein:

each respective tagged string includes a text value extracted from the platform-specific object;

causing generation of the modified response further comprises:

performing a validation check on each respective tagged string of the set of tagged strings; and in response to a particular tagged string of the set of tagged strings failing the validation check due to detection of an incomplete string, replacing the particular tagged string with the text value.

18. The system of claim 16, wherein:

each respective tagged string includes a respective content identifier that is included in the identity map for the replaced platform-specific object; and each respective tagged string includes a respective text value; and the respective text value is extracted from the replaced platform-specific object.

19. The system of claim 16, wherein the prompt further comprises:

instructions to preserve any tagged strings contained in the modified version of the user-generated content; and instructions to use the text value of any tagged strings contained in the modified version of the content when evaluating the prompt.

20. The system of claim 16, wherein in response to a user insertion command, the method further comprises causing at least the portion of the modified response to be inserted into the graphical user interface.

* * * * *